US011904491B2

(12) United States Patent
Bormann et al.

(10) Patent No.: US 11,904,491 B2

(45) **Date of Patent: *Feb. 20, 2024**

(54) DEVICE AND METHOD FOR SEPARATING BLANKS

(71) Applicant: KOENIG & BAUER AG, Würzburg (DE)

(72) Inventors: Erik Bormann, Kesselsdorf (DE); Jun Mizutani, Yao (JP)

(73) Assignee: KOENIG & BAUER AG, Würzburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/799,369

(22) PCT Filed: May 3, 2021

(86) PCT No.: PCT/EP2021/061534

§ 371 (c)(1),
(2) Date: Aug. 12, 2022

(87) PCT Pub. No.: WO2021/233668

PCT Pub. Date: Nov. 25, 2021

(65) Prior Publication Data

US 2023/0191643 A1 Jun. 22, 2023

(30) Foreign Application Priority Data

May 18, 2020 (DE) ..................... 10 2020 113 369.3

(51) Int. Cl.

*B26D 7/18* (2006.01)
*B26F 1/38* (2006.01)
*B26F 1/42* (2006.01)

(52) U.S. Cl.

CPC ...... *B26D 7/1818* (2013.01); *B26D 2007/189* (2013.01); *B26F 1/384* (2013.01); *B26F 1/42* (2013.01)

(58) Field of Classification Search

CPC .. B26D 7/1818; B26D 7/18; B26D 2007/189; B26F 1/42; B26F 1/384

(Continued)

(56) References Cited

FOREIGN PATENT DOCUMENTS

DE 10317015 A1 11/2004
DE 60021833 T2 6/2006

(Continued)

OTHER PUBLICATIONS

International Search Report of PCT/EP2021/061534 dated Aug. 2, 2021.

(Continued)

*Primary Examiner* — Nhat Chieu Q Do

(74) *Attorney, Agent, or Firm* — MATTINGLY & MALUR, PC

(57) ABSTRACT

A blank separating device includes at least one upper blank separating module, the at least one upper blank separating module having a first relief, the first relief comprising at least three separating elements and/or contact elements, each including an operative surface and/or contact surface. The at least three operative surfaces and/or contact surfaces are individually arrangeable to at least three different distances in a vertical direction with respect to a carrier plate within which the at least three separating elements and/or contact elements are mounted. The blank separating device further includes at least one lower blank separating module that has a second relief comprising a plurality of supporting elements. The second relief matches, at least in complimentary vertical positioning, the first relief of the at least one upper blank separating module.

11 Claims, 44 Drawing Sheets

(58) Field of Classification Search
USPC .............................................................. 83/23
See application file for complete search history.

(56) References Cited

FOREIGN PATENT DOCUMENTS

| | | | | | |
|---|---|---|---|---|---|
| DE | 202007017069 | U1 | | 5/2008 | |
| DE | 102018219716 | B3 | | 12/2019 | |
| EP | 621113 | A1 | * | 10/1994 | ........... B23D 35/008 |
| EP | 2008781 | B1 | * | 12/2010 | ........... B26D 7/1818 |
| FR | 3020581 | A1 | | 11/2015 | |
| JP | 5570597 | A | | 5/1980 | |
| JP | 2003-089098 | A | | 3/2003 | |
| JP | 2010-110888 | A | | 5/2010 | |
| WO | 2006/043266 | A2 | | 4/2006 | |
| WO | 2012/053748 | A2 | | 4/2012 | |
| WO | WO-2012053748 | A2 | * | 4/2012 | ........... B26D 7/1818 |
| WO | 2013/084602 | A1 | | 6/2013 | |
| WO | WO-2013084602 | A1 | * | 6/2013 | ............... B26D 7/32 |
| WO | 2017/089420 | A2 | | 6/2017 | |

OTHER PUBLICATIONS

"Ausbrechen in Der 3. Dimension Bewaehrte Meurer-Ausbrechtechnik Im Neuen Gewand Metall + Plastic Stelte Integriertes System Vor", Papier + Folien, Deutscher Fachverlag, Frankfurt, DE, Bd. 37, Nr. 3, Mar. 1, 2002 (Mar. 1, 2002), Seiten 36-39, XP001087264, ISSN: 0048-2897.

* cited by examiner

DEVICE AND METHOD FOR SEPARATING BLANKS

CROSS-REFERENCES TO RELATED APPLICATIONS

This application is the US national phase, under 35 USC § 371, of PCT/EP2021/061534, filed on May 3, 2021, published as WO 2021/233668 A1 on Nov. 25, 2021, and claiming priority to DE 10 2020 113 369.3, filed May 18, 2020, and all of which are expressly incorporated by reference herein in their entireties.

TECHNICAL FIELD

Examples herein relate to a device for separating blanks that includes at least one upper blank separating module and at least one lower blank separating module. The at least one upper blank separating module has a relief that includes at least three separating elements and/or contact elements, each including an operative surface and/or contact surface. The at least three operative surfaces and/or contact surfaces are able to each be arranged at least at three different distances in the vertical direction with respect to a carrier plate.

Examples herein further relate to a method for separating blanks that includes at least one blank separating device. At least one partial blank pile is separated from a pile and/or a ream of sheets by means of the at least one blank separating device. During a separation process at least one lower blank separating module and at least one upper blank separating module are brought in contact. The at least one upper blank separating module forms a relief having at least three operative surfaces and/or contact surfaces. The at least three operative surfaces and/or contact surfaces are able to each be positioned at least at three different distances with respect to a carrier plate.

BACKGROUND

Web-like or sheet-like materials are processed during the production of packaging. For example, the sheets are imprinted, embossed, creased, perforated, die-cut, cut, stitched, glued and, for example, folded into packaging in multiple processing steps. To optimally utilize the surface area of a sheet, in general multiple identical or different copies, for example of a poster, a folding box or a packaging, are printed on a common sheet and then die-cut. These copies are referred to as blanks.

A sheet processing machine can comprise different processing steps, such as imprinting, cutting, embossing, creasing, die cutting, perforating, gluing and/or stitching. Such sheet processing machines frequently also comprise inspection devices. Sheets are typically processed and cut to size in processing machines using tool-dependent die cutting and cutting devices.

Such a processing machine is configured as a die cutting, cutting, perforating, embossing and/or creasing machine, for example. When such a processing machine is referred to hereafter as a die cutter and/or a die-cutting machine, in particular also a cutting, perforating, embossing and/or creasing machine is meant. In addition to rotary die cutters, tool-dependent systems also encompass flat die cutters, in particular flat-bed die cutters. In these, multiple sheets are processed consecutively by a cyclically recurring movement. The sheets are preferably moved substantially horizontally through the processing machine by way of a transport system, preferably a chain gripper system. In addition to a die-cutting unit, such a machine usually also comprises other units, such as a sheet infeed unit, a sheet delivery unit, a stripping unit, a sheet insert unit, a blank separating unit, and an offcut piece delivery unit.

The drawback of the technology is that it is limited in terms of the speed. At present, achievable speeds are approximately 10,000 sheets/hour. The cause is physical-based and due to the discontinuous movement process of the sheet to be die-cut. The sheet is brought to a halt in each unit of the flat-bed die-cutter and then has to be accelerated again to the operating speed to be transported to the next unit. These deceleration and acceleration processes pose a burden on the structure of the die-cut sheet and therefore do not allow any higher processing speeds.

Through the use of rotary die-cutting machines, considerably higher production speeds can be achieved as a result of the continuous movement process. Rotary die-cutting machines can, for example, be equipped with die-cutting mechanism, creasing mechanism, embossing mechanism, and stripping mechanism modules. Such a rotary die cutter is known from WO 2017/089420 A2, for example.

DE 10 2018 219 716 B3 shows a sheet processing machine. The sheet-processing machine comprises a device for treating substrates, a delivery for forming stacks of treated substrates, and a blank separating unit. The delivery for forming stacks of treated substrates is connected to the blank separating unit via a transport section.

Thereafter, the blanks have to be separated from the sheets in another unit and/or machine.

A device for removing stripped parts and/or offcut pieces from the blanks, in particular a blank separating unit, is known from DE 600 21 833 T2. The patent specification teaches a pile-wise and/or ream-wise separation of offcut pieces from the blanks of previously die-cut and/or perforated sheets. A matrix of pins is arranged in each case in an upper blank separating module and a lower blank separating module. The pins can each be arrangeable and/or be arranged in two positions, in the vertical direction. The upper blank separating module and the lower blank separating module each include a relief, which are matched to one another. During a separating process, the two modules are moved toward one another in the vertical direction, separating the offcut pieces from the blanks. The positioning of the pins in the respective modules is matched to the shape of the blank. The higher situated pins in the lower blank separating module hold the blanks, and the offcut pieces can be pushed away downwardly by the lower situated pins. The relief of the upper blank separating module is configured as a mating piece to the lower module. The offcut pieces are separated from the blanks by the upper blank separating module by way of a shear movement and are pushed away downwardly. The pins are each positioned by means of a stencil that is matched to the shape of the blank.

WO 2013/084602 A1 discloses a transport system of a blank separating unit operating in a pile-wise and/or ream-wise manner. The piles are transported on a conveyor belt into the blank separating unit. The conveyor belt is composed of multiple sections and can be adjusted in the height in sections, by means of a movable carrier. The conveyor belt is lowered during the separation process. The offcut pieces are separated from the blanks by means of an upper blank separating module and a lower blank separating module, as described in the preceding paragraph and in DE 600 21 833 T2. A rake subsequently moves between the pins of the lower blank separating module and transports the blanks onward to a delivery.

WO 2006/043 266 A2 discloses a device for separating blanks, comprising an upper blank separating module and a lower blank separating module, wherein the lower blank separating module comprises at least three supporting elements/pins, each including at least one supporting surface. The supporting elements can only be arranged in 2 positions.

JP 2003-89 098 A discloses a device for separating blanks, comprising an upper blank separating module and a lower blank separating module, wherein the lower blank separating module comprises at least three supporting elements, each including at least one supporting surface. The supporting elements can only be arranged in 2 positions.

WO 2012/053 748 A2 discloses a device for separating blanks, comprising an upper blank separating module and a lower blank separating module, wherein the lower blank separating module comprises at least three supporting elements, each including at least one supporting surface. The supporting elements can only be arranged in 2 positions.

JP S55-70 597 A discloses a device for separating blanks, comprising an upper blank separating module and a lower blank separating module, wherein the lower blank separating module comprises at least three supporting elements, each including at least one supporting surface. The supporting elements can only be arranged in 2 positions.

FR 3 020 581 A1 discloses a separating tool, which removes pre-cut pieces from a sheet. The patent specification shows a tool comprising edges that are arranged at different heights. A mating piece, in particular the lower blank separating module, has holes into which the scrap pieces drop.

JP 2010-110 888 A discloses a device for separating blanks, which is configured as a blank separating tool. This is a tool that is traditionally used in flat-bed die-cutting. The separating tool comprises various separating elements.

The article "Breaking out in the 3rd dimension; proven Meurer stripping technology in a new guise; Metal+Plastic presented an integrated system"; (Paper and Slides), Deutscher Fachverlag, Frankfurt, DE, Vol. 37, No. 3, 1 Mar. 2002, pages 36-39, XP001087264, ISSN: 0048-2897, pages 36, 39) discloses a stripping system comprising an upper stripping tool including multiple pins. The pins can be placed in 3 planes. In this way high counter forces can be avoided during stripping without a lower tool.

SUMMARY

It is an object herein to create a device for separating blanks, and a method for separating blanks.

This object is achieved in some examples of a blank separating device in which the at least one lower blank separating module has a relief that is matched to the relief of the at least one upper blank separating module. Additionally, in some examples, the method includes that the relief of the at least one lower blank separating module is matched to the relief of the at least one upper blank separating module.

The advantages to be achieved with the invention are in particular that a device and a method for separating blanks were created, which do not exhibit any negative properties with respect to the quality of the blank separation compared to a flat-bed die-cutter, yet achieve a production speed that is adapted to a rotary die cutter. In particular, the increased production speed is achieved by the pile-wise and/or ream-wise blank separation in combination with a tool. With the aid of the tool, in combination with a suitable load introduction, a very flexibly settable force can be exerted on the partial pile and/or the ream for blank separation.

The device for blank separation was improved to the effect that it is also possible to process connected blanks without difficulty. Moreover, it is also possible to easily separate blanks that include very narrow crosspieces therebetween from one another and/or from the offcut pieces. Previously, the blank separation of very thin crosspieces and/or connected blanks on a sheet was impeded by the pins in a matrix being arranged spaced apart from one another. Through the use of a tool, it is also possible to separate connected blanks and/or blanks that have a narrow crosspiece from one another and/or from the offcut pieces. As a result of the invention, additional process steps, such as a separation of blanks prior to a subsequent process, such as, for example, a folding and/or gluing process, can be dispensed with. In particular, it is then possible to position multiple blanks on a shared sheet, thereby reducing the amount of waste.

A shear movement between connected blanks can be achieved by an additional plane in the relief in the lower module. The lower blank separating module can thus be adapted more flexibly to the properties of the blanks and/or to a tool and/or to the upper blank separating module. This is accomplished in particular in that supporting elements can be arranged in at least three positions. This is necessary since the waste is preferably located on one plane, and the blanks are deposited onto the other two planes. A large part of the processing jobs relates to an arrangement of connected blanks on a sheet. The blanks themselves have to be arranged on two planes so as to generate a shear movement for the separation of the connected blanks.

Another advantage to be achieved with the invention is in particular that an additional tool is used, which can be manufactured using simple means. In particular, such a tool resembles a tool in a blank separating unit in a flat-bed die-cutter. Such a tool can be produced very easily and cost-effectively in terms of its design. Additionally, increased flexibility can be achieved through the use of a matrix of pins. A limitation due to the spacing of pins can thus advantageously be avoided.

Another advantage to be achieved with the invention is that a digital method for separating blanks was created. In a preferred embodiment, each pin of a matrix of pins can be positioned, for example, by means of a drive. In particular, each pile and/or each ream of sheets can include different blanks. By using a shared control unit including an upstream digital die-cutting machine, for example a laser die-cutter, an automated digital process can be established.

Another advantage to be achieved with the invention is, in particular, that a job change can take place more quickly, and high reliability is ensured. This is accomplished in particular by the simple and rapid positioning of the pins, in particular by means of a stencil or closing elements.

BRIEF DESCRIPTION OF THE DRAWINGS

Exemplary embodiments of the invention are illustrated in the drawings and will be described in greater detail below. The drawings show.

DETAILED DESCRIPTION

Figure 1:
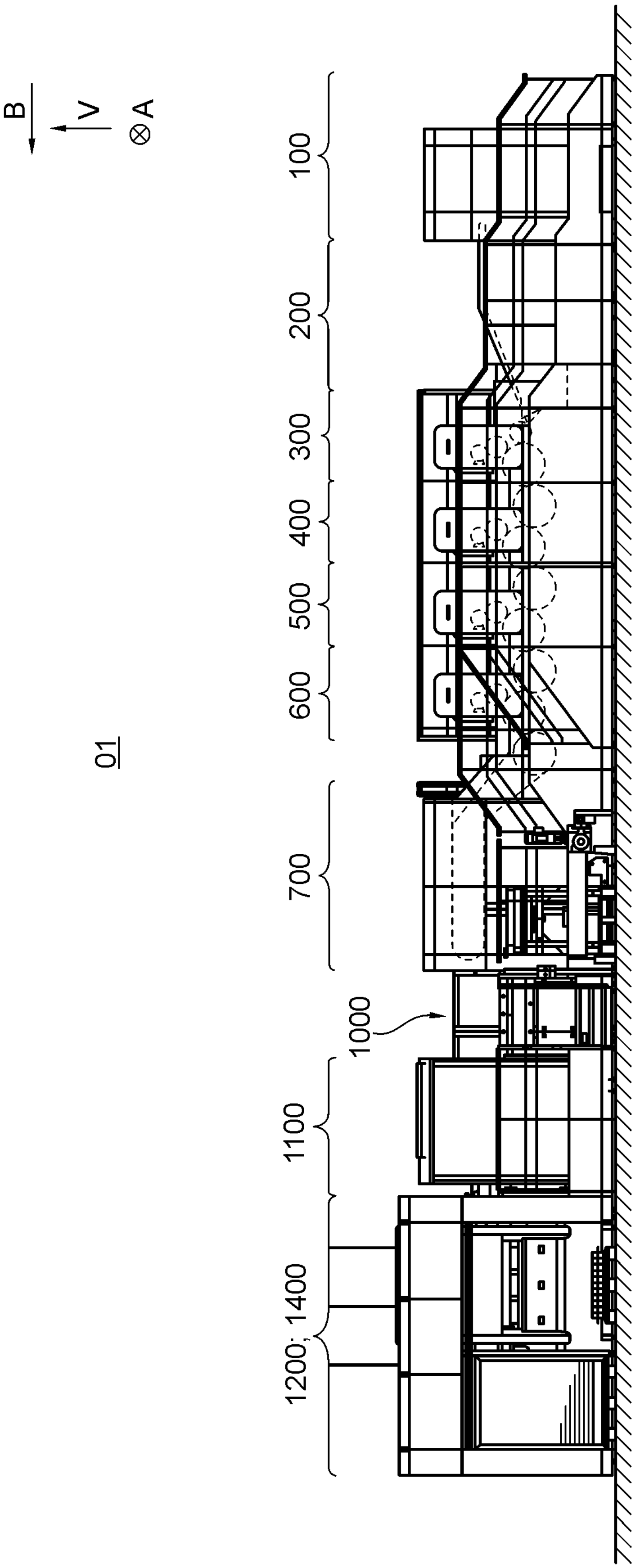
FIG. 1 a side view of the processing machine in a preferred embodiment.
Figure 2:
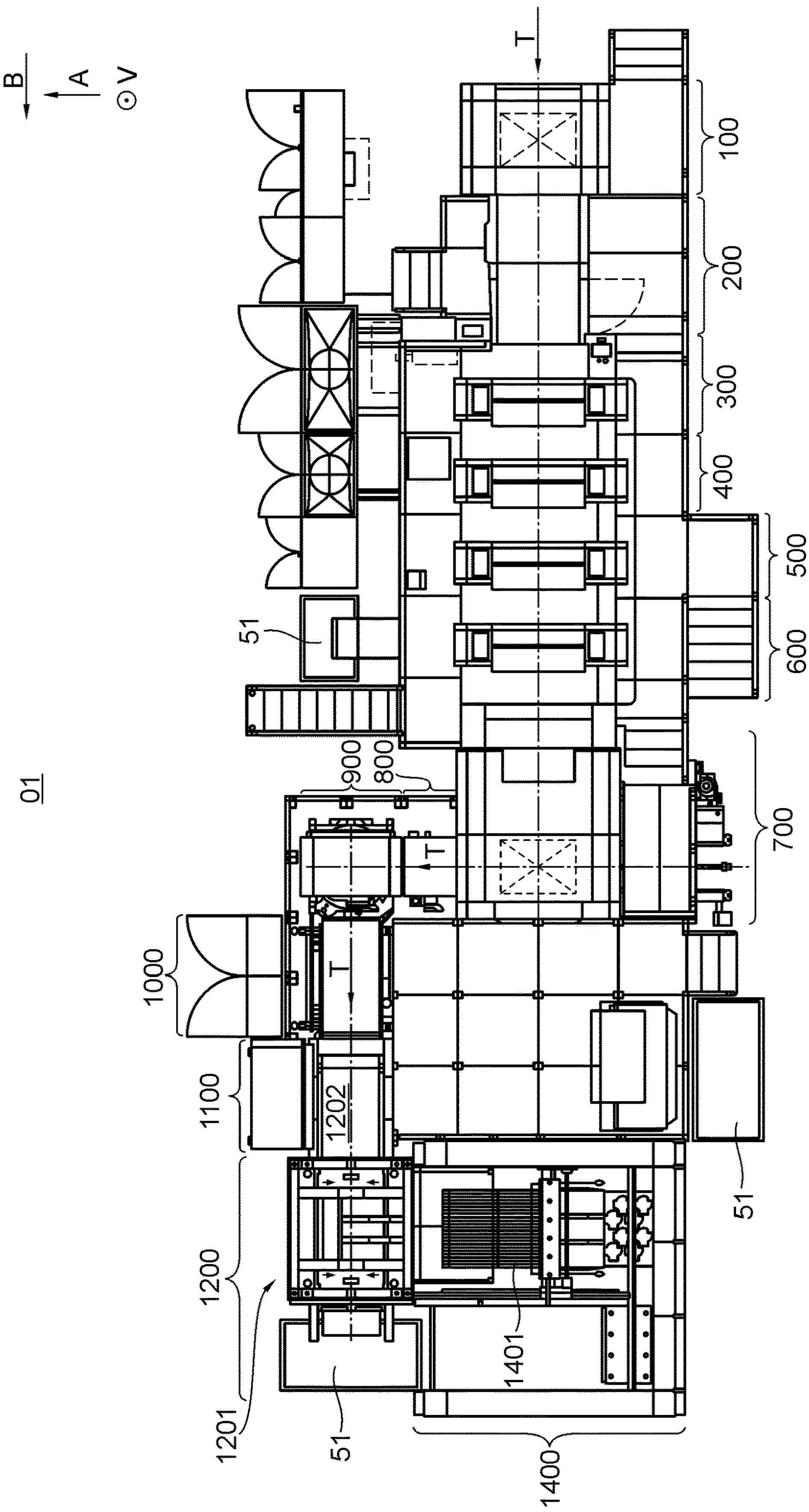
FIG. 2 an overview of the processing machine in a preferred embodiment in a top view.
Figure 3:
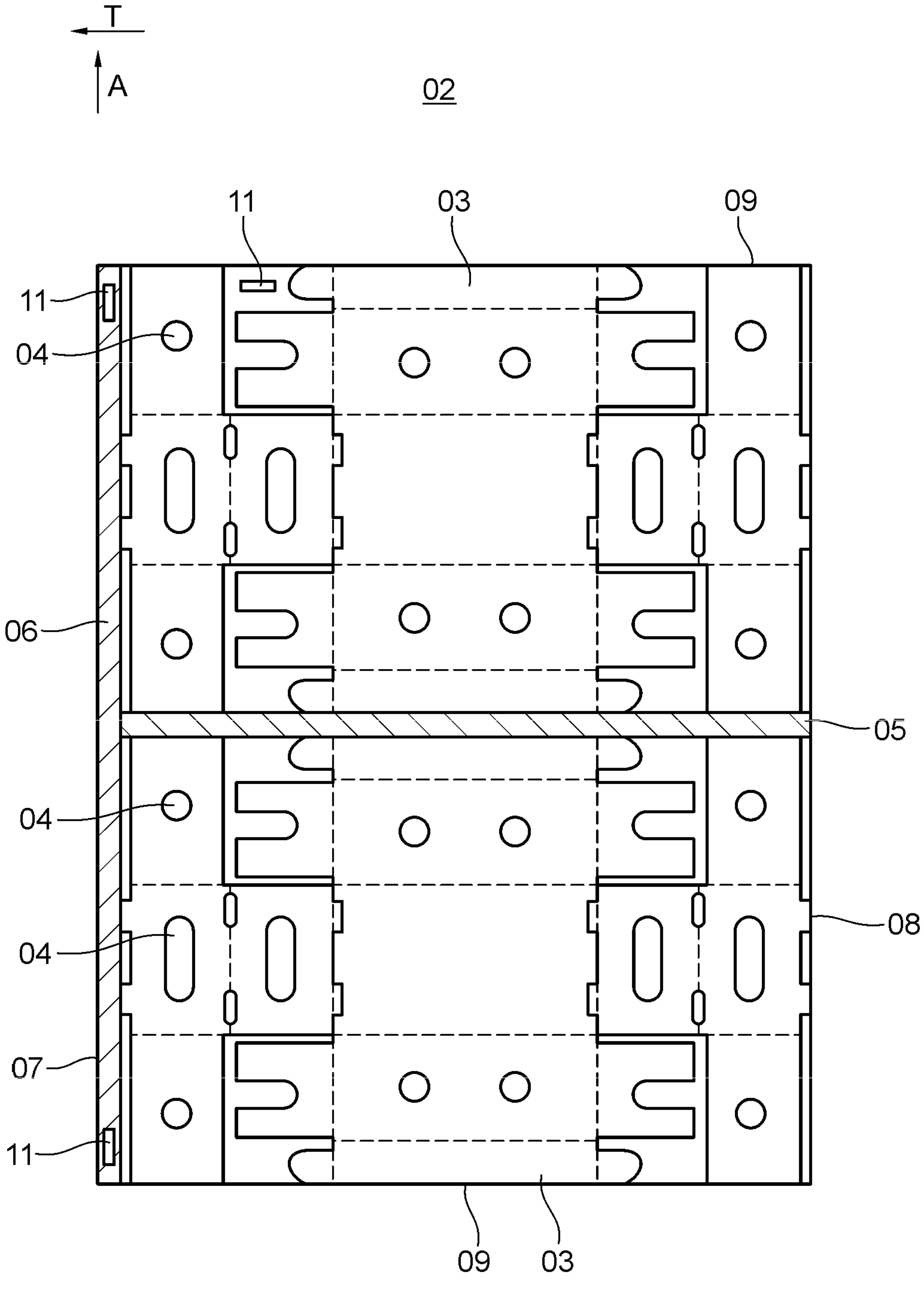
FIG. 3 an exemplary sheet including two blanks and offcut pieces, wherein the two blanks are separated from one another by a crosspiece.
Figure 4:
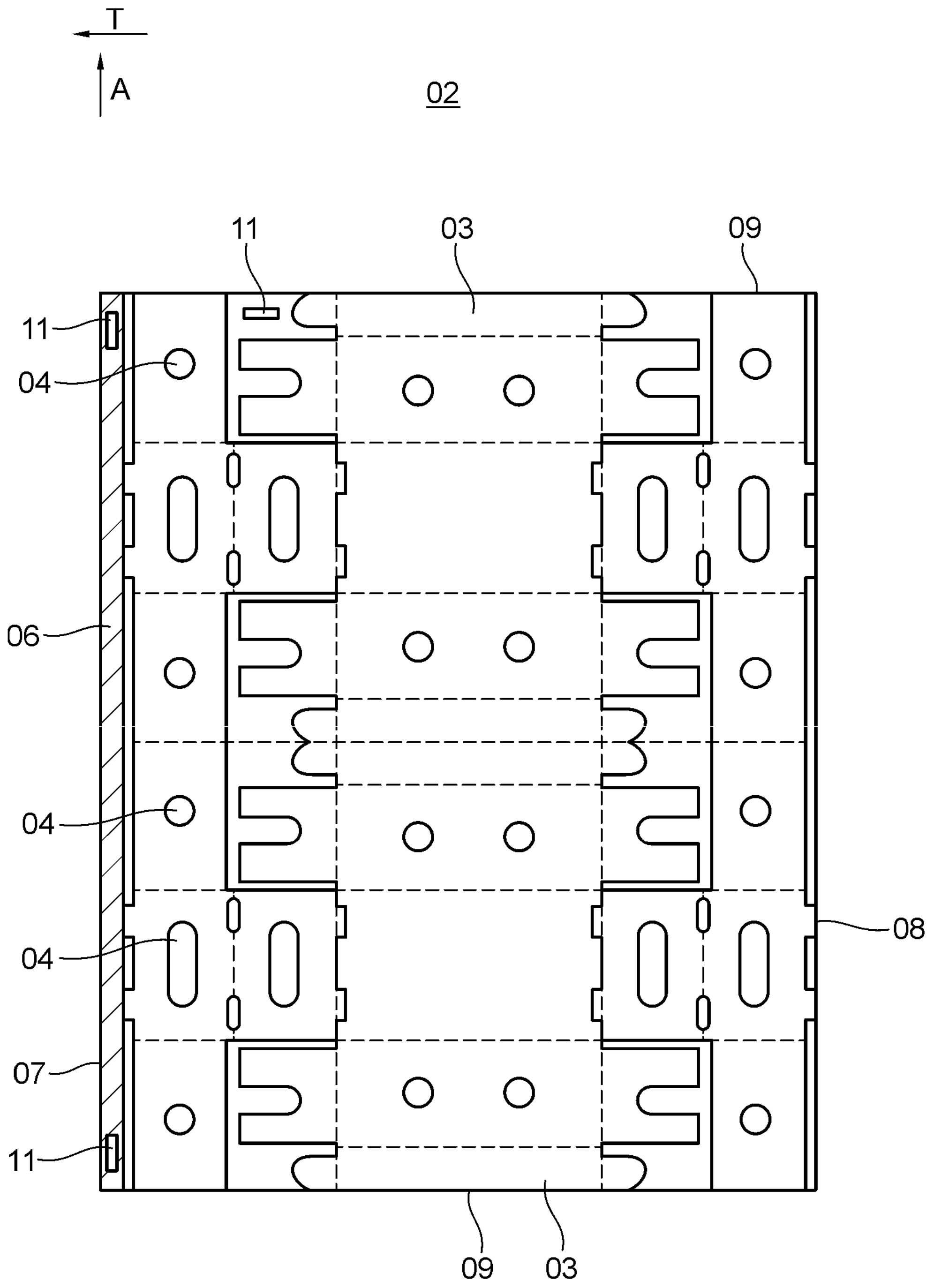
FIG. 4 another exemplary sheet including two blanks and offcut pieces, wherein the two blanks are arranged directly next to one another and so as to be connected.
Figure 5:
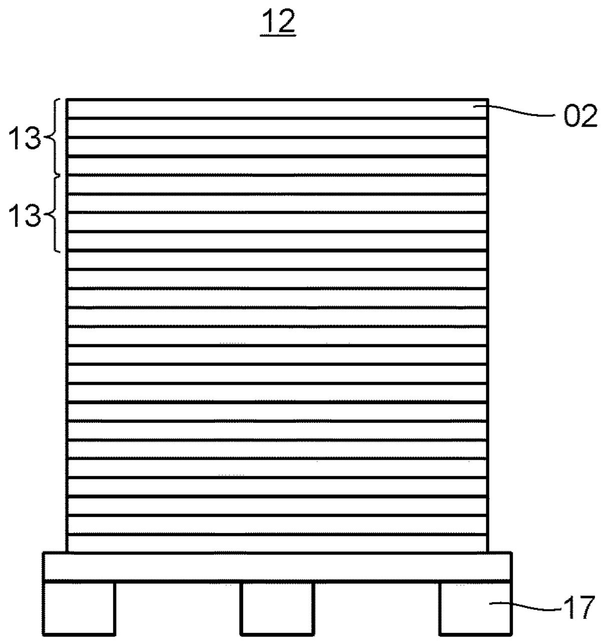
FIG. 5 a schematic representation of a pile of sheets comprising multiple partial piles.
Figure 6:
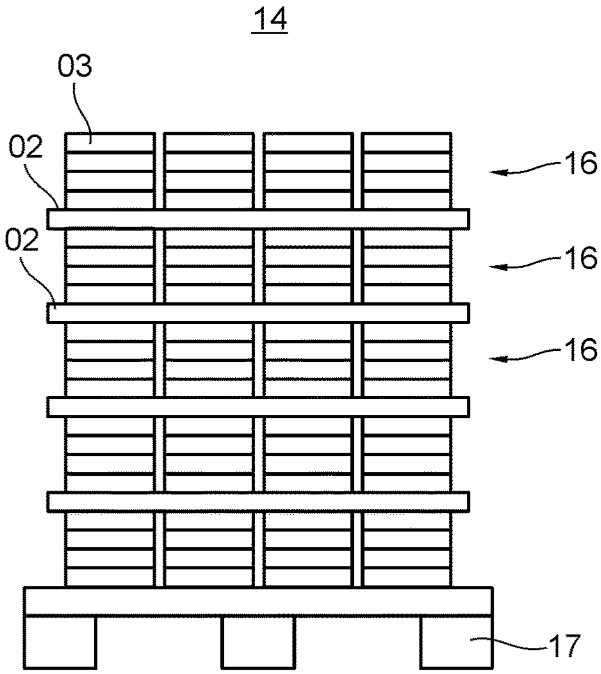
FIG. 6 a schematic representation of a pile of blanks comprising multiple partial blank piles, which are each separated from one another by way of example by an intermediate sheet.
Figure 7:
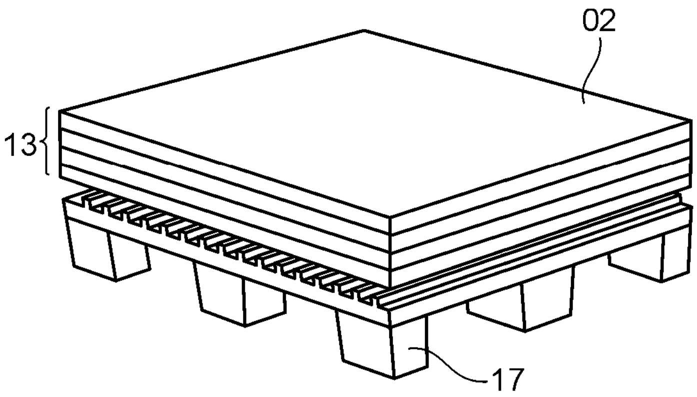
FIG. 7 a schematic representation of an individual partial pile of sheets.
Figure 8:
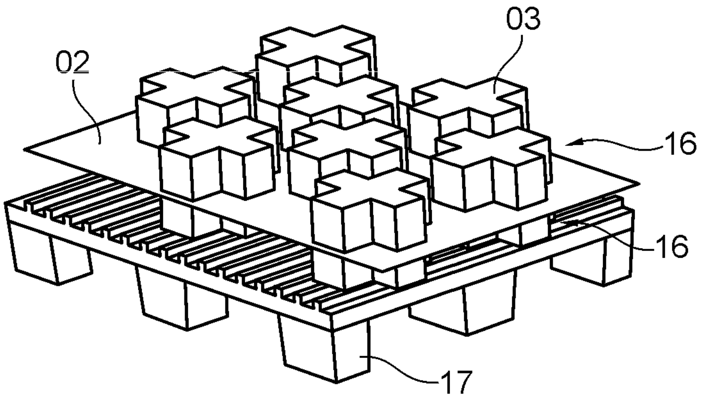
FIG. 8 a schematic representation of a pile of blanks in the blank delivery including an intermediate sheet.
Figure 9:
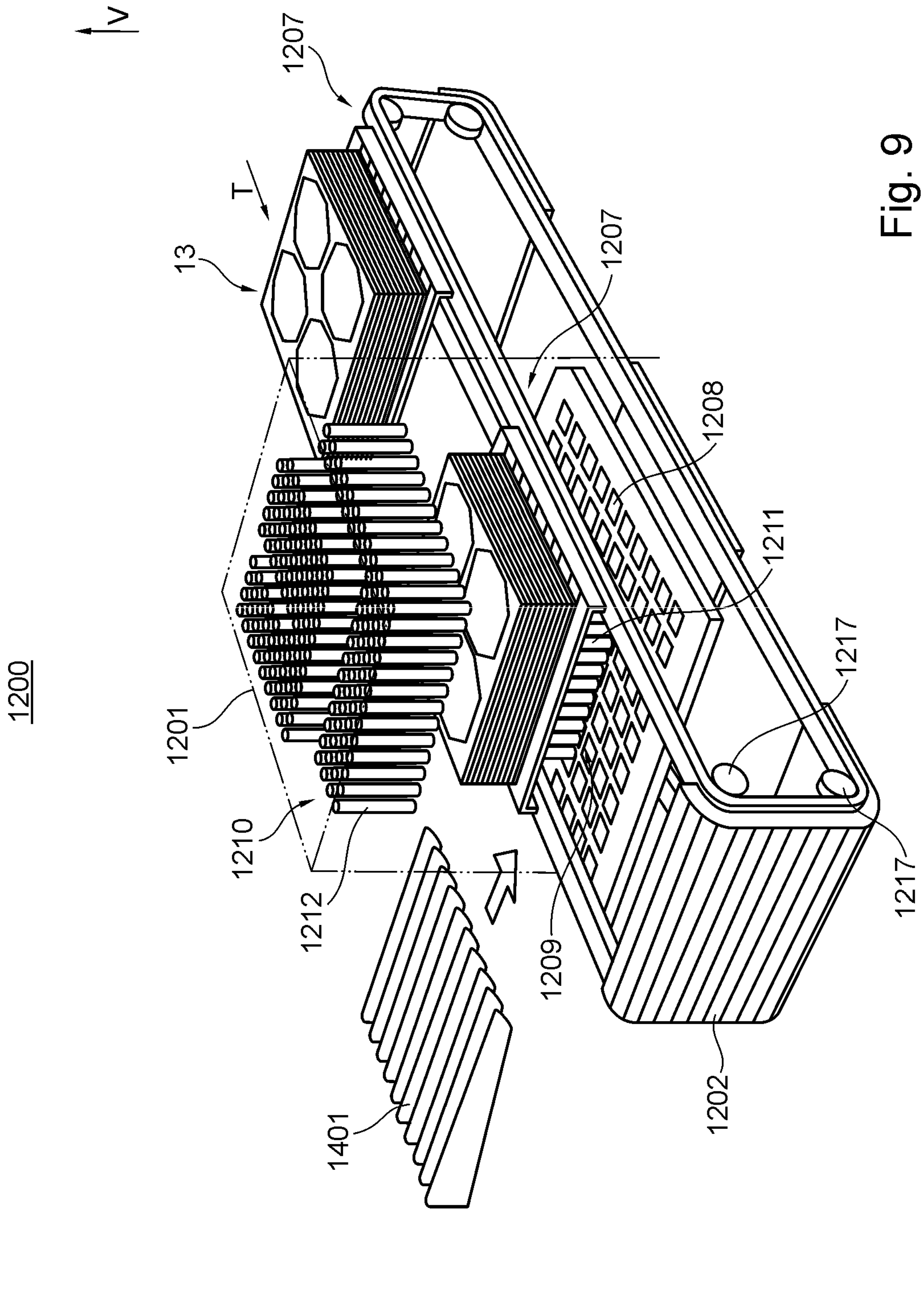
FIG. 9 a schematic representation of the device for separating blanks in a preferred embodiment.
Figure 10:
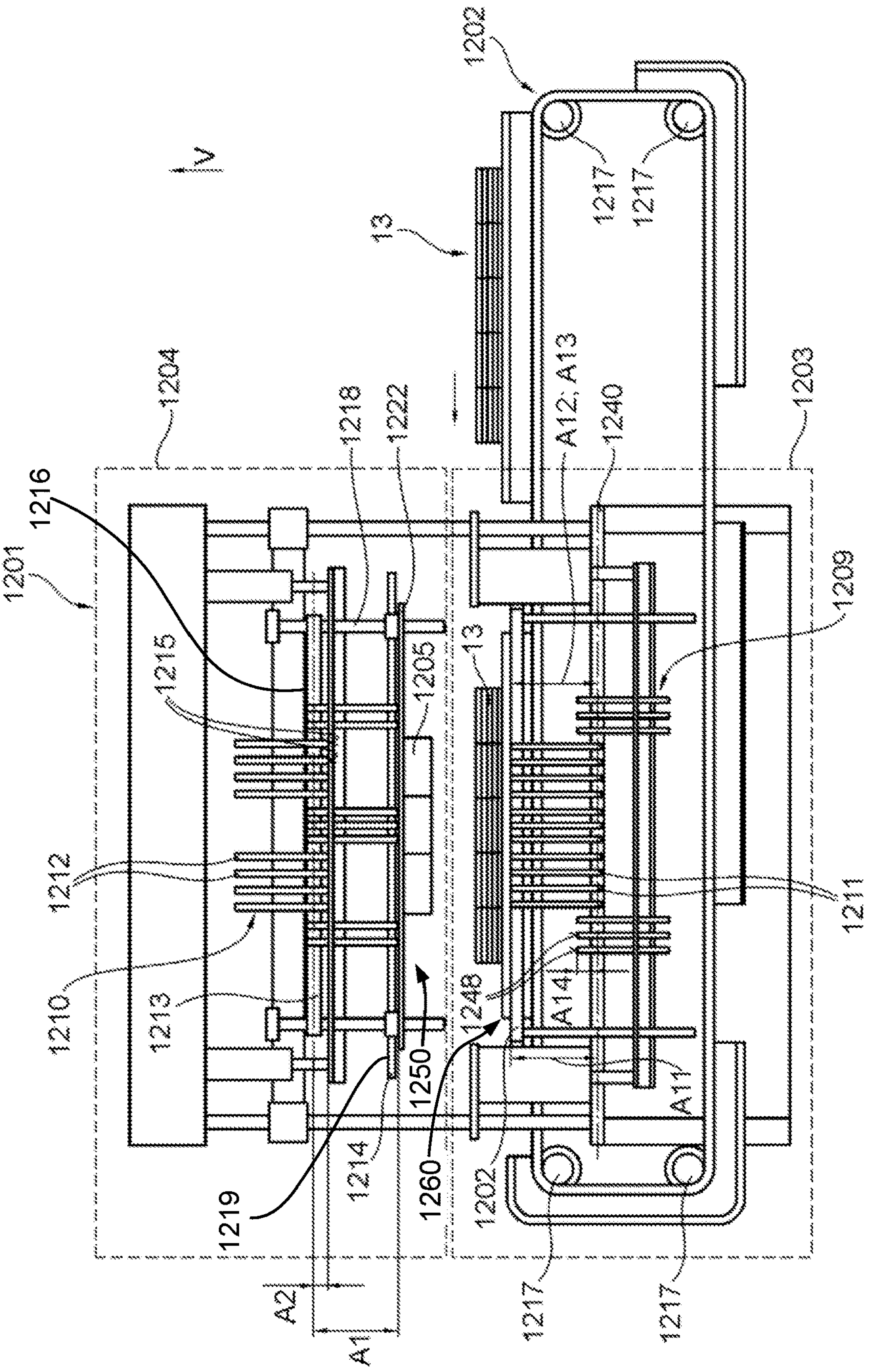
FIG. 10 a schematic representation of the device for separating blanks in a side view prior to the separation process.
Figure 11:
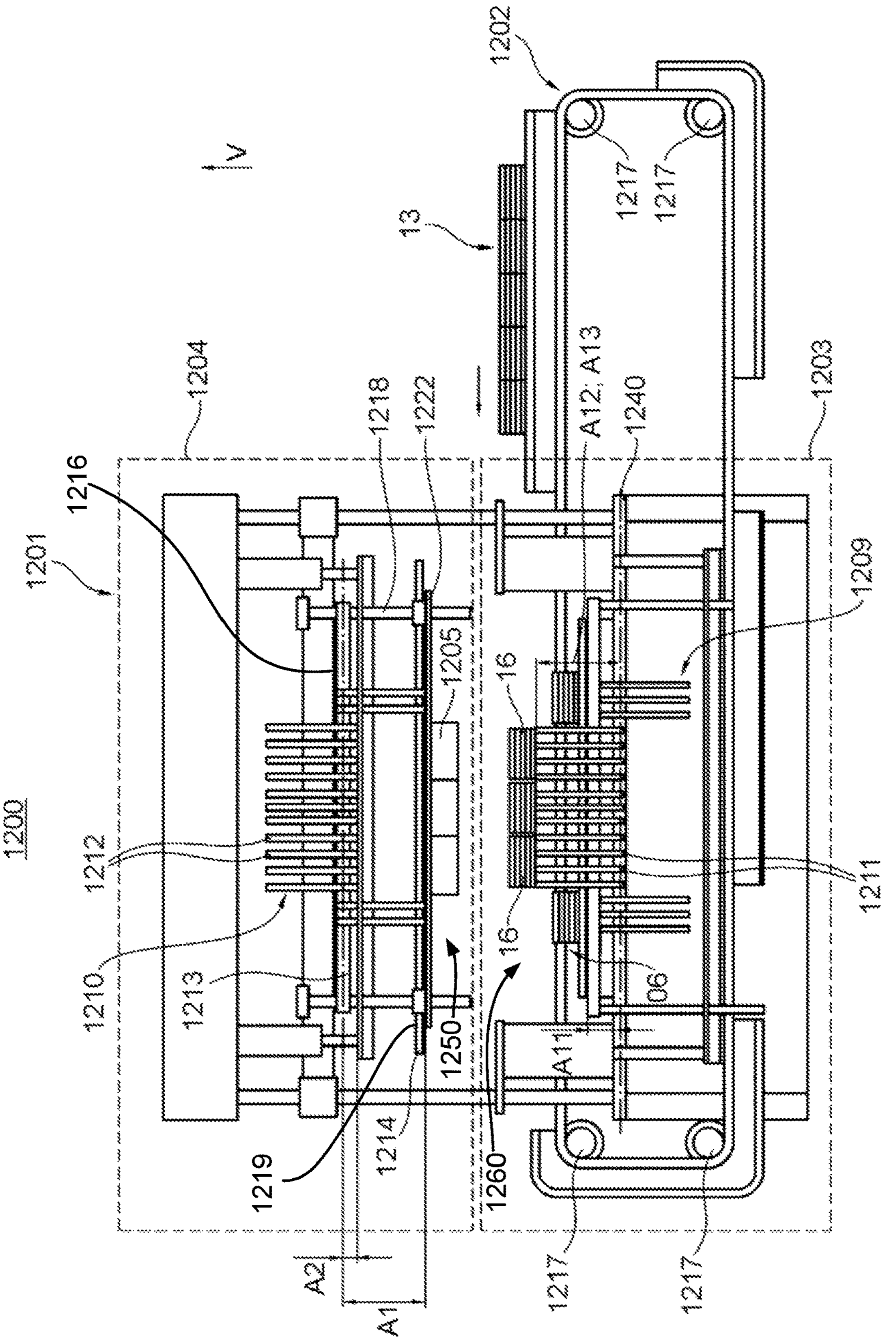
FIG. 11 a schematic representation of the device for separating blanks in a side view after the separation process.
Figure 12:
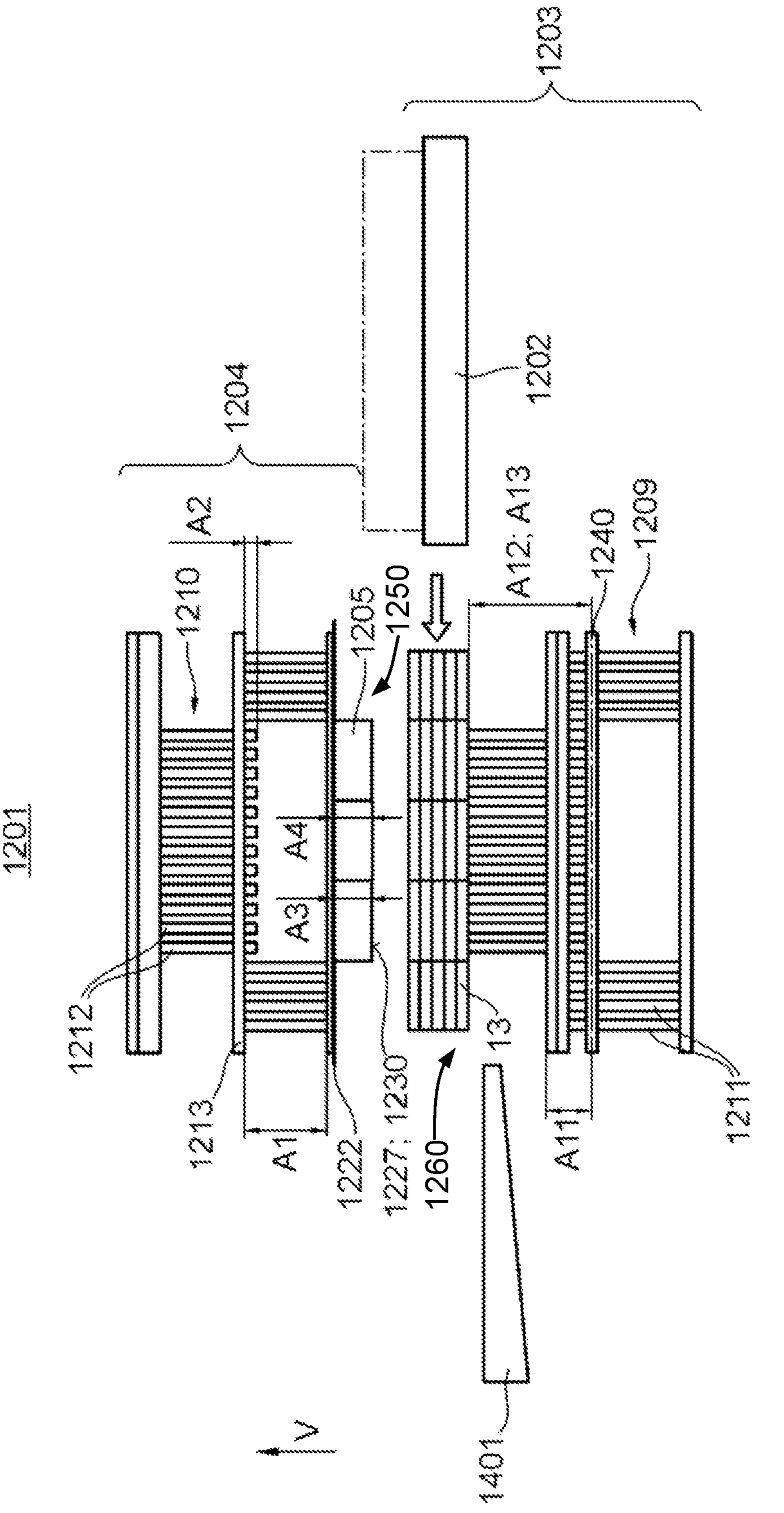
FIG. 12 a schematic representation of the device for separating blanks in a side view in a preferred embodiment prior to the separation process in a simplified illustration.
Figure 13:
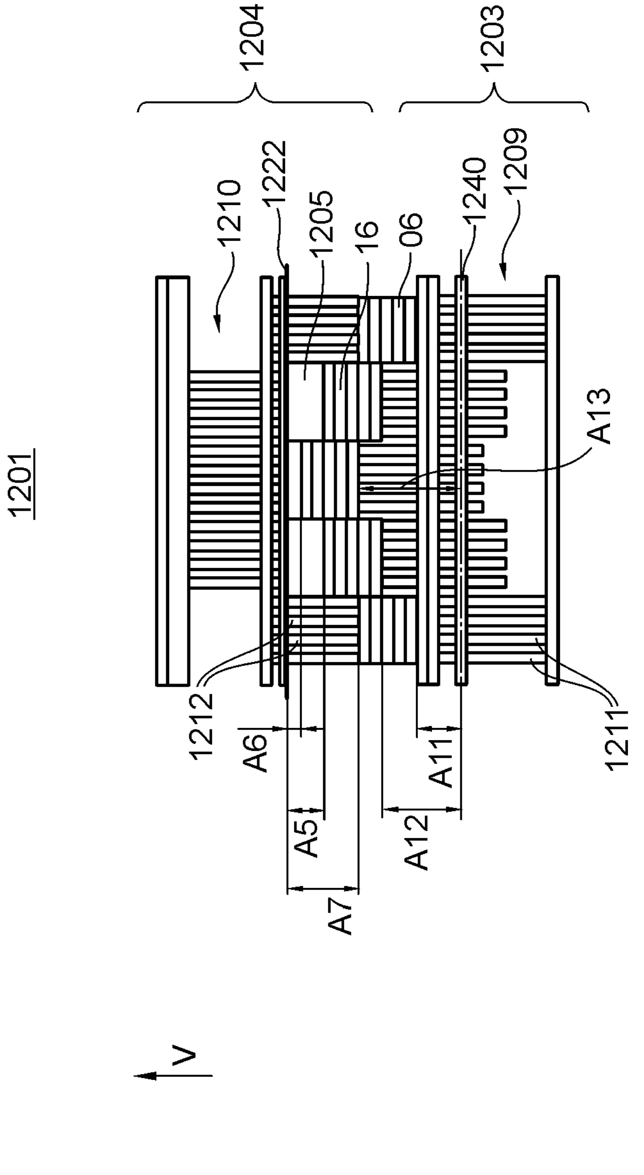
FIG. 13 a schematic representation of the device for separating blanks in a side view during the separation process in a simplified illustration.
Figure 14:
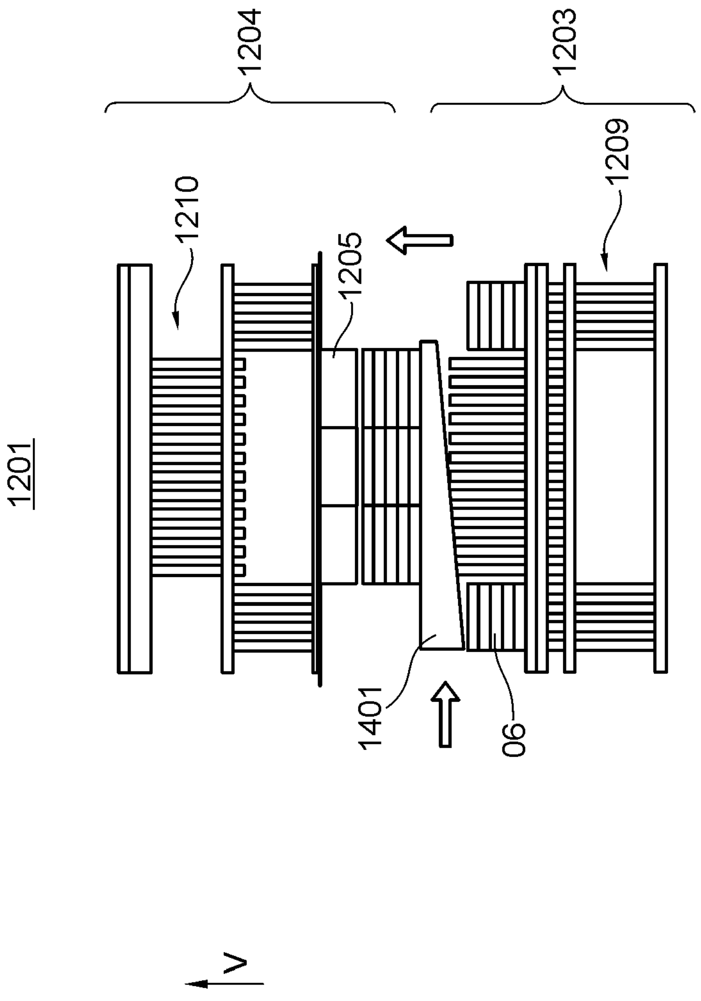
FIG. 14 a schematic representation of the device for separating blanks in a side view after the separation process in a simplified illustration.
Figure 15:
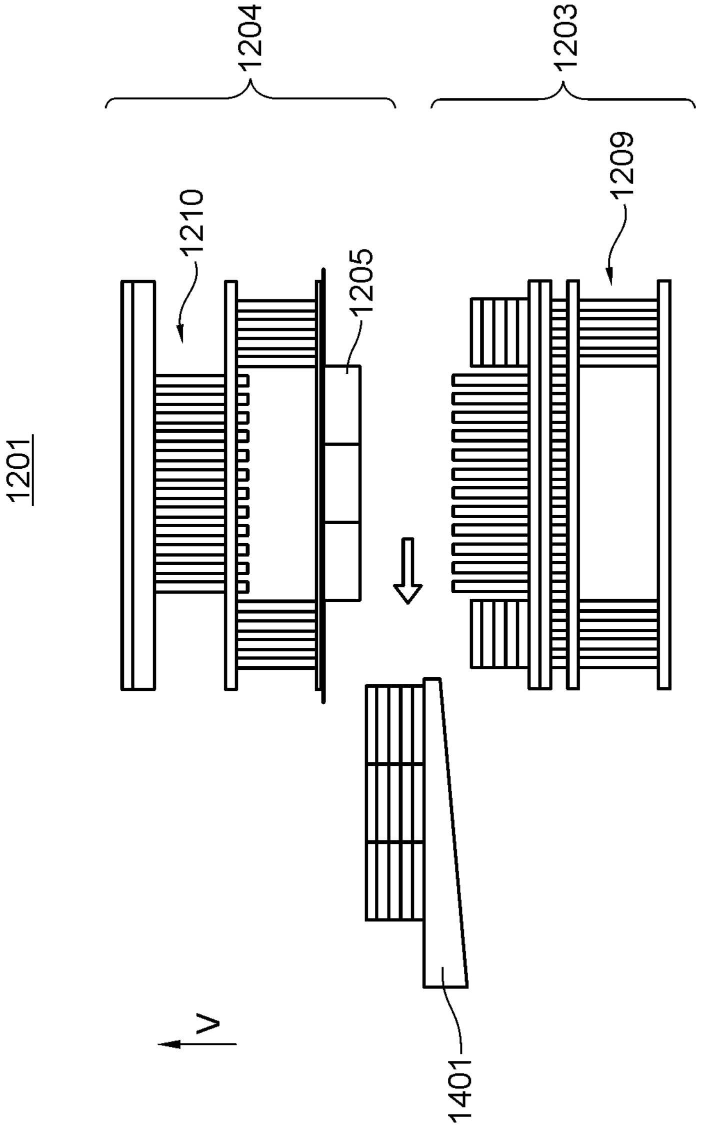
FIG. 15 a schematic representation of the device for in a side view after the separation of the blanks in a side view after removal of the partial blank pile by means of a rake.
Figure 16:
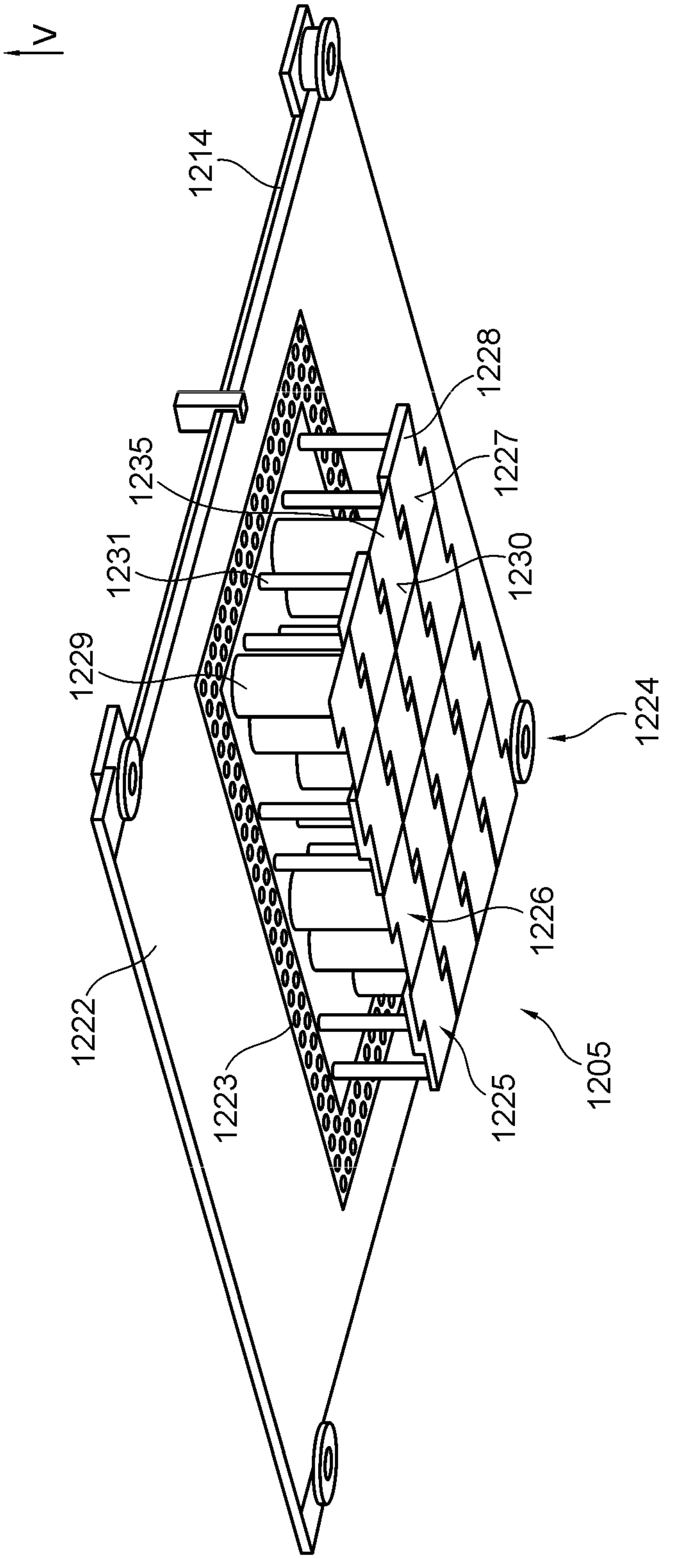
FIG. 16 a perspective representation of an upper blank separating tool for a separating cut in a preferred embodiment.
Figure 17:
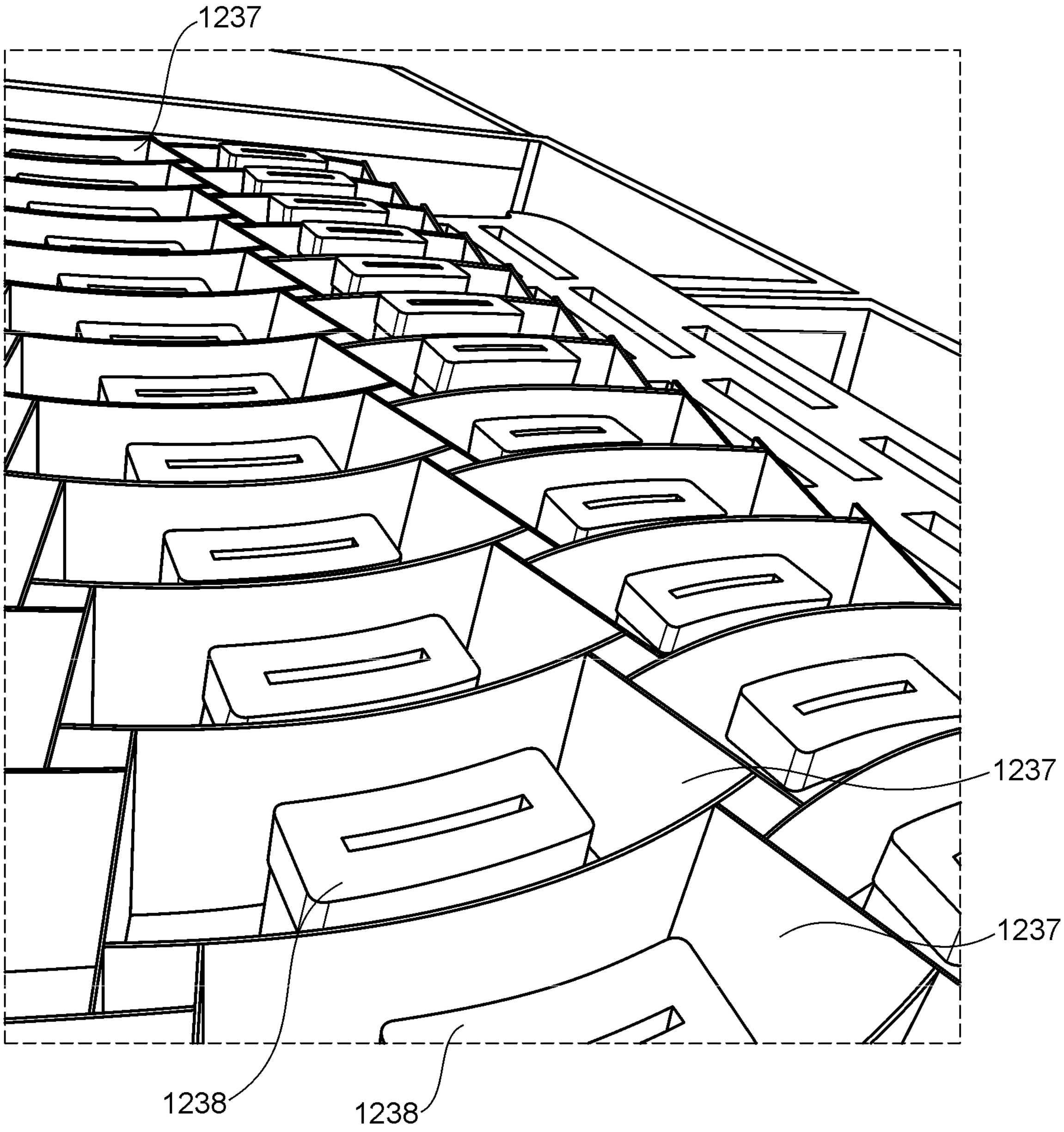
FIG. 17 a perspective representation of an upper blank separating tool for an intermediate cut in a preferred embodiment.
Figure 18:
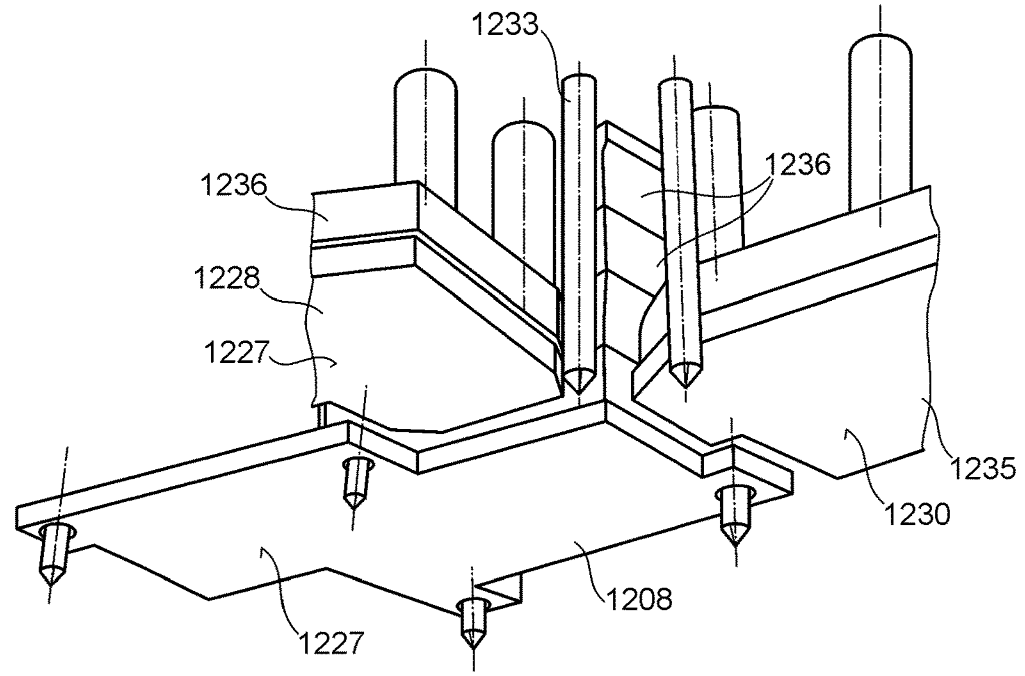
FIG. 18 a schematic representation of an upper blank separating tool comprising guide elements as well as elastic layers in another preferred embodiment.
Figure 19:
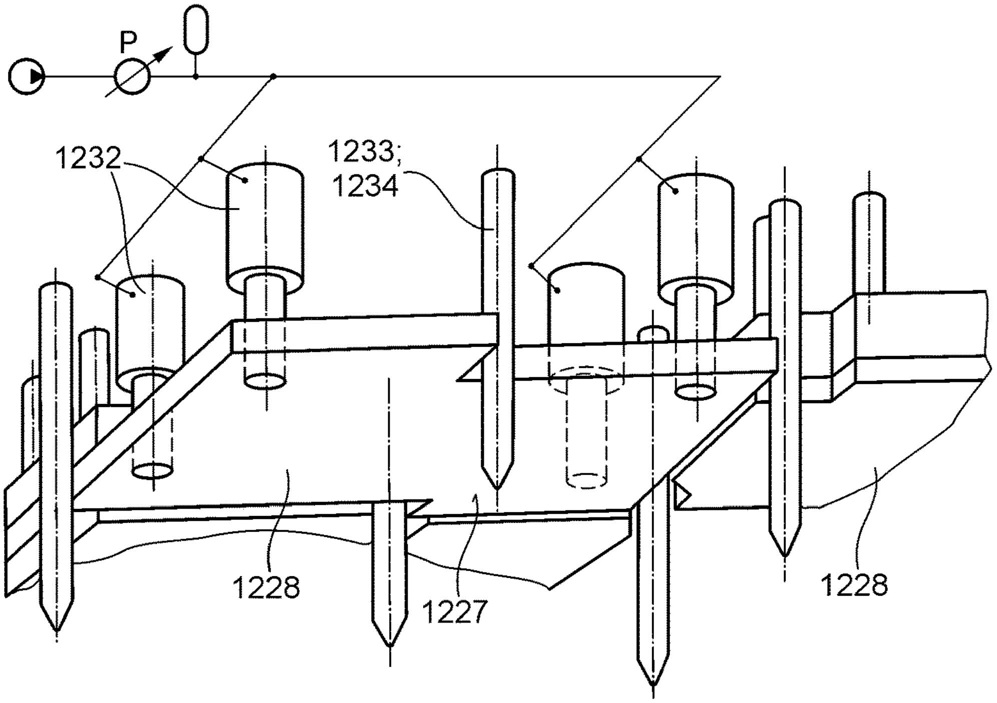
FIG. 19 a schematic representation of an upper blank separating tool comprising guide elements and pneumatic cylinders in another preferred embodiment.
Figure 20:
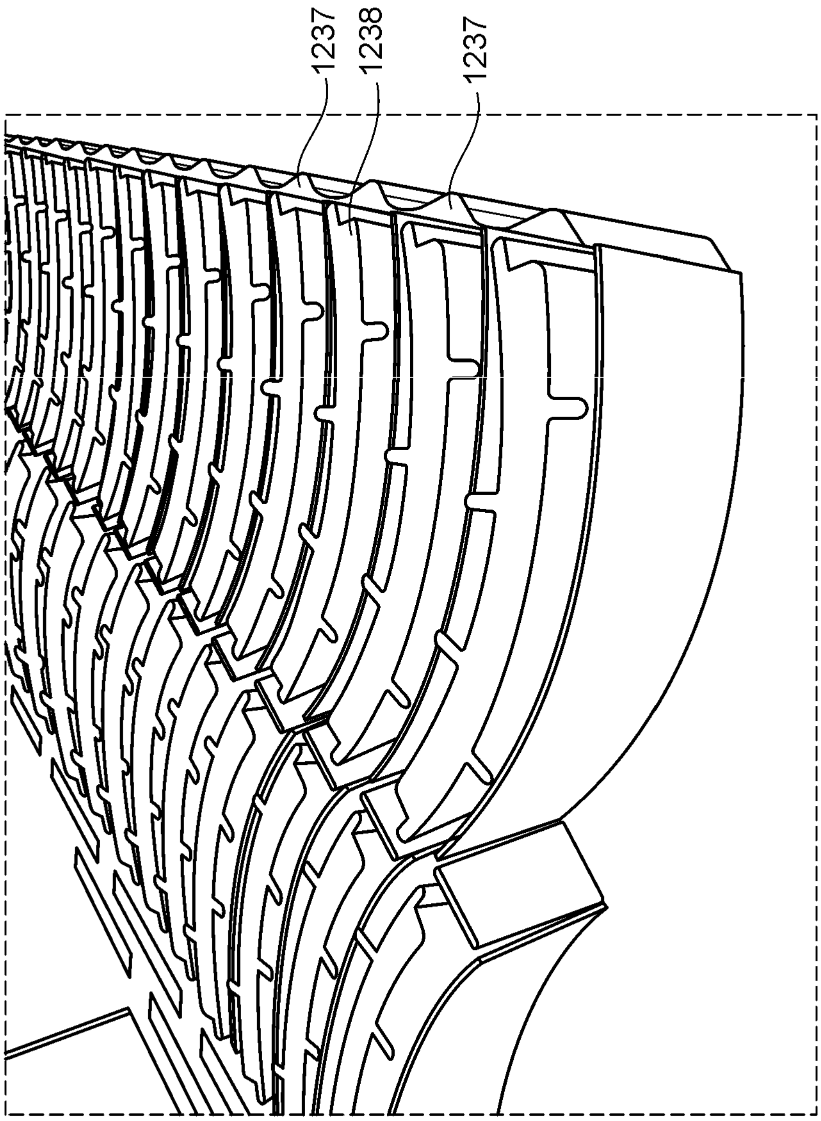
FIG. 20 a perspective representation of an upper blank separating tool for an intermediate step in a side view.
Figure 21:
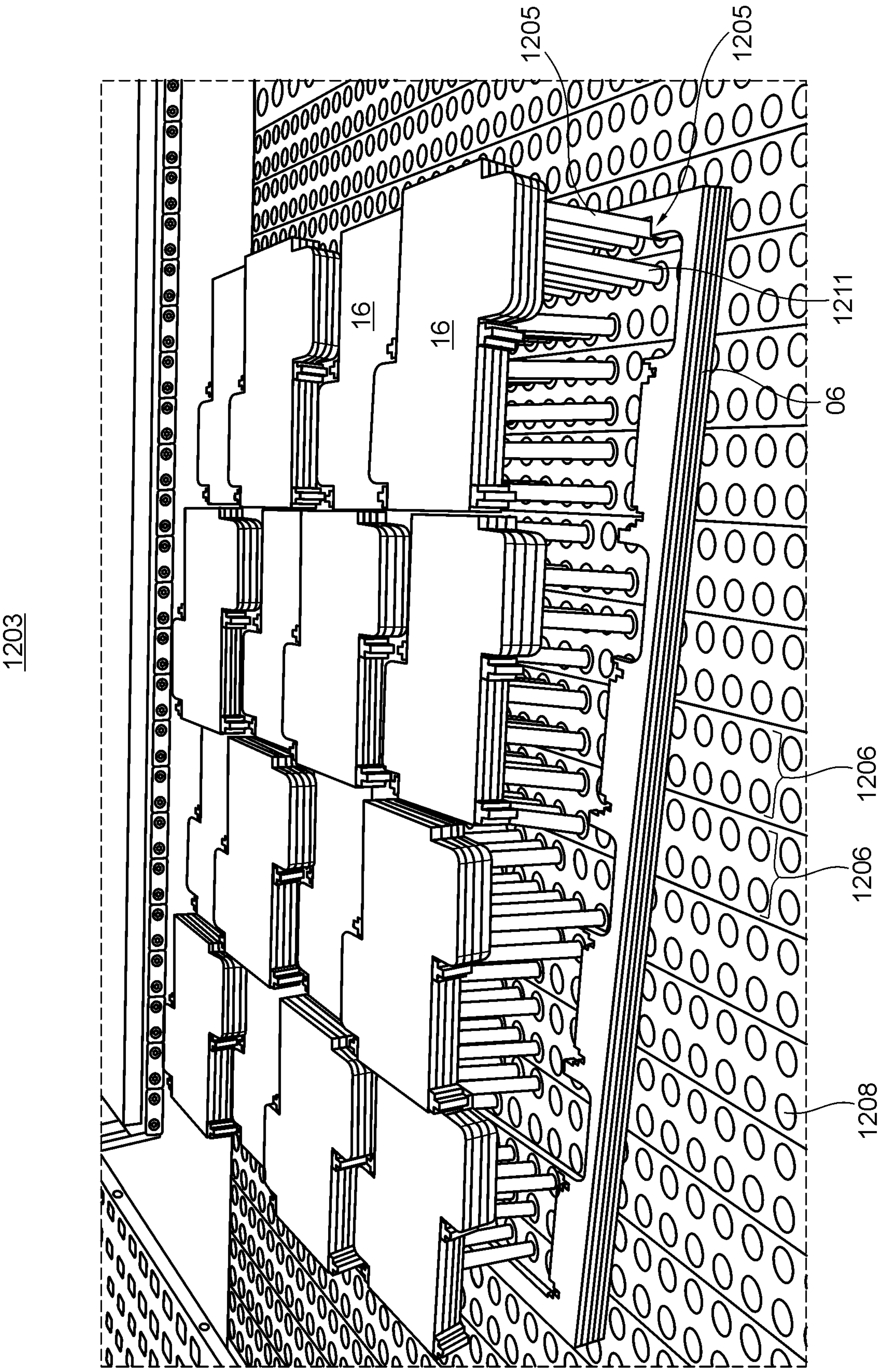
FIG. 21 a schematic representation of the lower blank separating module comprising multiple support elements in three positions.
Figure 22:
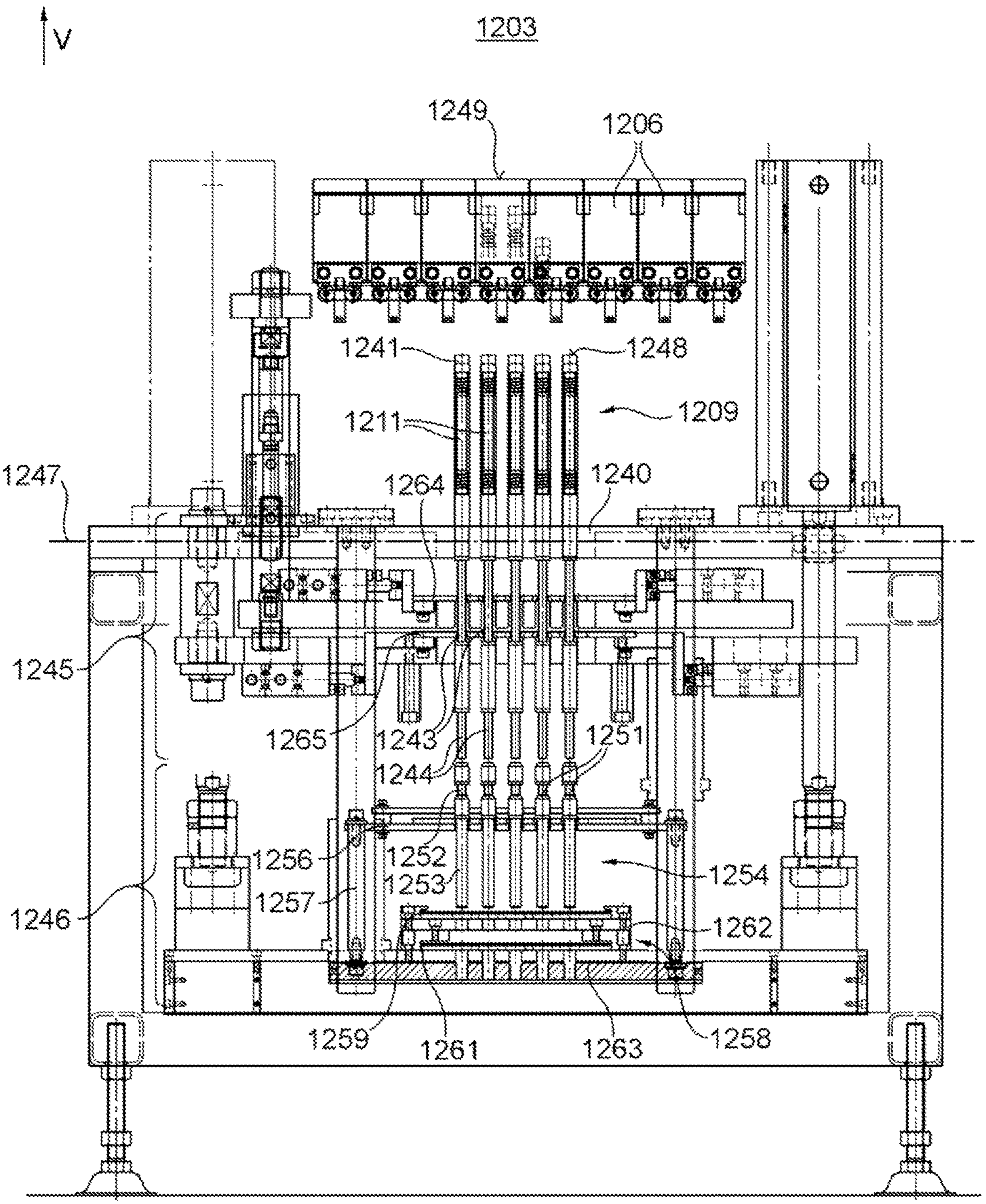
FIG. 22 an illustration of the lower blank separating module in a starting position in a preferred embodiment.
Figure 23:
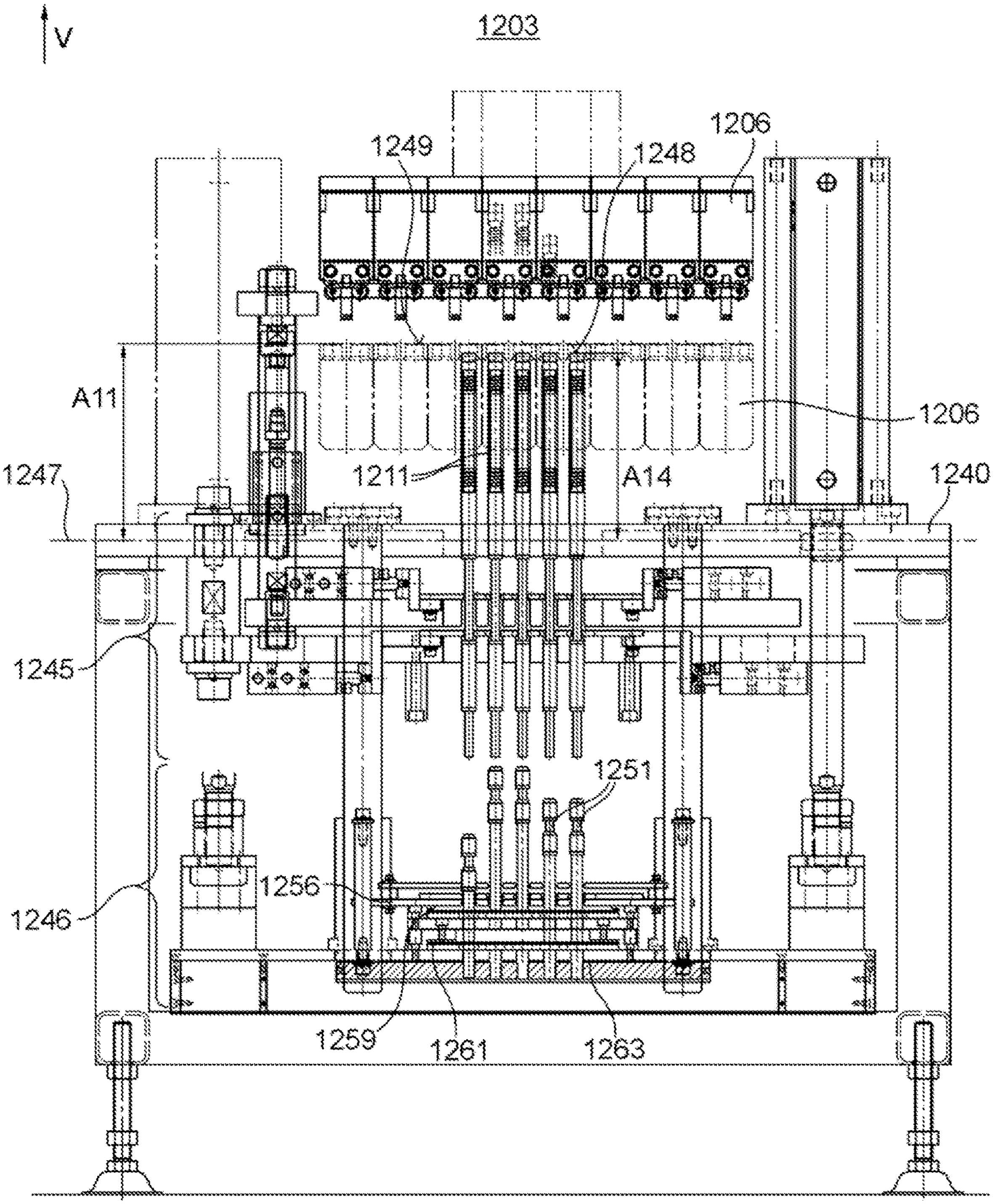
FIG. 23 an illustration of the lower blank separating module in a first positioning position in a preferred embodiment.
Figure 24:
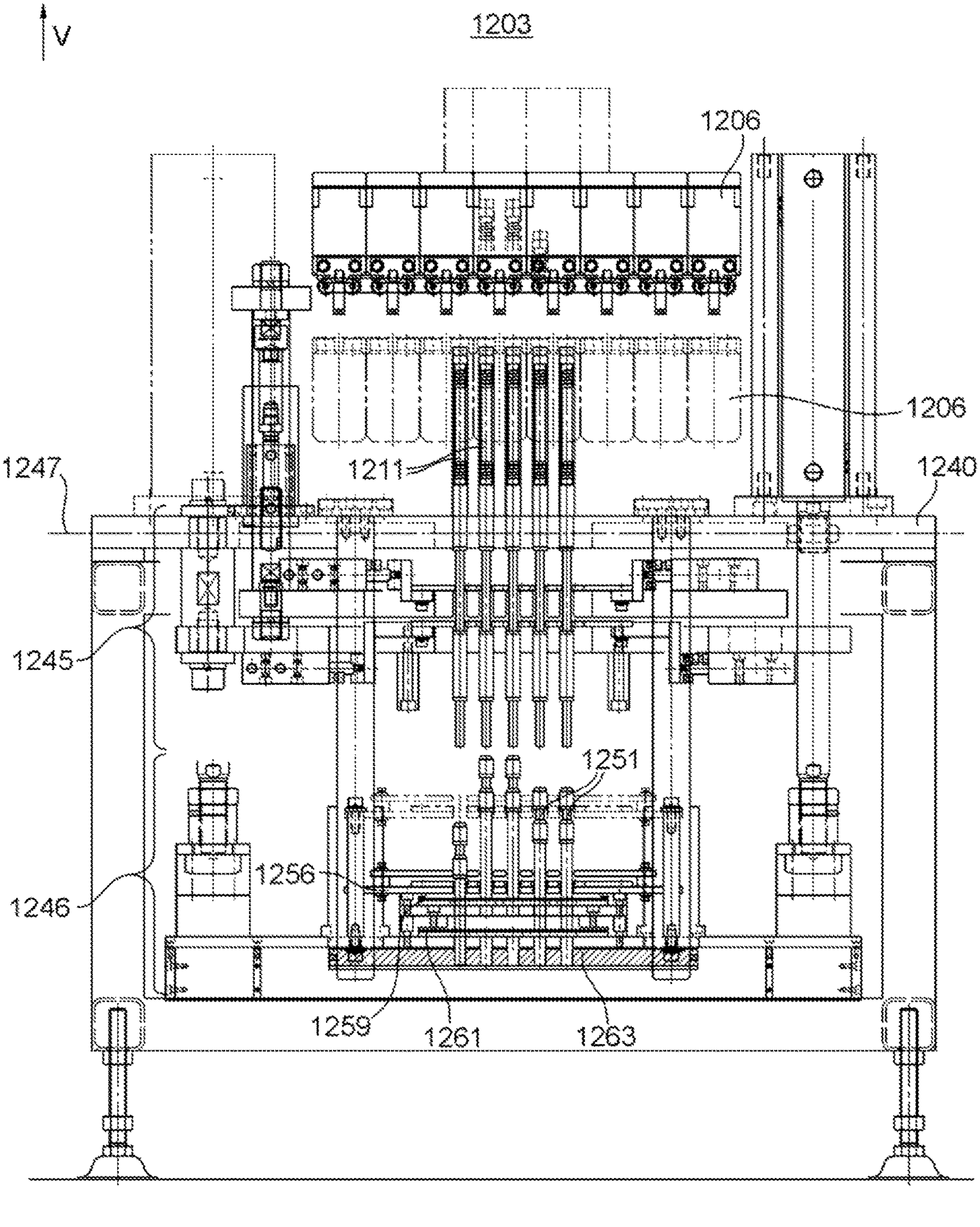
FIG. 24 an illustration of the lower blank separating module in a second positioning position in a preferred embodiment.
Figure 25:
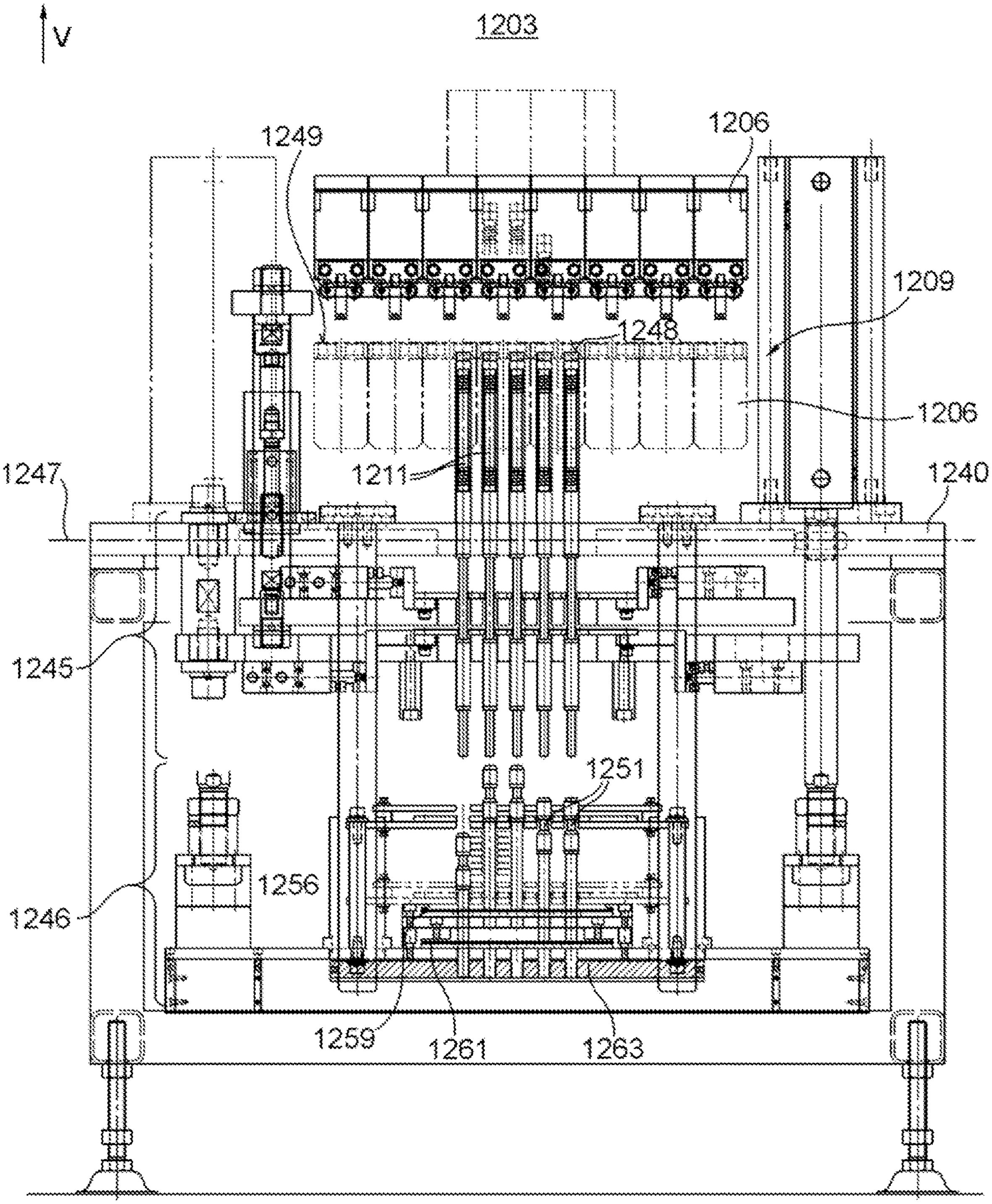
FIG. 25 an illustration of the lower blank separating module in a third positioning position in a preferred embodiment.
Figure 26:
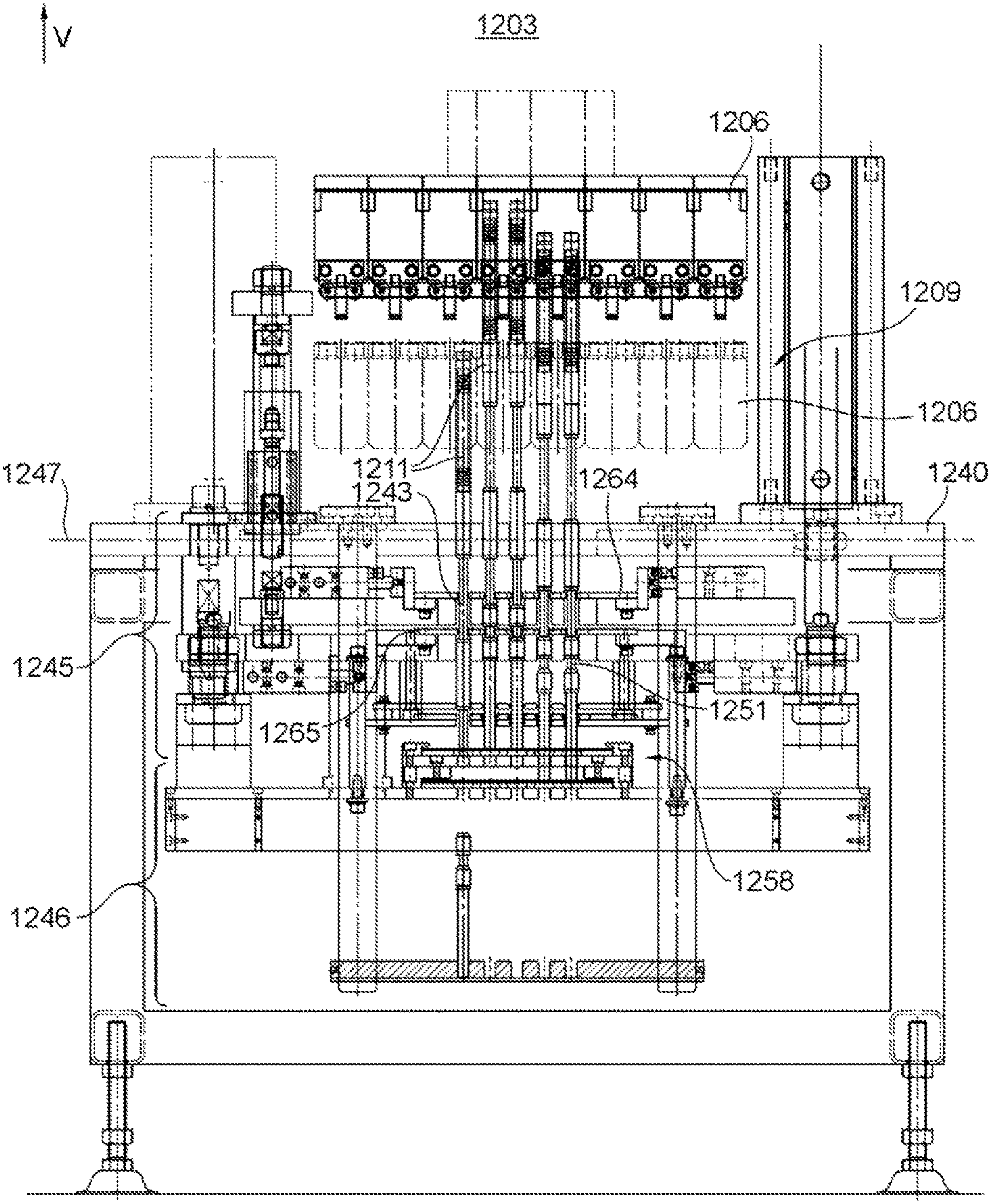
FIG. 26 an illustration of the lower blank separating module in a fourth positioning position in a preferred embodiment.
Figure 27:
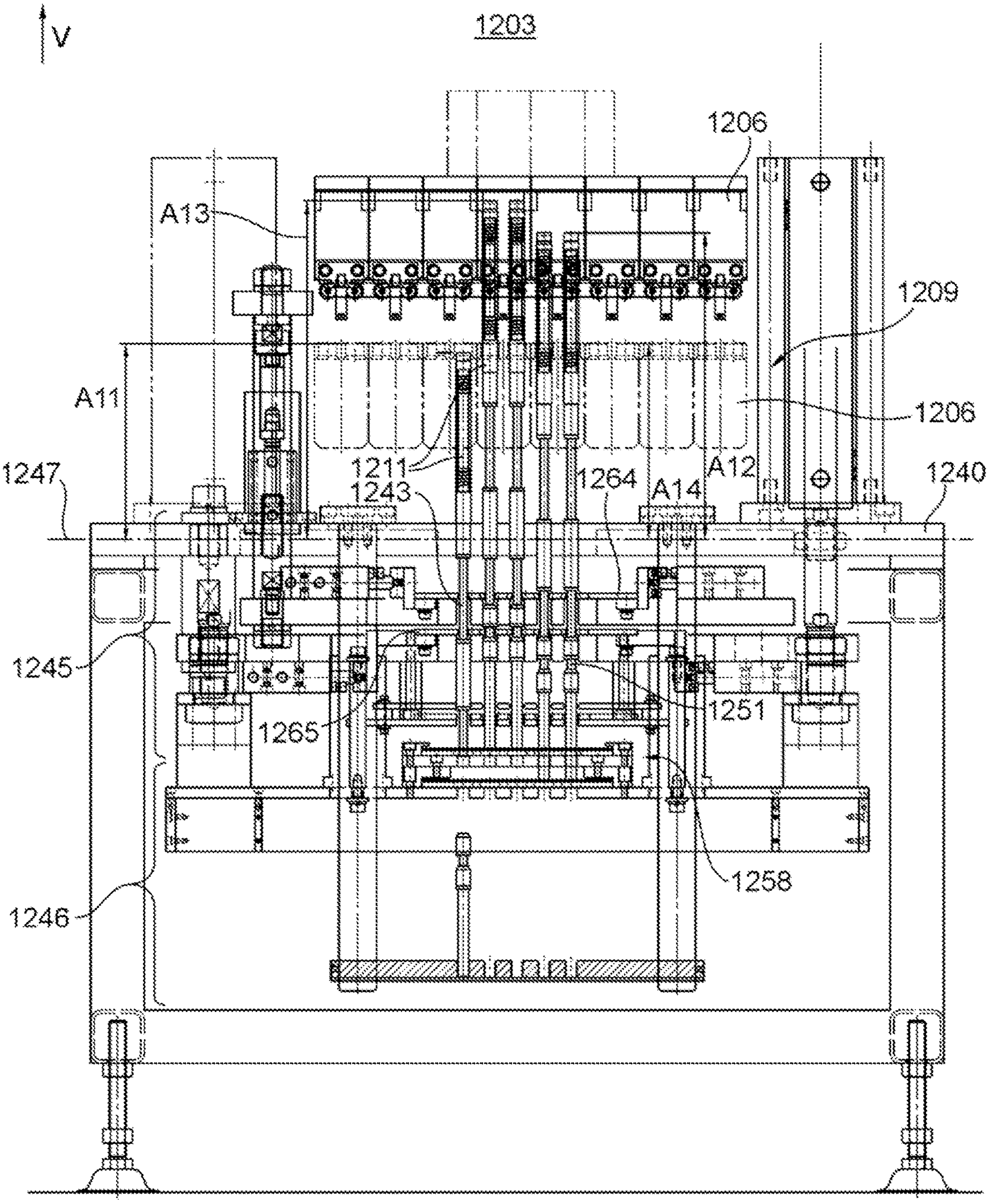
FIG. 27 an illustration of the lower blank separating module in a fifth positioning position in a preferred embodiment.
Figure 28:
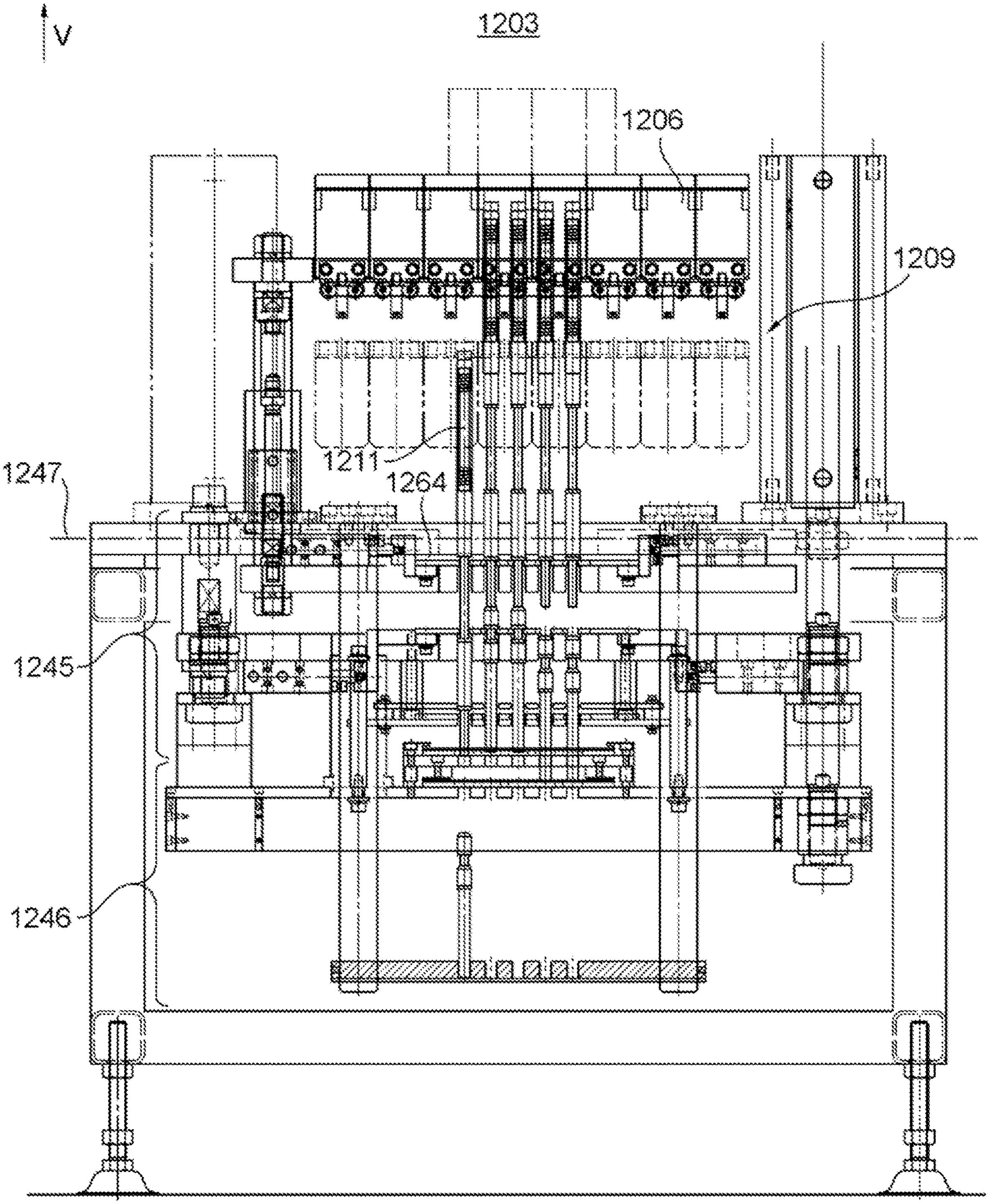
FIG. 28 an illustration of the lower blank separating module in a sixth positioning position in a preferred embodiment.
Figure 29:
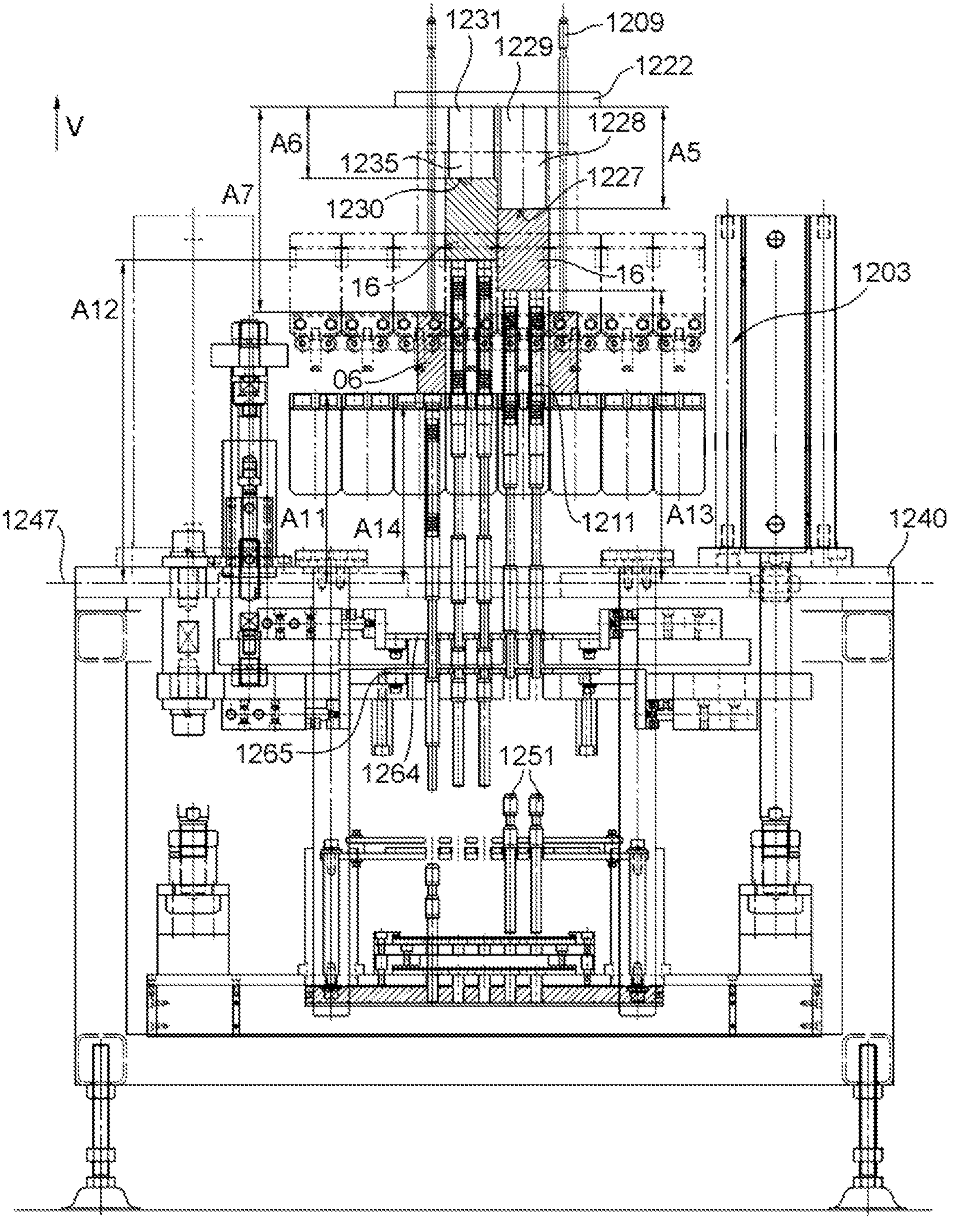
FIG. 29 an illustration of the lower blank separating module as well as of the upper blank separating tool during a separation process in a preferred embodiment.
Figure 30:
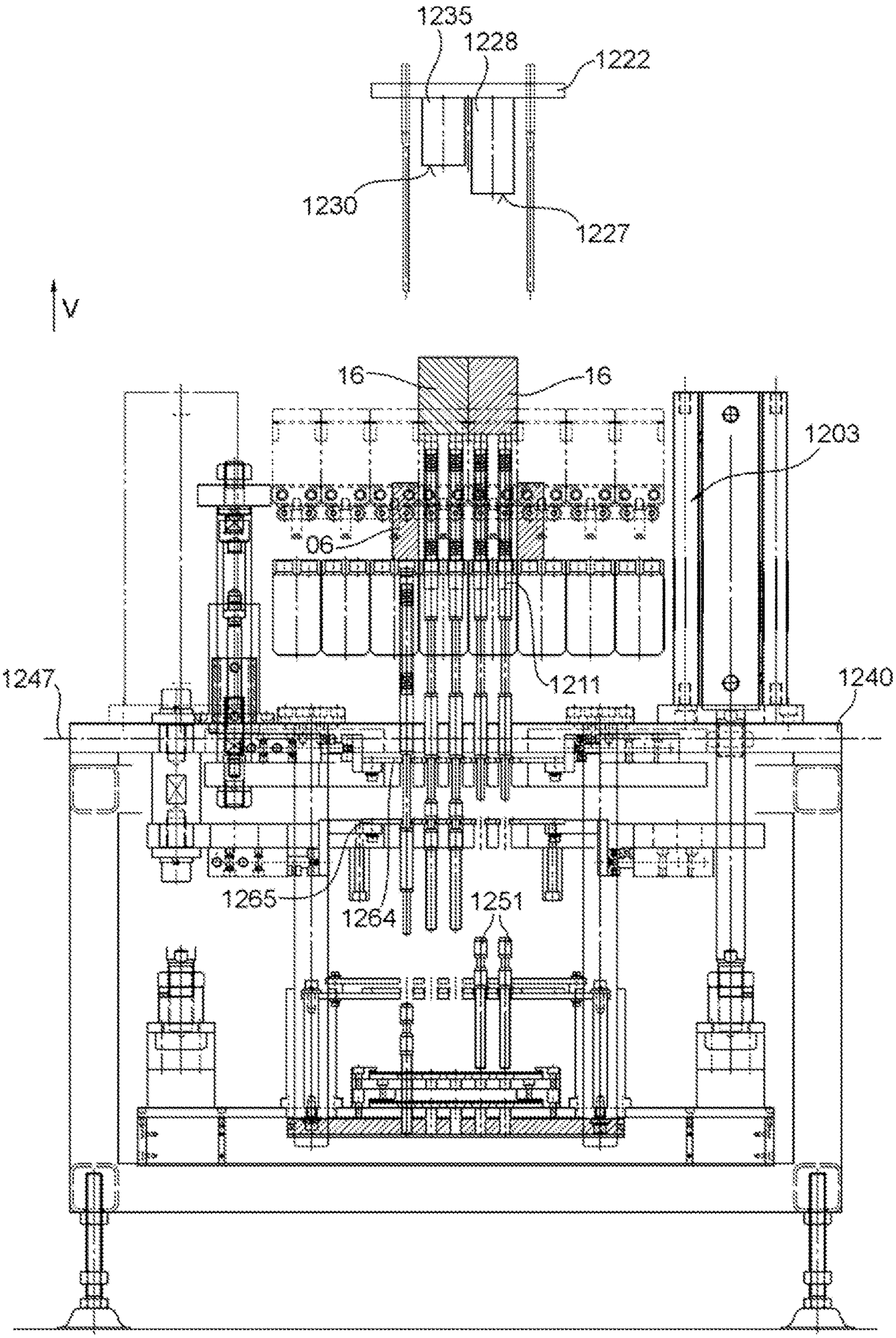
FIG. 30 an illustration of the lower blank separating module as well as of the upper blank separating tool directly after the separation process in a preferred embodiment.
Figure 31:
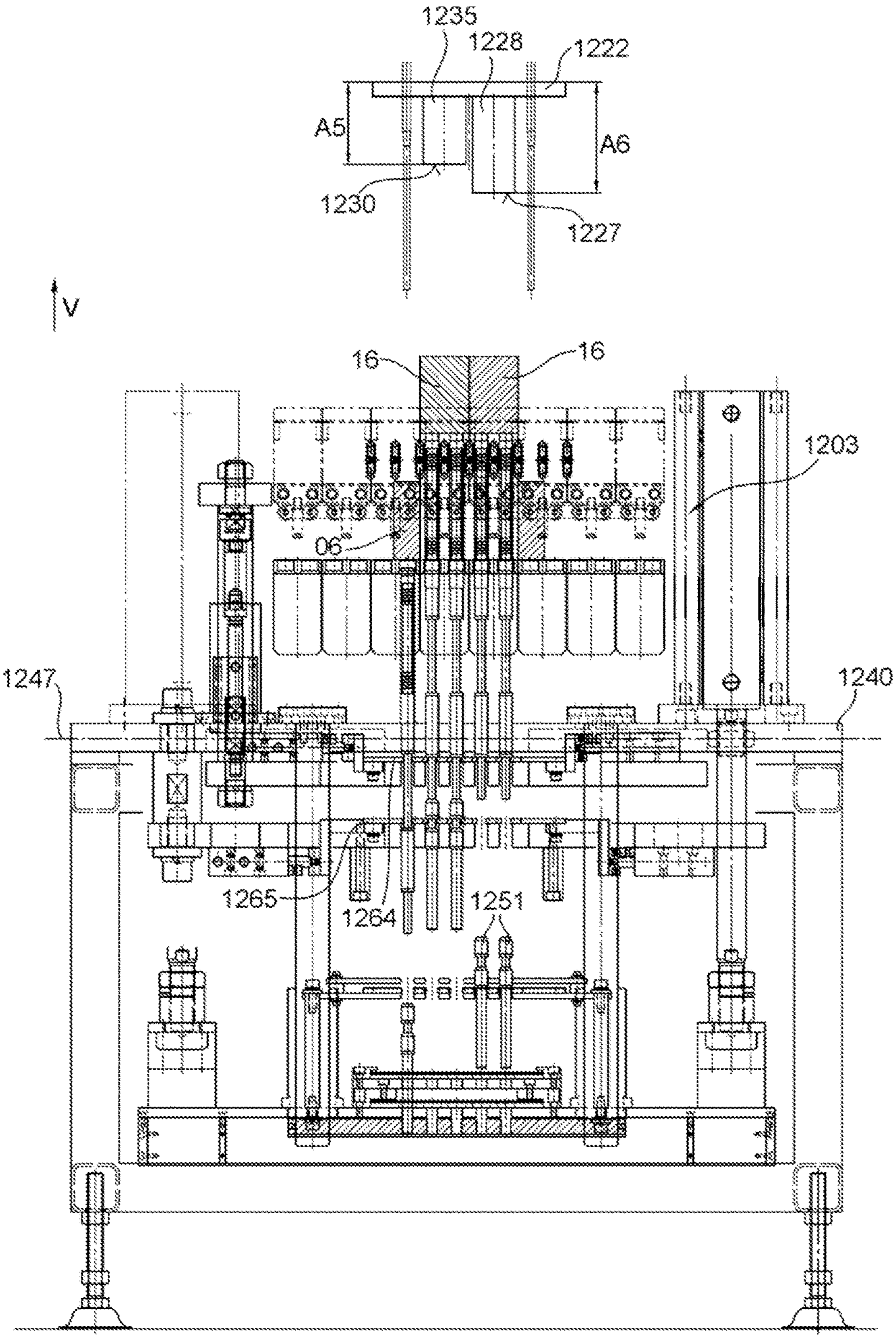
FIG. 31 an illustration of the lower blank separating module as well as of the upper blank separating tool including a rake that is inserted between the supporting elements in a preferred embodiment.
Figure 32:
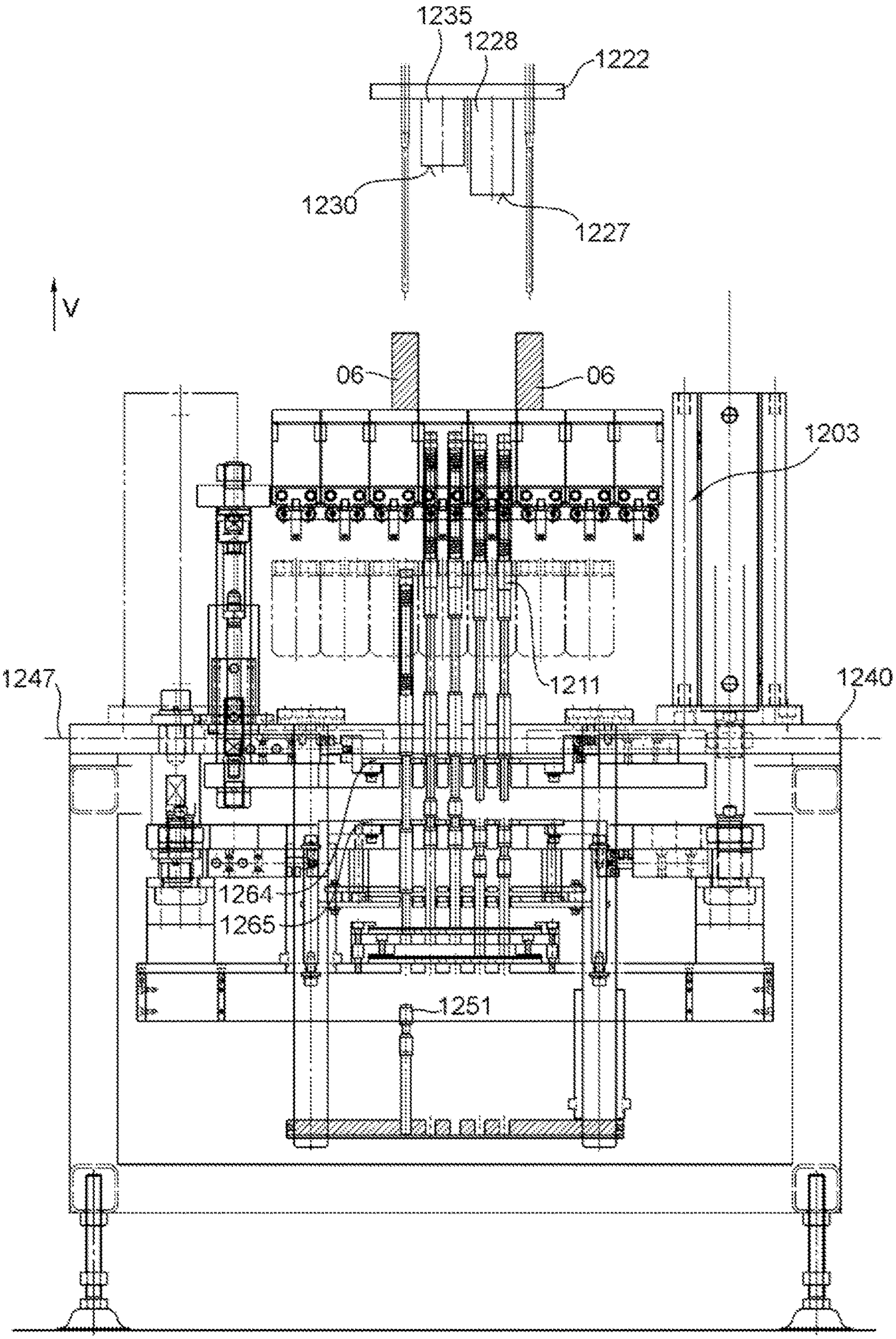
FIG. 32 an illustration of the lower blank separating module as well as of the upper blank separating tool including a raised conveyor belt in a preferred embodiment.
Figure 33:
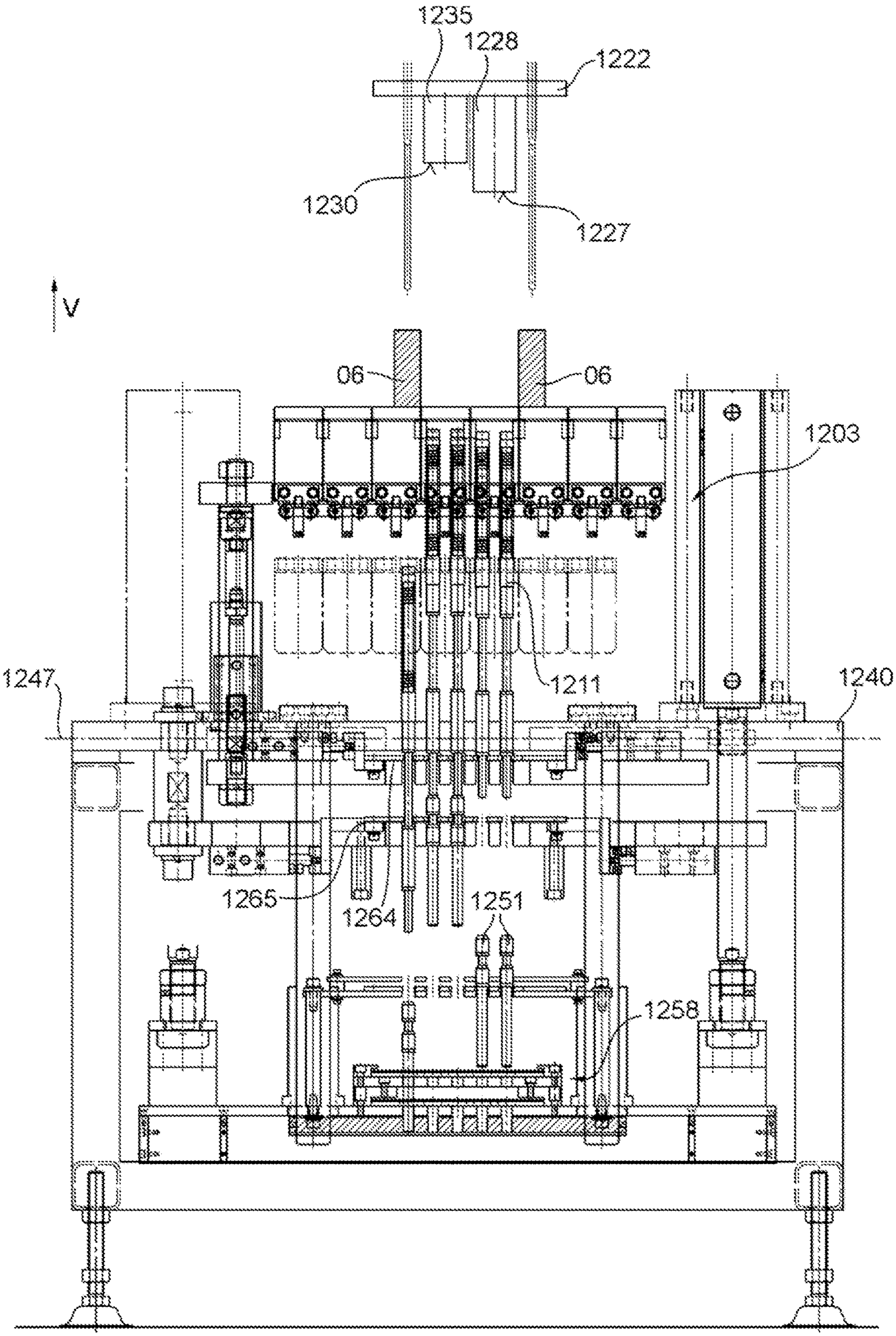
FIG. 33 an illustration of the lower blank separating module as well as of the upper blank separating tool after a first stencil change step in a preferred embodiment.
Figure 34:
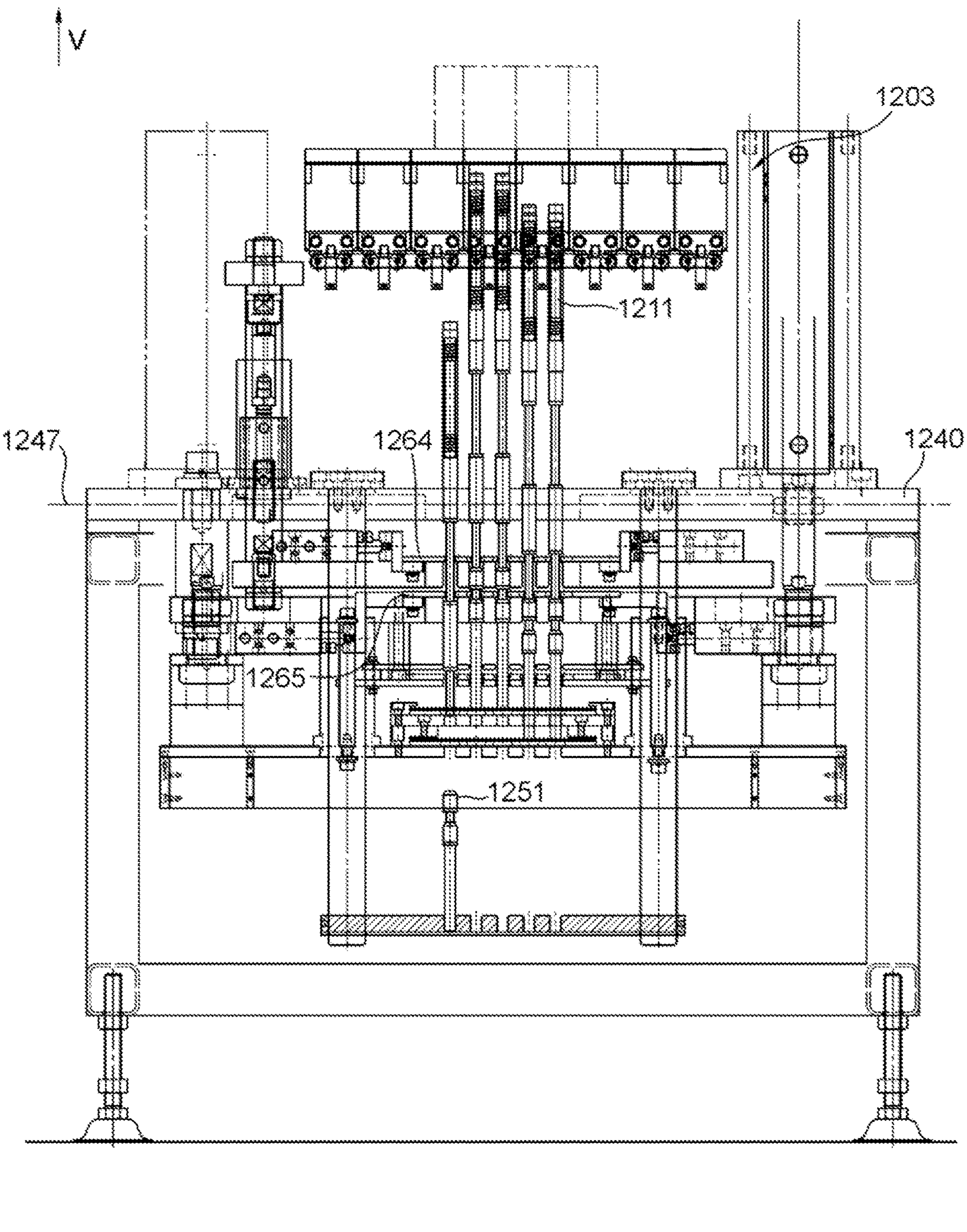
FIG. 34 an illustration of the lower blank separating module after a second stencil change step in a preferred embodiment.
Figure 35:
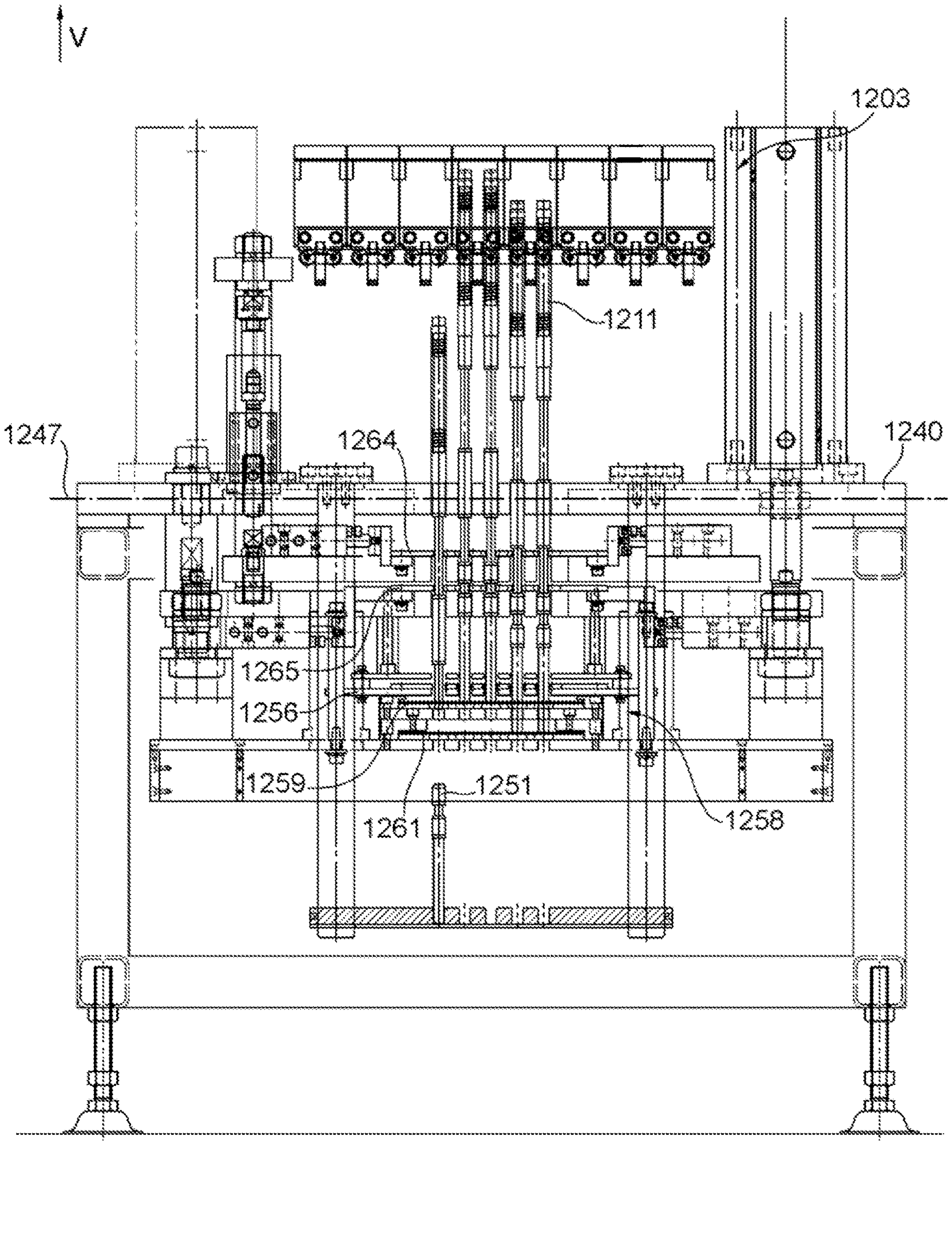
FIG. 35 an illustration of the lower blank separating module after a third stencil change step in a preferred embodiment.
Figure 36:
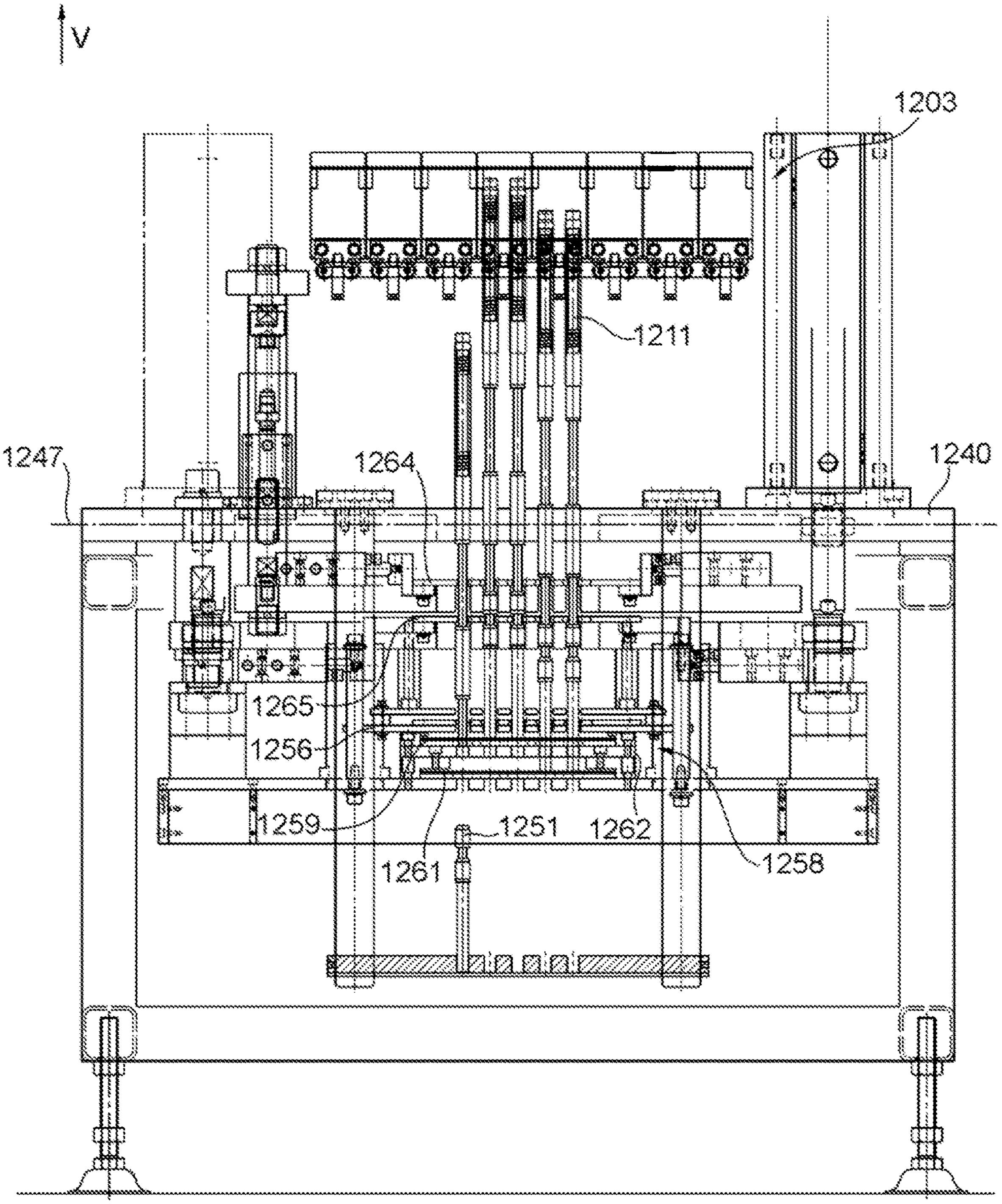
FIG. 36 an illustration of the lower blank separating module after a fourth stencil change step in a preferred embodiment.
Figure 37:
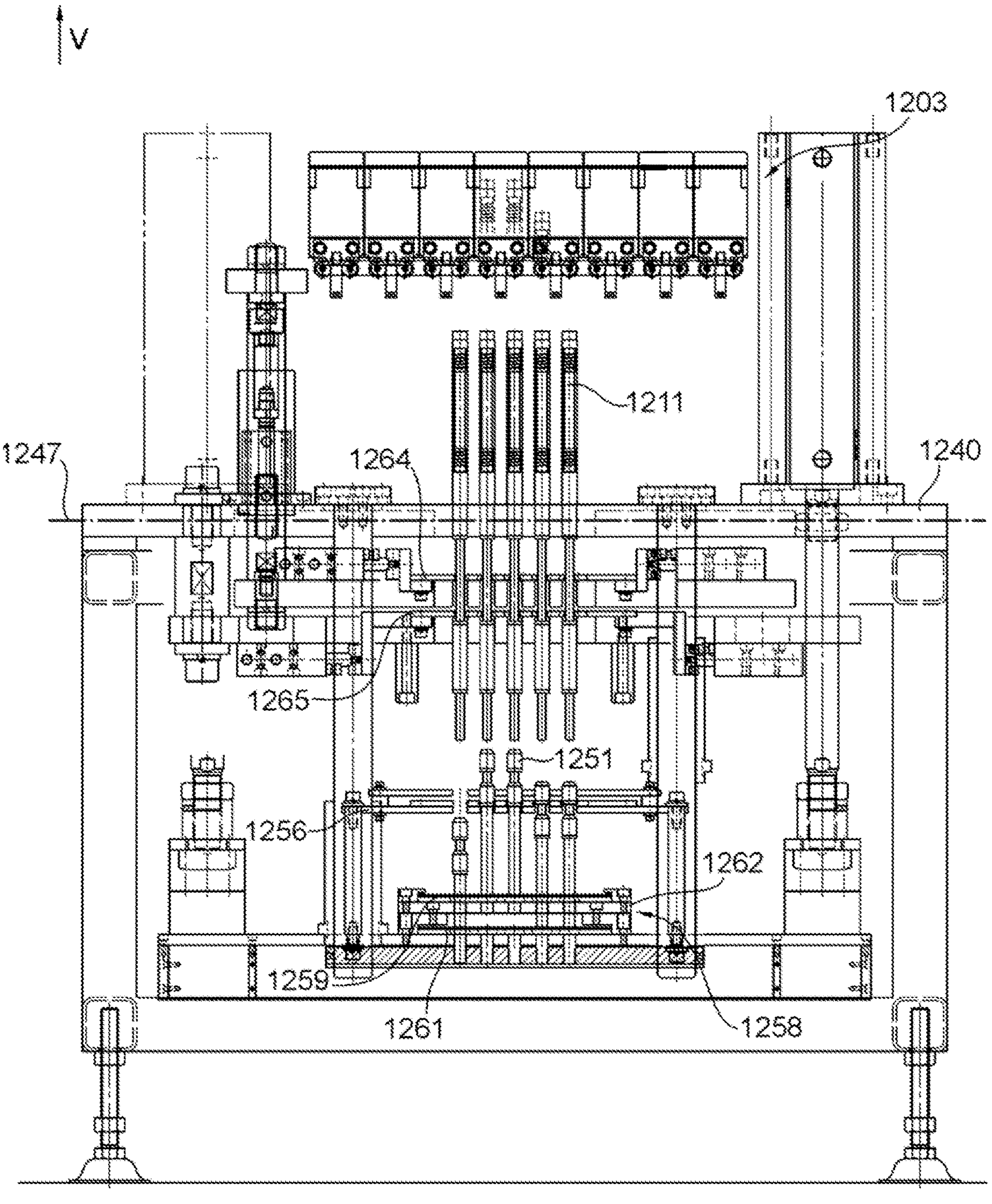
FIG. 37 an illustration of the lower blank separating module after a fifth stencil change step in a preferred embodiment.
Figure 38:
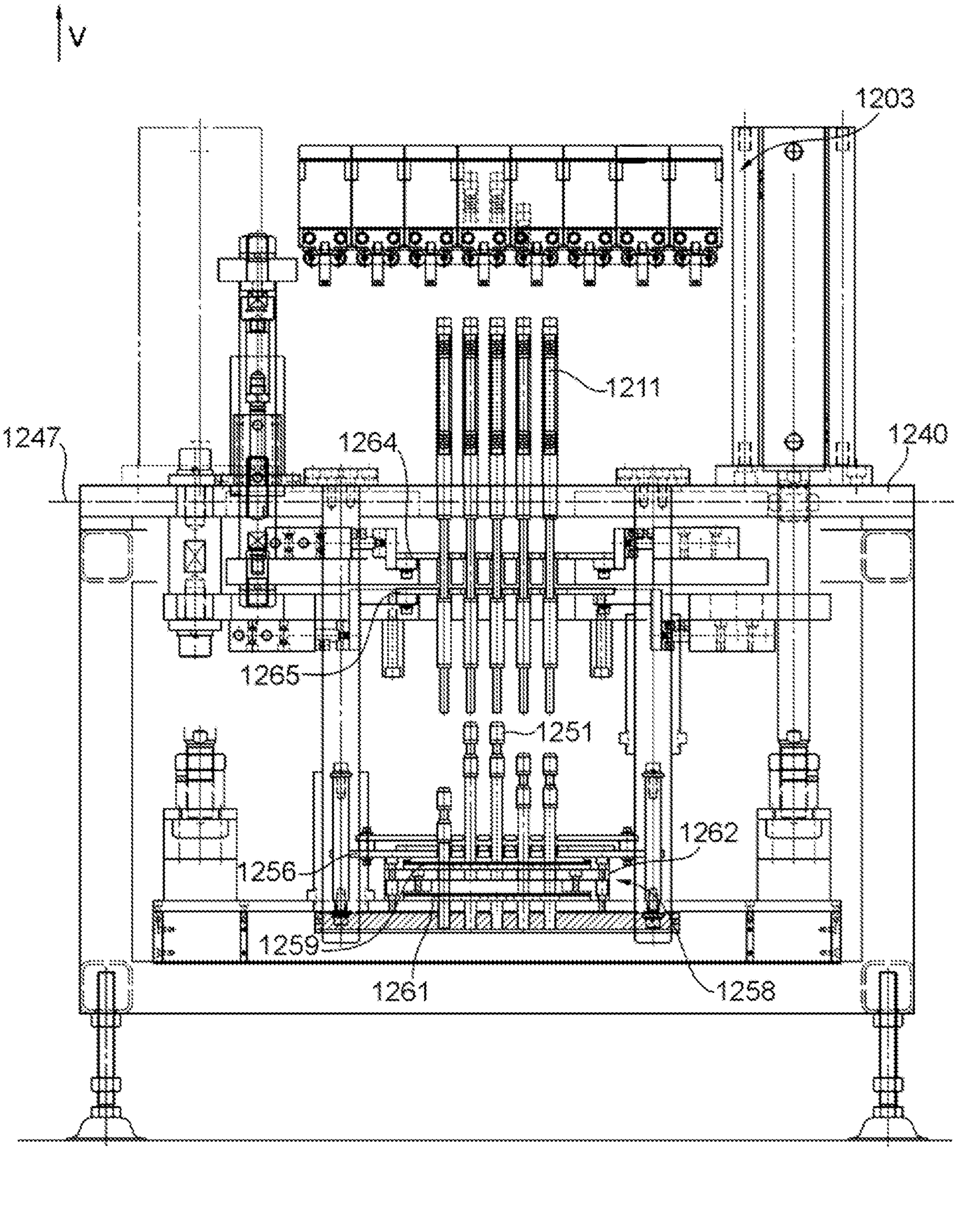
FIG. 38 an illustration of the lower blank separating module after a sixth stencil change step in a preferred embodiment.
Figure 39:
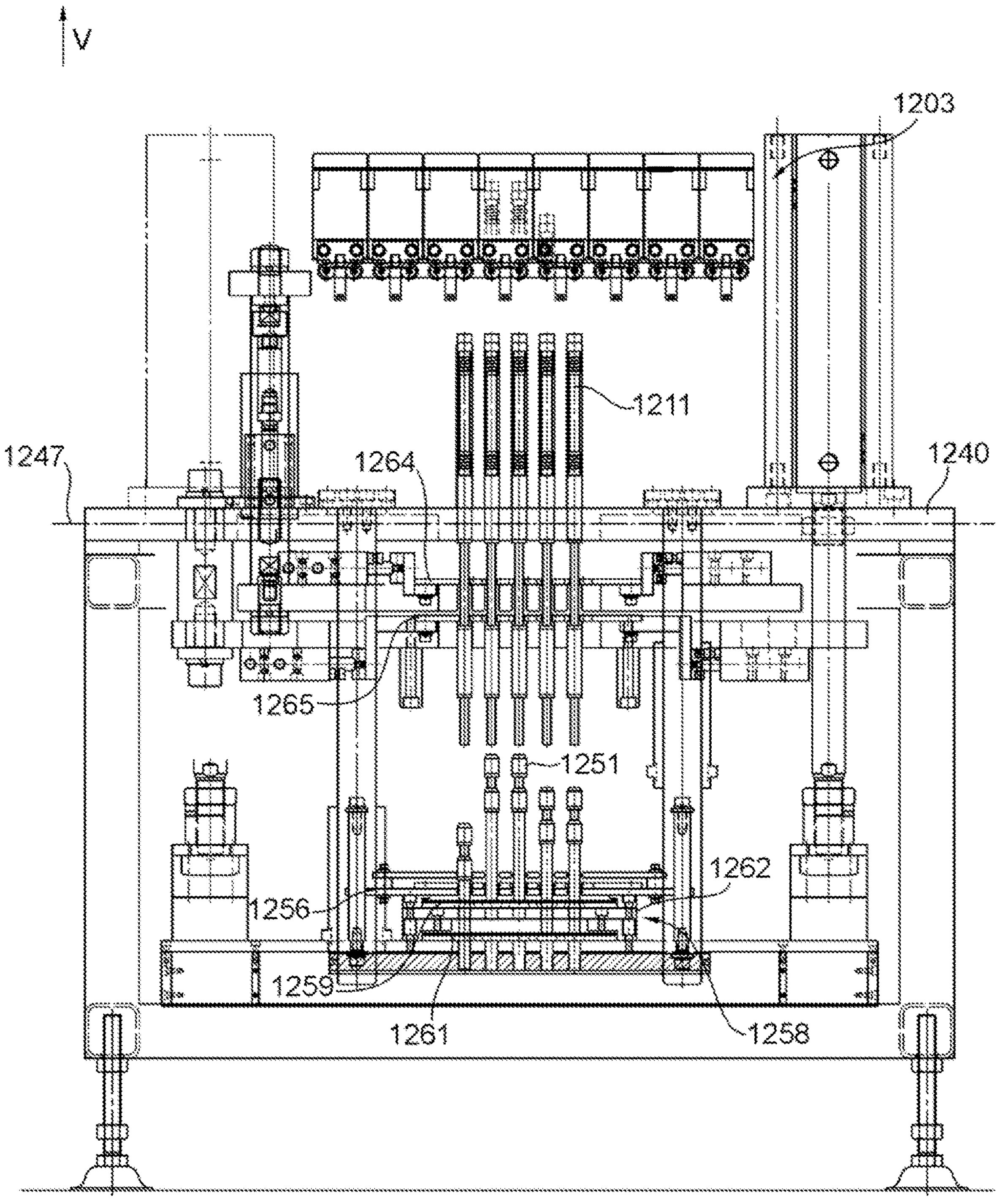
FIG. 39 an illustration of the lower blank separating module after a seventh stencil change step in a preferred embodiment.
Figure 40:
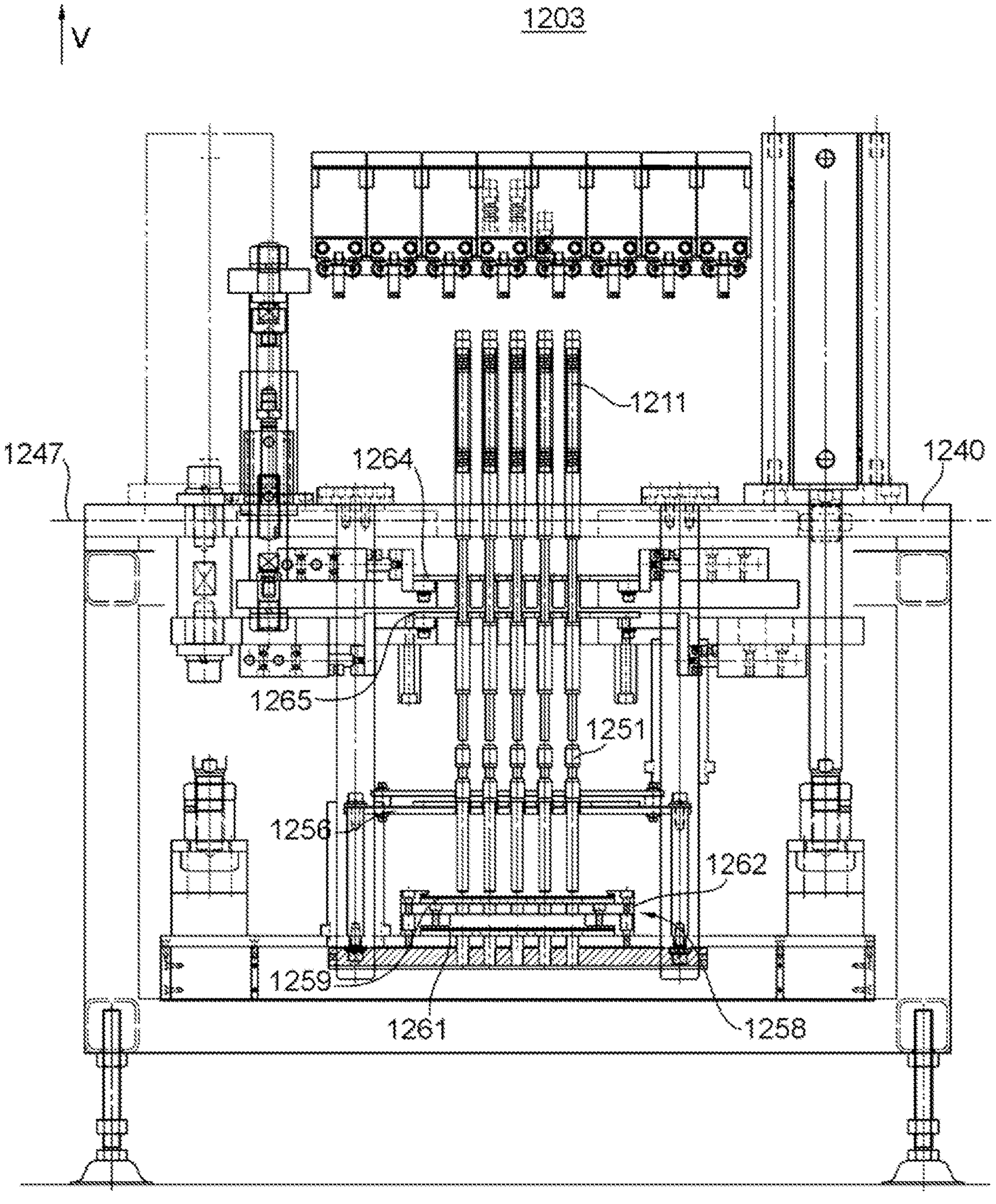
FIG. 40 an illustration of the lower blank separating module in the starting position in a preferred embodiment.
Figure 41:
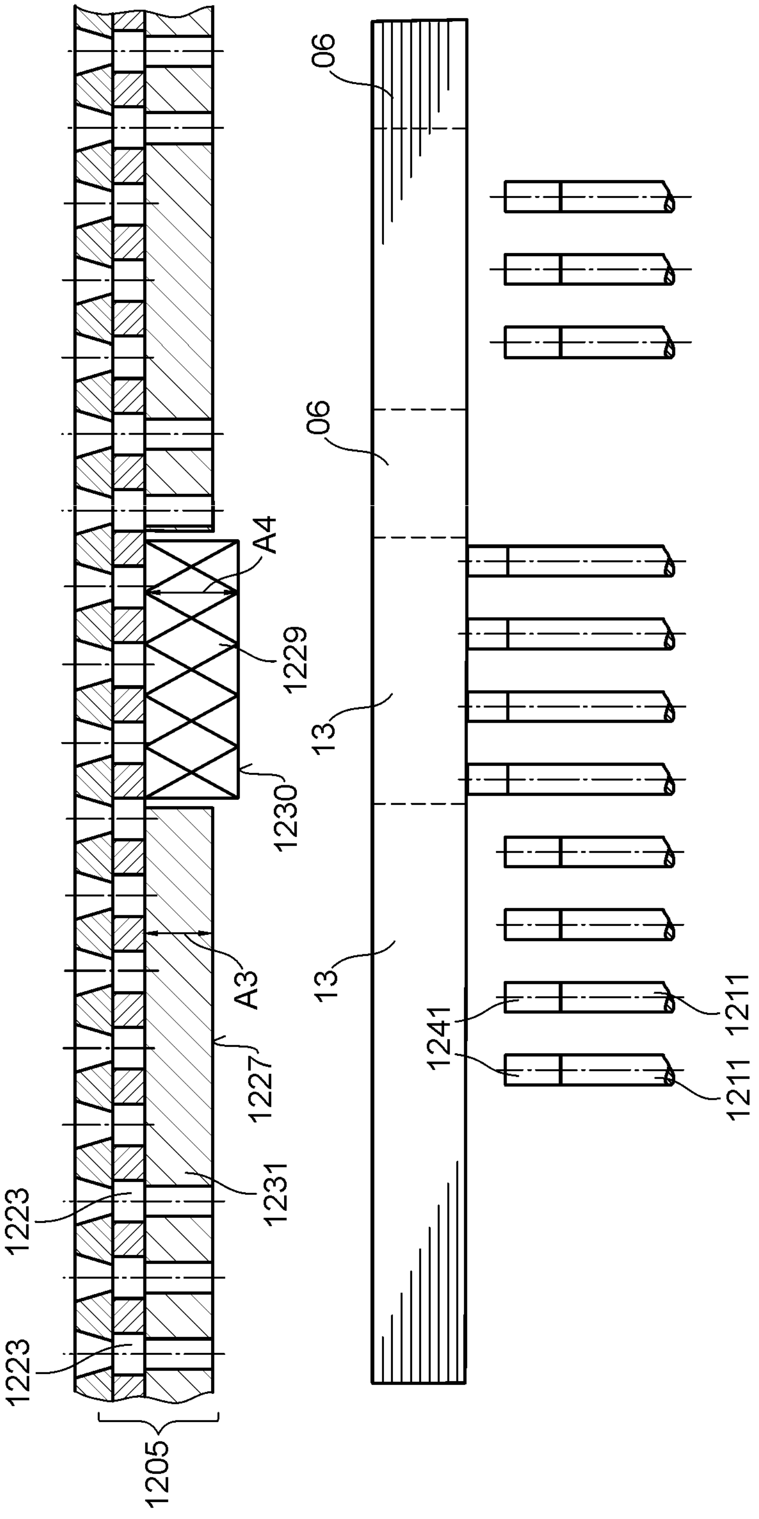
FIG. 41 a schematic illustration of the upper and the lower blank separating module in a preferred embodiment, including a combination tool in an open position.
Figure 42:
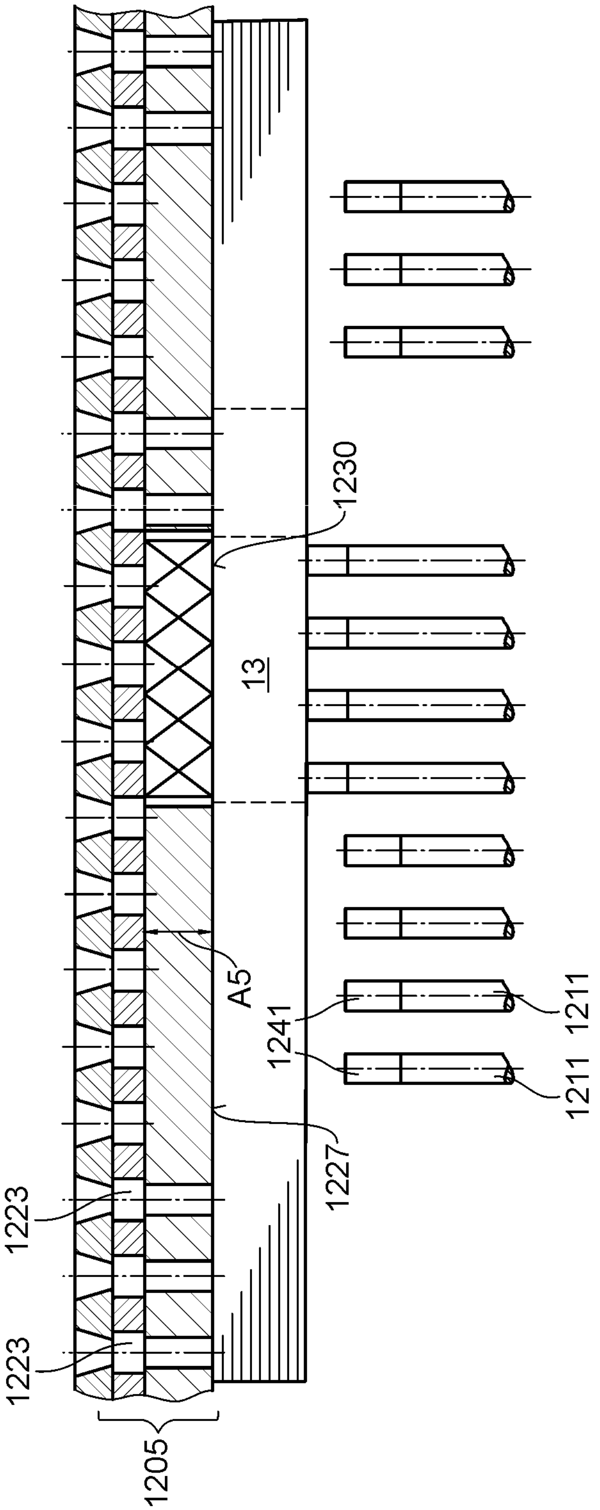
FIG. 42 a schematic illustration of the upper and the lower blank separating module in a preferred embodiment, including a combination tool in an open position.
Figure 43:
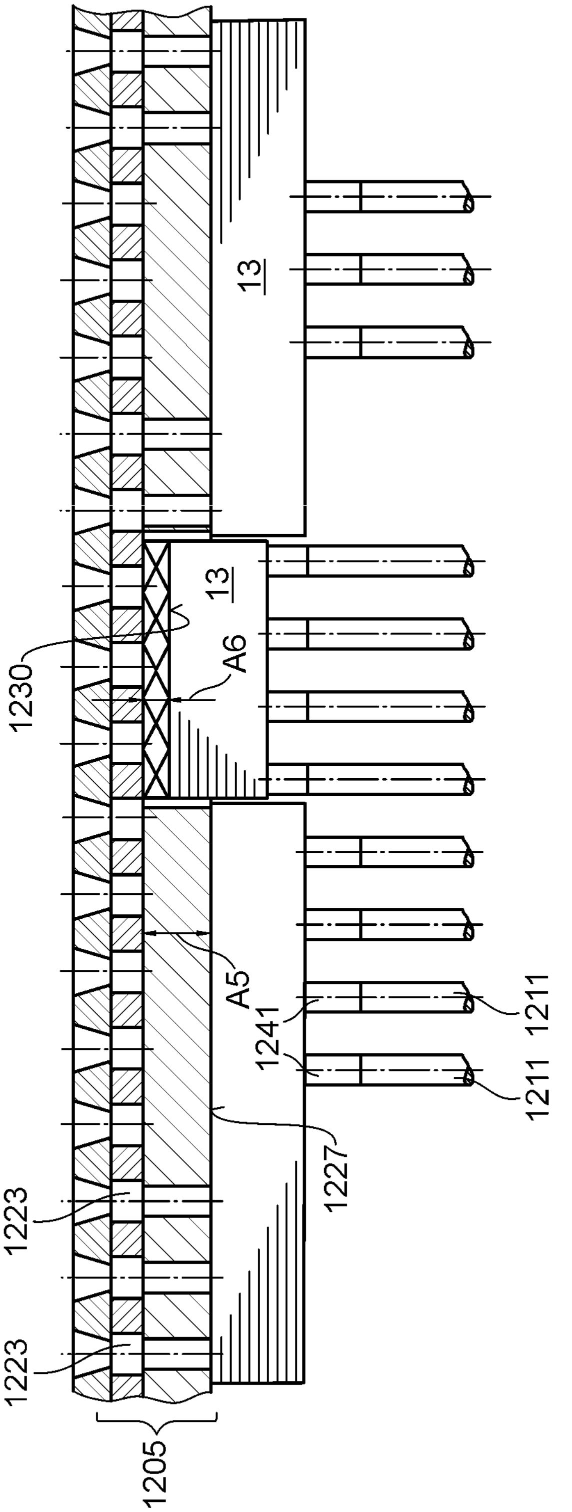
FIG. 43 a schematic illustration of the upper and the lower blank separating module in a preferred embodiment, including a combination tool in a contact position.
Figure 44:
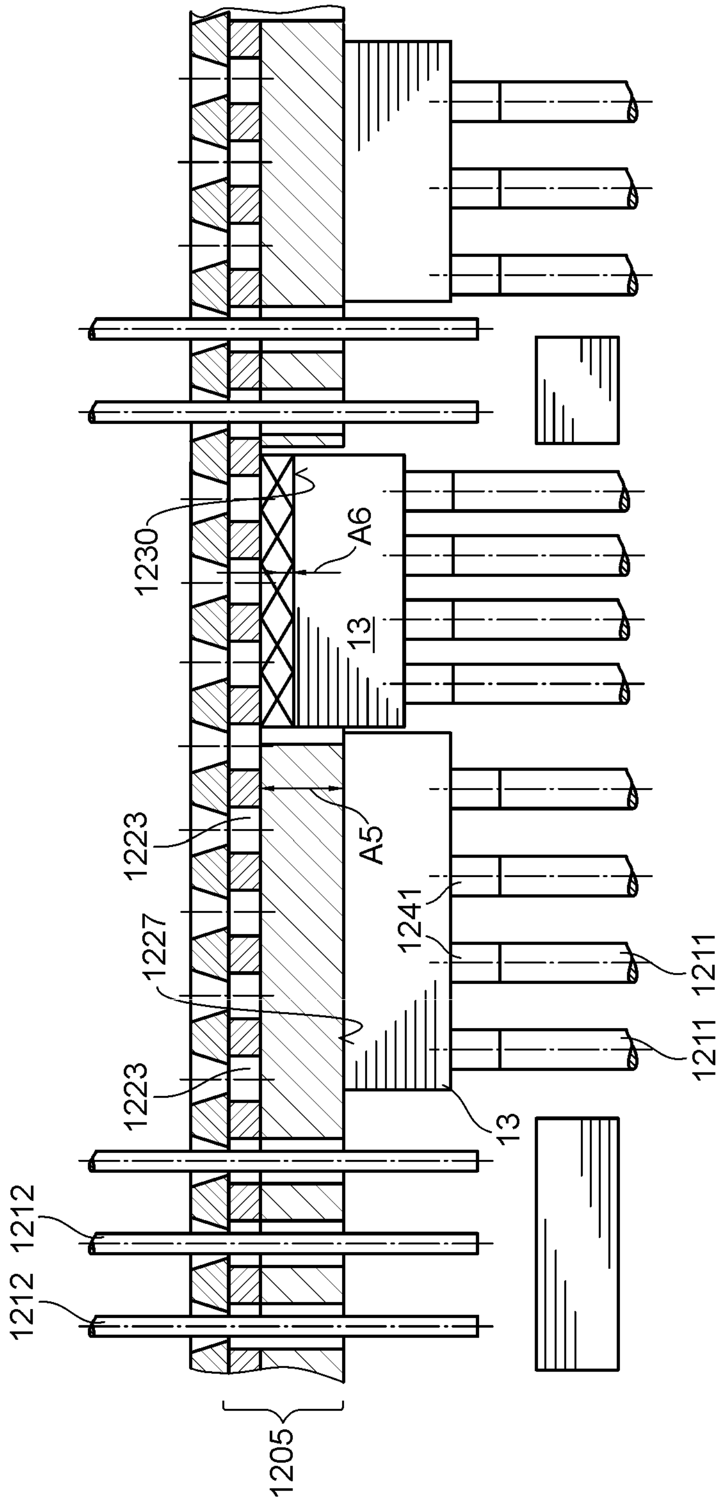
FIG. 44 a schematic illustration of the upper and the lower blank separating module in a preferred embodiment, including a combination tool in a separating position.
Figure 45:
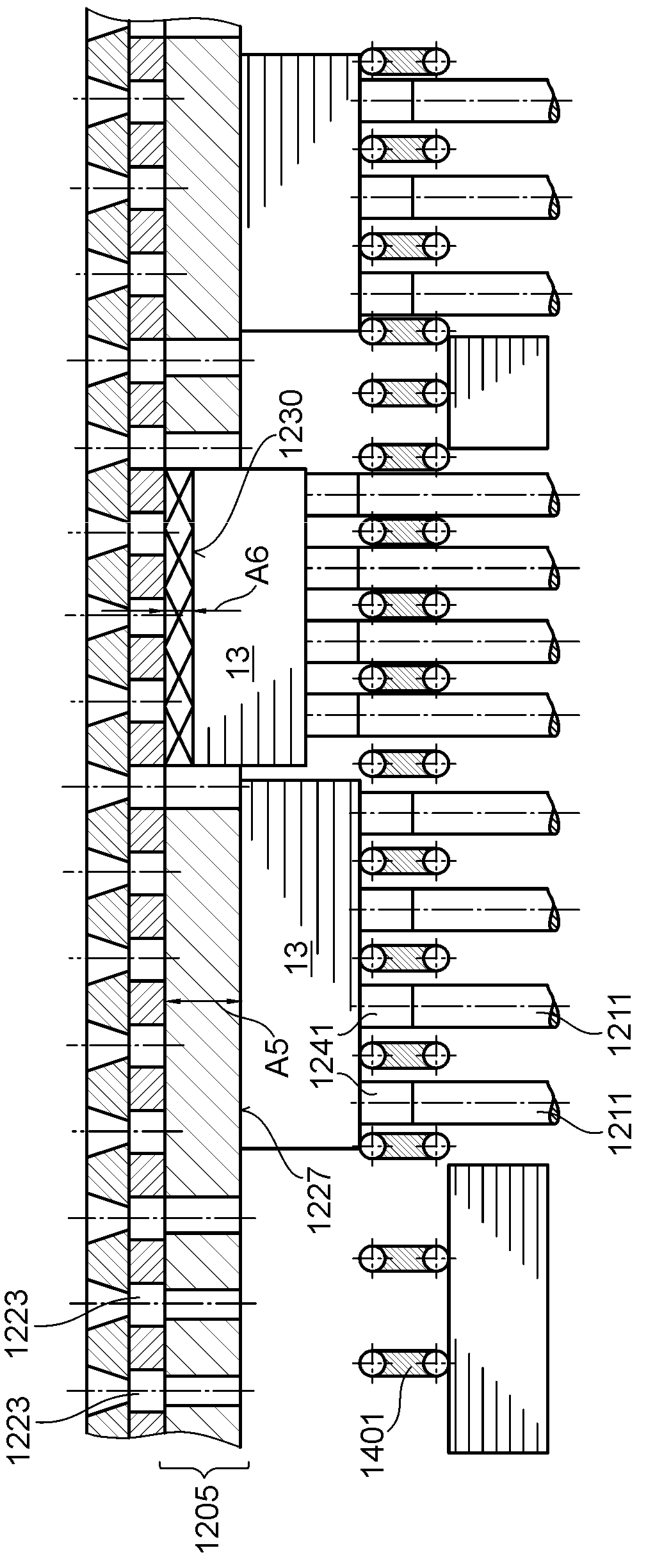
FIG. 45 a schematic illustration of the upper and the lower blank separating module in a preferred embodiment, including a combination tool with an inserted rake.
Figure 46:
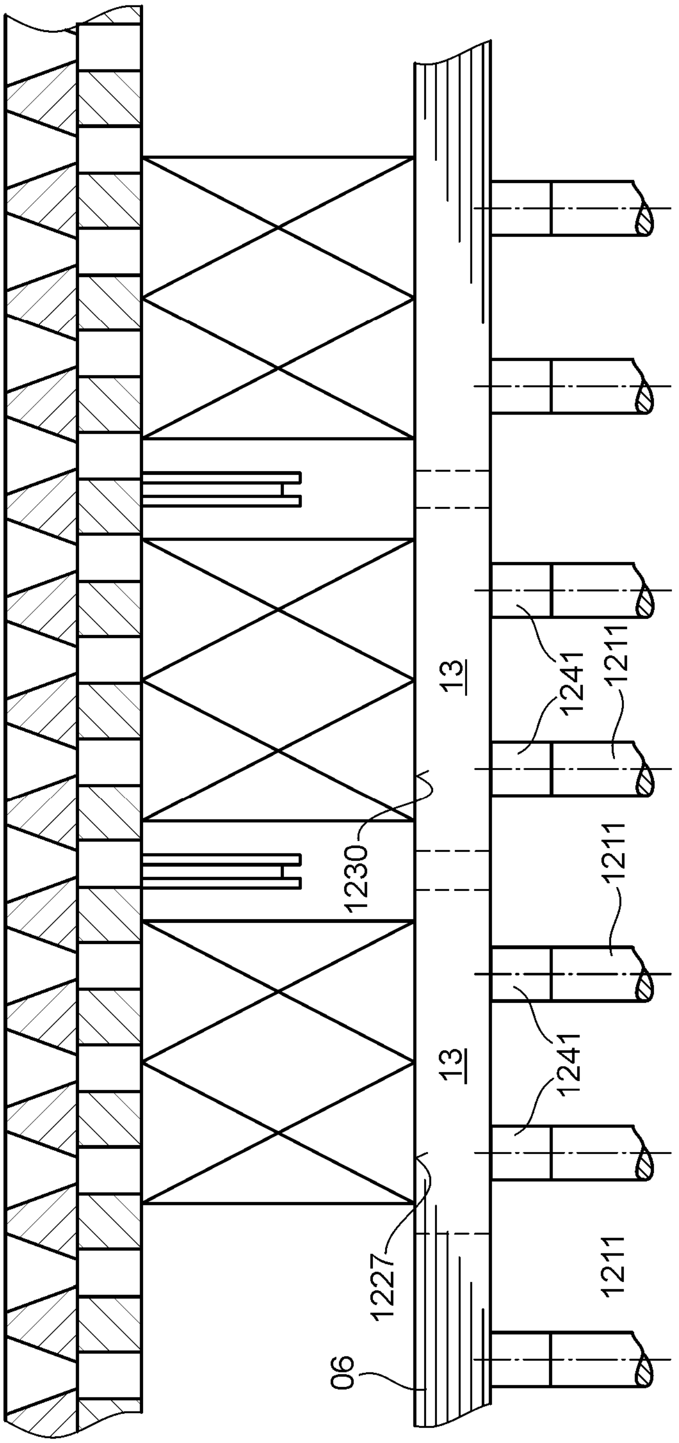
FIG. 46 a schematic illustration of the upper and the lower blank separating module in a preferred embodiment, including another preferred embodiment of a combination tool in an open position.
Figure 47:
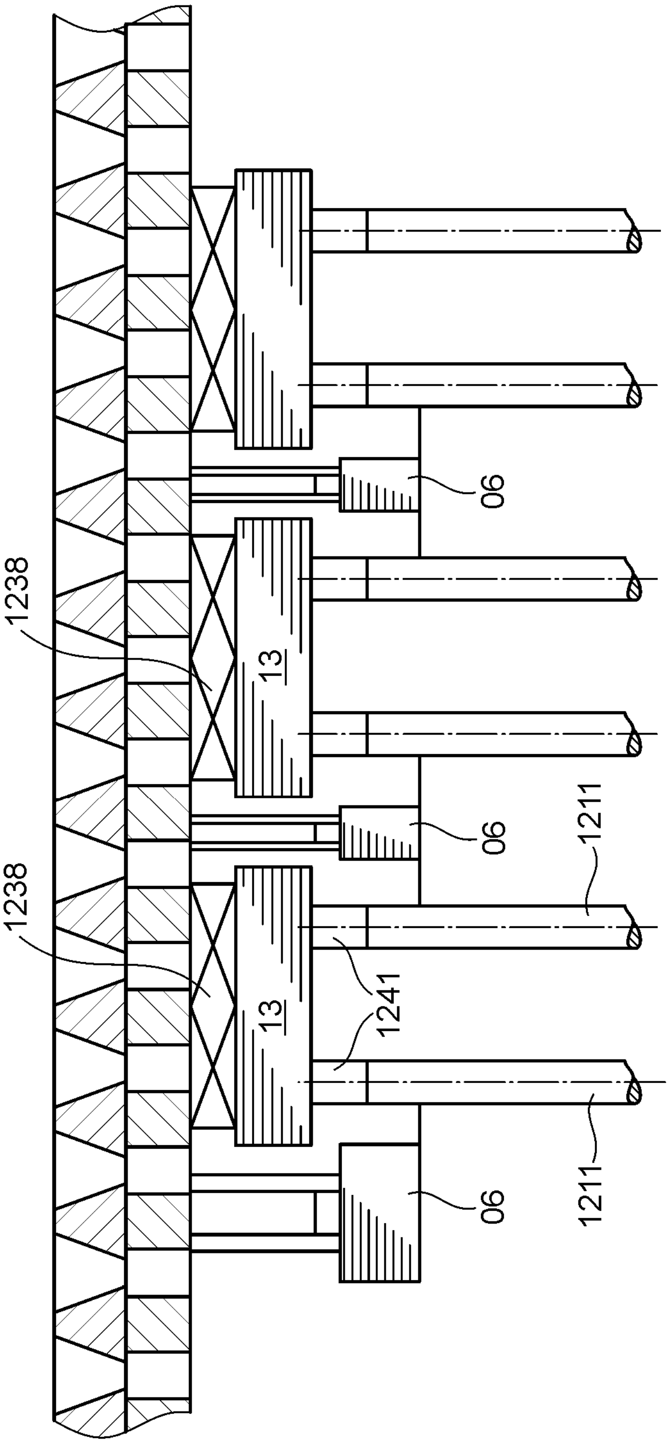
FIG. 47 a schematic illustration of the upper and the lower blank separating module in a preferred embodiment, including another preferred embodiment of a combination tool in a separating position.

A processing machine 01 is preferably configured as a sheet processing machine 01, in particular as a die-cutting machine 01, more preferably as a rotary die-cutting machine 01, for processing at least one, preferably at least two, more preferably a multiplicity of sheet-like substrate 02 or sheets 02. Above and below, processing machine 01 and/or sheet processing machine 01 in particular also refers to a die-cutting machine 01. The processing machine 01 comprises at least one unit 100; 200; 300; 400; 500; 600; 700; 800; 900; 1000; 1100; 1200; 1400, preferably a multiplicity of units 100; 200; 300; 400; 500; 600; 700; 800; 900; 1000; 1100; 1200; 1400. Preferably, the processing machine 01, in particular the sheet processing machine 01, preferably comprises at least one, preferably at least two, more preferably at least three, more preferably at least four, units 300; 400; 500; 600 configured as shaping units 300; 400; 500; 600 for processing sheets 02, for example, at least one first shaping unit 300 and/or at least one second shaping unit 400 and/or at least one third shaping unit 500 and/or at least one fourth shaping unit 600.

A unit 100; 200; 300; 400; 500; 600; 700; 800; 900; 1000; 1100; 1200; 1400 shall, in each case, preferably be understood to mean a group of devices that functionally cooperate, in particular to be able to carry out a preferably self-contained processing operation of the at least one substrate 02. A unit 100; 200; 300; 400; 500; 600; 700; 800; 900; 1000; 1100; 1200; 1400 in each case preferably comprises a machine section of the processing machine 01, which is preferably arranged so as to be at least partially spatially separable from further machine sections.

Unless an explicit distinction is made, the term substrate 02, in particular sheet-like substrate 02, specifically the term sheet 02, shall generally be understood here to encompass any planar substrate 02 that is present in sections, that is, also substrate 02 present in panel-shaped or board-shaped form, i.e., also panels or boards. The sheet-like substrate 02 or the sheet 02 thus defined is made, for example, of cardboard and/or corrugated cardboard, i.e., cardboard sheets and/or corrugated cardboard sheets, or sheets, panels or possibly boards made of plastic, cardboard, glass, wood, or metal. The sheet-like substrate 02 is more preferably paper and/or paperboard, in particular paper sheets and/or paperboard sheets. Above and below, the term sheet 02 refers, in particular, both to sheets 02 that were not yet processed by means of at least one unit 100; 200; 300; 400; 500; 600; 700; 800; 900; 1000; 1100; 1200; 1400, and to sheets 02 that were already processed by means of at least one unit 100; 200; 300; 400; 500; 600; 700; 800; 900; 1000; 1100; 1200; 1400 and, in the process, were potentially modified in terms of their shape and/or their mass.

According to DIN 6730 (February 2011), paper is a flat material, consisting mainly of fibers derived from vegetable sources, which is formed by the dewatering of a fiber suspension on a sieve. In the process, a card web is created, which is subsequently dried. The basis weight of paper is preferably a maximum of 225 $g/m^2$ (two hundred twenty-five grams per square meter). According to DIN 6730 (February 2011), cardboard is a flat material, consisting mainly of fibers derived from vegetable sources, which is formed by the dewatering of a fiber suspension on a sieve or between two sieves. The fiber structure is compressed and dried. Cardboard is preferably manufactured from cellulose by gluing or pressing the cellulose together. Cardboard is preferably configured as solid board or corrugated cardboard. The basis weight of cardboard is preferably more than 225 $g/m^2$ (two hundred twenty-five grams per square meter). Corrugated cardboard is cardboard made of one or more layers of corrugated paper that is glued to one layer or between multiple layers of another, preferably smooth, paper or cardboard. Above and below, the term paperboard refers to a sheet material that is preferably primed on one side and made of paper, having a basis weight of at least 150 $g/m^2$ (one hundred fifty grams per square meter) and no more than 600 $g/m^2$ (six hundred grams per square meter). Paperboard preferably has high strength relative to paper.

A sheet 02 to be worked, preferably the at least one sheet 02, preferably has a grammage of at least 60 $g/m^2$ (sixty grams per square meter) and/or of no more than 700 $g/m^2$ (seven hundred grams per square meter), preferably no more than 500 $g/m^2$ (five hundred grams per square meter), more preferably no more than 200 $g/m^2$ (two hundred grams per square meter). A sheet 02 to be worked, preferably the at least one sheet 02, preferably has a thickness of no more than 1.5 cm (one point five centimeters), preferably no more than 1.0 cm (one point zero centimeters), more preferably no more than 0.6 cm (zero point six centimeters). For example, the at least one sheet 02 has a thickness of at least 0.01 cm (zero point zero one centimeters), and preferably of at least 0.03 cm (zero point zero three centimeters).

The at least one substrate 02, in particular the at least one sheet 02, preferably has a sheet width, preferably parallel to a transverse direction A, of exactly at least 200 mm (two hundred millimeters), preferably at least 300 mm (three hundred millimeters), more preferably at least 400 mm (four hundred millimeters). The sheet width is preferably no more than 1,500 mm (one thousand five hundred millimeters), more preferably no more than 1,300 mm (one thousand three hundred millimeters), still more preferably no more than 1,060 mm (one thousand sixty millimeters). A sheet length, preferably parallel to a transport direction T, is, for example, at least 150 mm (one hundred fifty millimeters), preferably at least 250 mm (two hundred fifty millimeters), more preferably at least 350 mm (three hundred fifty millimeters). Furthermore, a sheet length is, for example, no more than 1,200 mm (one thousand two hundred millimeters), preferably no more than 1,000 mm (one thousand millimeters), more preferably no more than 800 mm (eight hundred millimeters).

Above and below, the term blank 03 preferably refers to the number of identical and/or different objects that are produced from the same piece of material and/or are arranged on shared substrate material, for example a shared sheet 02. A blank 03 is preferably the region of a sheet 02 that is either configured as a product of the sheet processing machine 01, in particular as an intermediate product for producing an end product, and/or, for example, is further worked and/or is configured to be further workable into a desired or required end product. The desired or required end product here, which is preferably generated by further working the respective blank 03, is preferably a packaging, in particular a folding box, or a tag and/or a label, in particular a tag and/or a label of a packaging. The at least one sheet 02 preferably comprises at least one blank 03, preferably at least two blanks 03, more preferably at least four blanks 03, more preferably at least eight blanks 03, for example twelve blanks 03. The at least two blanks 03 of the at least one sheet 02 are preferably each connected to one another and/or to the respective adjacent blank 03 by at least one holding point, preferably by at least two holding points, more preferably by at least four holding points.

Above and below, an offcut piece 04; 05; 06 is the region of a sheet 02 that does not conform to any blank 03. Collected offcut pieces 04; 05; 06 are preferably referred to as scrap. An offcut piece 04; 05; 06 is preferably configured and/or removable as trim-off and/or broken-off pieces. During the operation of the sheet processing machine 01, the at least one offcut piece 04; 05; 06 is preferably generated in at least one shaping unit 300, preferably by at least one processing step of the respective sheet 02, for example in at least one die-cutting process. During the operation of the sheet processing machine 01, the at least one offcut piece 04; 05; 06 is preferably at least partially removed from the respective sheet 02, and is thus, in particular, separated from the respective blank 03 of the sheet 02. For example, at least one fourth shaping unit 600 configured as a stripping unit 600 is configured to remove at least one first offcut piece 04, in particular at least one scrap piece 04, and/or is configured to remove at least one scrap piece 04. Preferably, at least one unit 1200 configured as a blank separating unit 1200, in particular a blank separating device 1200, is configured to remove at least one second offcut piece 06, in particular at least one gripper edge 06, and/or is configured to remove at least one gripper edge 06. For example, a sheet 02 comprises an offcut piece 05 configured as a crosspiece 05. In particular, the blanks 03 are spaced apart from one another by the at least one crosspiece 05. Preferably, the at least one blank separating unit 1200 is configured to remove the at least one offcut piece 05; 06, in particular the at least one crosspiece 05 and/or the at least one gripper edge 06.

The at least one substrate 02, in particular the at least one sheet 02, has multiple edges 07; 08; 09. In particular, an edge 07 configured as a leading edge 07 is located at the front of the sheet 02 in the transport direction T, and is arranged orthogonally to the transport direction T. In particular, the leading edge 07 is the edge 07 of the at least one sheet 02 which can preferably be seized by at least one component of the sheet processing machine 01, in particular by at least one transport means of at least one transport system, for transporting the at least one sheet 02, and/or at which at least one component of the sheet processing machine 01 seizes the at least one sheet 02, in particular by way of the at least one transport means of the transport system. An edge 08 of the at least one sheet 02 configured as a trailing edge 08 is preferably arranged opposite the leading edge 07. More preferably, the leading edge 07 and the trailing edge 08 are arranged parallel to one another. In particular, the trailing edge 08 is located at the rear of the at least one sheet 02 in the transport direction T, and is arranged orthogonally to the transport direction T. The sheet 02 furthermore has two edges 09 configured as side edges 09. The two side edges 09 are preferably arranged parallel to the transport direction T. Each of the two side edges 09 is preferably arranged orthogonally to the leading edge 07 and/or to the trailing edge 08 of the sheet 02.

The at least one sheet 02 preferably includes at least one print image. Above and below, the print image describes a representation on the at least one sheet 02 which corresponds to the sum of all image elements, with the image elements having been transferred and/or being transferable to the sheet 02 during at least one working stage and/or at least one printing operation, for example prior to or while being processed by the processing machine 01. The surface of the at least one sheet 02 preferably includes at least one unprinted region, in particular an unprinted edge region, which is preferably configured as the at least one offcut piece 06 and/or the at least one gripper edge 06. For example, the at least one sheet 02 includes the at least one gripper edge 06 at its leading edge 07 or at its trailing edge 08. Preferably, the at least one sheet 02 in each case includes the at least one gripper edge 06 both at its leading edge 07 and at its trailing edge 08.

The sheet 02 preferably includes at least one printing mark 11, preferably at least two printing marks 11. Above and below, a printing mark 11 is a mark, for example, for monitoring a color register and/or a perfecting register and/or preferably for aligning the at least one sheet 02 in the transport direction T and/or in the transverse direction A.

At least one pile 12 of sheets 02, also referred to as a substrate pile 12, preferably includes a multiplicity of sheets 02, in particular the at least one sheet 02 and additionally a multiplicity of further sheets 02. The at least one pile 12 preferably encompasses at least 1,000 (one thousand) sheets 02, preferably at least 2,000 (two thousand) sheets 02, and additionally or alternatively preferably no more than 15,000 (fifteen thousand) sheets 02, more preferably no more than 10,000 (ten thousand) sheets 02, more preferably no more than 8,000 (eight thousand) sheets 02. For example, the at least one pile 12 has a height of at least 100 mm (one hundred millimeters), preferably of at least 200 mm (two hundred millimeters), more preferably of at least 300 mm (three hundred millimeters), and additionally or alternatively of no more than 3,000 mm (three thousand millimeters), preferably of no more than 2,500 mm (two thousand five hundred millimeters), more preferably of no more than 2,000 mm (two thousand millimeters), more preferably of no more than 1,600 mm (one thousand six hundred millimeters), more preferably of no more than 1,300 mm (one thousand three hundred millimeters). Preferably, the at least one pile 12 encompasses at least two partial piles 13 of sheets 02, preferably at least four partial piles 13, more preferably at least eight partial piles 13. The at least one partial pile 13 of sheets 02, in particular a partial pile 13 encompassing the at least one sheet 02, preferably describes a ream 13. According to DIN 6730, a ream 13 may be understood to mean a packing unit of identical paper in the flat, that is, paper that is not folded, and not rolled, in the form of leaves or sheets 02. The ream 13 preferably encompasses at least 50 (fifty) sheets 02, more preferably at least 200 (two hundred) sheets 02, more preferably at least 400 (four hundred) sheets 02, and additionally or alternatively preferably no more than 700 (seven hundred) sheets 02, more preferably no more than 600 (six hundred) sheets 02, more preferably no more than 500 (five hundred) sheets 02. Preferably, the at least one partial pile 13 has a height of at least 5 mm (five millimeters), preferably of at least 10 mm (ten millimeters), and additionally or alternatively a height of no more than 400 mm (four hundred millimeters), more preferably of no more than 300 mm (three hundred millimeters), more preferably of no more than 200 mm (two hundred millimeters).

A blank pile 14 and/or delivery pile 14 preferably encompasses a number of blanks 03 corresponding to the number of sheets 02 of a pile 12. The at least one blank pile 14 preferably has a height of no more than 2,000 mm (two thousand millimeters), more preferably of no more than 1,600 mm (one thousand six hundred millimeters), more preferably of no more than 1,300 mm (one thousand three hundred millimeters). A partial blank pile 16 preferably encompasses a number of blanks 03 corresponding to the number of sheets 02 of a partial pile 13.

A machine direction B is preferably a direction B that points from a first unit 100 of the processing machine 01 to a last unit 700 and/or 1400 of the processing machine 01. In particular, the machine direction B points from a unit 100, in particular a first unit 100 configured as a feeder unit 100, to a last unit 700, in particular a unit 700 configured as a sheet delivery 700, and/or to a last unit 1400, in particular a unit 1400 configured as a delivery unit or a blank delivery 1400. The machine direction B is preferably a horizontally extending direction B.

The transverse direction A is preferably a horizontally extending direction A. The transverse direction A is oriented orthogonal to the machine direction B. The transverse direction A is preferably oriented from an operator side of the processing machine 01 to a drive side of the processing machine 01.

A vertical direction V is preferably the direction V that is arranged orthogonally to a plane spanned by the machine direction B and the transverse direction A. The vertical direction V is preferably oriented perpendicularly from the bottom and/or from a base of the processing machine 01 and/or from a bottommost component of the processing machine 01 toward the top and/or to an uppermost component of the processing machine 01 and/or to an uppermost cover of the processing machine 01.

The operator side of the processing machine 01 is preferably the side of the processing machine 01, parallel to the machine direction B, from which an operator, at least partially and at least temporarily, has access to the individual units 100; 200; 300; 400; 500; 600; 700; 800; 900; 1000; 1100; 1200; 1400 of the processing machine 01, for example during maintenance work and/or when replacing at least one shaping tool.

The drive side of the processing machine 01 is preferably the side of the processing machine 01, parallel to the machine direction B, which is located opposite the operator side. The drive side preferably comprises at least portions, preferably at least a majority of a drive system. For example, the at least temporary access to the individual units 100; 200; 300; 400; 500; 600; 700; 800; 900; 1000; 1100; 1200; 1400 by an operator is blocked and/or obstructed on the drive side by at least one component of the processing machine 01.

The spatial area provided for transporting the at least one substrate 02 within the processing machine 01, which the substrate 02, if such an area is present, at least temporarily occupies, is the transport path. The transport direction T is preferably a direction T in which the at least one substrate 02, if present, is transported at each point of the transport path. The transport direction T preferably points in the direction T in which the at least one substrate 02 is transported, apart from vertical movements or vertical components of movements. In particular, the transport direction T within a unit 100; 200; 300; 400; 500; 600; 700; 800; 900; 1000; 1100; 1200; 1400 is directed in the direction T which points from a first contact of the at least one substrate 02 with this unit 100; 200; 300; 400; 500; 600; 700; 800; 900; 1000; 1100; 1200; 1400 to a last contact of the substrate 02 with this unit 100; 200; 300; 400; 500; 600; 700; 800; 900; 1000; 1100; 1200; 1400.

Above and below, the working width is the maximum width that the at least one sheet 02 is permitted to have to be able to be transported through the at least one unit 100; 200; 300; 400; 500; 600; 700; 800; 900; 1000; 1100; 1200; 1400, in particular the respective units 100; 200; 300; 400; 500; 600; 700; 800; 900; 1000; 1100; 1200; 1400, of the processing machine 01, and/or to still be able to be worked by way of the at least one shaping unit 300; 400; 500; 600 of the processing machine 01. This therefore corresponds to the maximum width of the at least one substrate 02 that can be worked by way of the at least one shaping unit 300; 400; 500; 600 of the processing machine 01. The working width of the processing machine 01, in particular sheet processing machine 01, is preferably at least 30 cm (thirty centimeters), more preferably at least 50 cm (fifty centimeters), still more preferably at least 80 cm (eighty centimeters), still more preferably at least 120 cm (one hundred twenty centimeters), and still more preferably at least 150 cm (one hundred fifty centimeters).

The processing machine 01 preferably comprises at least one unit 100 configured as a feeder unit 100. The feeder unit 100 is preferably configured as a feeder, more preferably as a sheet feeder, more preferably as a sheet feeder unit. The feeder unit 100 is preferably configured as the first unit 100 of the processing machine 01 in the transport direction T. The feeder unit 100 is preferably configured to feed the at least one sheet 02 to the processing machine 01 on the transport path and/or is configured to feed the at least one sheet 02 to at least one unit 200; 300; 400; 500; 600; 700; 800; 900; 1000; 1100; 1200; 1400 arranged downstream from the feeder unit 100 in the transport direction T.

At least one unit 200 configured as an infeed unit 200 is preferably arranged downstream from the at least one feeder unit 100 in the transport direction T. Preferably, the at least one infeed unit 200 is configured to feed the at least one sheet 02, preferably the at least two sheets 02, more preferably a multiplicity of sheets 02, preferably sequentially, to the at least one shaping unit 300; 400; 500; 600. The at least one infeed unit 200 preferably comprises at least one device for detecting the at least one sheet 02. Preferably, the at least one sheet 02 can be at least partially, preferably completely, aligned by the at least one infeed unit 200 with respect to its position in the transport direction T and/or in the transverse direction A.

Preferably, at least one, preferably at least two, more preferably at least three, more preferably at least four, for example exactly four, units 300; 400; 500; 600 that are in each case configured as a shaping unit 300; 400; 500; 600 are arranged downstream from the at least one feeder unit 100 in the transport direction T, and preferably additionally downstream from the at least one infeed unit 200. Preferably, the at least one shaping unit 300; 400; 500; 600 comprises at least one shaping mechanism, preferably exactly one shaping mechanism. Preferably, the at least one shaping mechanism is configured as at least one embossing mechanism and/or at least one creasing mechanism and/or at least one die-cutting mechanism, more preferably as a rotary die-cutting mechanism, and/or at least one stripping mechanism. Preferably, at least one of the shaping units 300; 400; 500; 600 in each case comprises at least one shaping mechanism, preferably at least one embossing mechanism, and/or at least one creasing mechanism and/or at least one die-cutting mechanism and/or at least one stripping mechanism. The corresponding unit 300; 400; 500; 600 is then preferably configured as a die-cutting unit and/or a creasing unit and/or an embossing unit and/or a stripping unit. Preferably, the at least one shaping unit 300; 400; 500; 600 is configured to die-cut and/or cut and/or perforate and/or score and/or emboss and/or crease the at least one sheet 02. For example, in addition or as an alternative, the at least one shaping unit 300; 400; 500; 600 is configured to remove at least one offcut piece 04 configured as a scrap piece 04 from the at least one sheet 02. Preferably, the at least one shaping unit 300; 400; 500; 600, preferably the at least one shaping mechanism of the shaping unit 300; 400; 500; 600, comprises at least one, preferably one, forme cylinder and at least one counterpressure cylinder. Preferably, the at least one forme cylinder and/or the at least one counterpressure cylinder are configured as magnetic cylinders and/or comprise at least one packing, preferably in particular in the case of the forme cylinder, at least one packing including at least one tool. Preferably, the at least one forme cylinder and the at least one counterpressure cylinder are configured to form at least one, preferably exactly one, shaping point with one another. The shaping point is preferably the region in which the at least one forme cylinder on the one hand and the at least one counterpressure cylinder on the other hand are closest to one another. The at least one shaping unit 300; 400; 500; 600, preferably the at least one shaping mechanism, more preferably the at least one forme cylinder, preferably comprises at least one tool. Preferably, the at least one tool is preferably arranged in direct contact with the counterpressure cylinder in the region of the shaping point, for example configured to touch the same at least when the at least one sheet 02 is absent.

The at least one sheet 02 that has been processed by the at least one shaping unit 300; 400; 500; 600, that is, which is arranged downstream from the at least one shaping unit 300; 400; 500; 600 on the transport path in the transport direction T, preferably includes at least one die-cut impression. The at least one die-cut impression is configured as a crease and/or a score mark and/or an embossment and/or a cut and/or a perforation and/or a score and/or as a stripped scrap piece 04, for example. The at least one die-cut impression, in particular when it is configured as a perforation and/or a cut, is preferably configured to at least partially separate the at least one blank 03 from the at least one offcut piece 04; 05; 06 and/or from the at least one further blank 03 of the at least one sheet 02. The at least one sheet 02 that has been processed by the at least one shaping unit 300; 400; 500; 600, that is, which is arranged downstream from the at least one shaping unit 300; 400; 500; 600 on the transport path in the transport direction T, preferably comprises the at least one blank 03, preferably at least two blanks 03, more preferably at least four blanks 03, more preferably at least eight blanks 03, and at least one offcut piece 04; 05; 06.

Preferably, at least one unit 700 configured as a delivery unit 700 is arranged in the transport direction T, subsequent to the at least one shaping unit 300; 400; 500; 600, preferably in the transport direction T downstream from the at least two, more preferably the at least four, more preferably downstream from all shaping units 300; 400; 500; 600. For example, the delivery unit 700 comprises at least one chain conveyor system, for example comprising gripper bridges. In particular, the at least one delivery unit 700 is configured as a sheet delivery 700. Preferably, the at least one sheet delivery 700 is configured to deposit the at least one sheet 02 onto at least one pile platform 17, for example at least one pile platform 17 configured as a pallet 17 or as a conveyor belt or in another manner. Preferably, the at least one sheet delivery 700 is configured to form at least one pile 12 of sheets 02 or at least one partial pile 13 of sheets 02, preferably on the at least one pile platform 17. The pile 12 or partial pile 13 preferably encompasses the at least one sheet 02 and further, preferably a plurality of, sheets 02.

Preferably, at least one unit 800; 900; 1000 configured as a transport system 800; 900; 1000, preferably as a transfer transport system 800; 900; 1000, is arranged in the transport direction T downstream from the at least one sheet delivery 700. Preferably, the at least one transfer transport system 800; 900; 1000 is configured to transport the at least one sheet 02 and preferably additionally further sheets 02, preferably the at least one pile 12 or the at least one partial pile 13, from the at least one sheet delivery 700 to the at least one unit 1100; 1200; 1400 arranged downstream in the transport direction T.

Preferably, at least one unit 1100 configured as an intermediate alignment unit 1100 is arranged in the transport direction T downstream from the at least one transfer transport system 800; 900; 1000 and/or upstream from at least one unit 1200 configured as at least one blank separating unit 1200. Preferably, the at least one intermediate alignment unit 1100 is configured to align and/or loosen the at least one partial pile 13, which preferably encompasses the at least one sheet 02 and further sheets 02. Preferably, the at least one intermediate alignment unit 1100 for this purpose comprises at least one stop, preferably at least two tops, against which the at least one partial pile 13 is aligned.

In the at least one further unit 1200, in particular the unit 1200 configured as at least one blank separating unit 1200, the blanks 03 are separated from the offcut pieces 04; 05; 06, preferably the remaining offcut pieces 05; 06. The offcut pieces 04; 05; 06 are preferably separated from the blanks 03 in a partial pile-wise and/or ream-wise manner. Depending on the design of the blanks 03 and/or offcut pieces 04; 05; 06, in particular depending on the size of the offcut pieces 04; 05; 06, it is also possible to remove offcut pieces 04; 05 06 that are usually removed in an upstream shaping unit 300; 400; 500; 600, in particular the stripping unit, in the at least one blank separating unit 1200.

In particular, the at least one blank separating unit 1200 preferably comprises at least one blank separating mechanism 1201 and at least one supporting element 1202 that may be configured as a conveyor belt. The at least one blank separating mechanism 1201 generates and/or causes a shear movement during the separating process, with a shearing force between the blanks 03, in particular the partial blank piles 16 configured as blank partial piles 16 and the offcut pieces 04; 05; 06, in particular the piles of offcut pieces 04; 05; 06. By means of the at least one supporting element 1202, the offcut pieces 04; 05; 06 are transported out of the at least one blank separating unit 1200 after the separating process and, for example, conducted into a waste container 51 and/or into a shredding device.

Preferably, at least one delivery unit 1200 is arranged downstream from the at least one blank separating unit 1400. For example, at least one, preferably at least two, more preferably at least four, more preferably at least eight, blank partial piles 16 are transported from the blank separating unit 1200 into the at least one delivery unit 1400 by means of at least one transport means 1401, for example at least one rake 1401. In the delivery unit 1400, the at least one, preferably at least two, more preferably at least four, more preferably at least eight, blank partial piles 16 are collected on at least one pile platform 17, preferably at least one pallet 17, and/or are stacked to form at least one blank pile 14 and/or delivery pile 14. For example, such a blank pile 14 comprises at least two, more preferably at least four, more preferably at least eight, blank partial piles 16. Preferably, a sheet 02 is inserted as an intermediate sheet 02 between each blank partial pile 16 so as to increase the stability.

Preferably, the at least one shaping mechanism of at least one shaping unit 300; 400; 500; 600 of the shaping units 300; 400; 500; 600 is configured as an embossing mechanism. Preferably, the shaping unit 300; 400; 500; 600 configured as an embossing mechanism comprises the at least one forme cylinder configured as a die-cutting cylinder. Preferably, the at least one embossing mechanism is configured to generate at least one relief embossment and/or at least one braille embossment on the at least one sheet 02. The at least one relief embossment is preferably raised or recessed in relation to its surrounding area of the surface of the sheet 02. For example, the at least one forme cylinder is configured to generate both at least one raised and at least one recessed relief embossment. For example, different relief embossments, generated by the at least one embossing mechanism in the surface of the at least one sheet 02, have different heights.

Preferably in addition or as an alternative, the at least one shaping mechanism of at least one shaping unit 300; 400; 500; 600 of the shaping units 300; 400; 500; 600 is configured as a creasing mechanism. The shaping mechanism configured as a creasing mechanism is preferably configured to crease the at least one sheet 02. For example, in addition, the creasing mechanism is configured to die-cut and/or score and/or perforate and/or emboss the at least one sheet 02. Preferably, the at least one creasing mechanism is configured to generate at least one fold, for example for at least one bend.

Preferably in addition or as an alternative, the at least one shaping mechanism of at least one shaping unit 300; 400; 500; 600 of the shaping units 300; 400; 500; 600 is configured as a die-cutting mechanism. Preferably, the shaping mechanism configured as a die-cutting mechanism is configured to die-cut and/or perforate and/or score the at least one sheet 02.

Preferably in addition or as an alternative, the at least one shaping mechanism of at least one shaping unit 300; 400; 500; 600 of the shaping units 300; 400; 500; 600 is configured as a die-cutting mechanism comprising at least one extraction function, preferably a hole extraction function. Preferably, the shaping mechanism configured as a die-cutting mechanism comprising at least one extraction function is configured to die-cut and/or perforate and/or score the at least one sheet 02, wherein, for this purpose, at least one scrap piece 04 is removed from the at least one sheet 02 at the same time. Preferably, the at least one scrap piece 04 is separated completely from the at least one sheet 02 as a result of the processing operation in the at least one shaping mechanism and is held on the forme cylinder by way of air, preferably suction air, and is blown into at least one extraction box of the shaping mechanism. In particular, scrap pieces 04, which, for example, cannot be removed by further processing steps and/or, for example, have a surface area of no more than 0.25 cm 2 (zero point twenty-five square centimeters), can thus be removed from the at least one sheet 02. When processing thin sheets 02 having a thickness of no more than 0.3 cm (zero point three centimeters), the processing machine 01 preferably comprises at least one shaping unit 300 comprising at least one die-cutting mechanism including at least one extraction function.

Preferably in addition or as an alternative, the at least one shaping mechanism of at least one shaping unit 300; 400; 500; 600 of the shaping units 300; 400; 500; 600 is configured as a stripping mechanism. Preferably, the shaping mechanism configured as a stripping mechanism is configured to remove, preferably strip and/or extract, at least one scrap piece 04, preferably at least two scrap pieces 04, more preferably at least four scrap pieces 04, more preferably a multiplicity of scrap pies 04, from the at least one sheet 02.

In a preferred embodiment, the processing machine 01, in particular when generating at least one labeling, for example at least one labeling of a plastic packaging, comprises at least one shaping unit 400 comprising at least one die-cutting mechanism and, for example additionally, a shaping unit 300 arranged upstream from this shaping unit 400, comprising at least one die-cutting mechanism including at least one extraction function. Preferably, the at least one sheet delivery 700 is arranged directly subsequent to the shaping unit 400 comprising the at least one die-cutting mechanism, that is, in particular without a further interposed shaping unit 300; 400; 500; 600.

In another preferred embodiment, the processing machine 01, in particular when generating at least one further labeling, for example at least one label made of paper, comprises at least one shaping unit 400 comprising at least one die-cutting mechanism and, for example additionally, a shaping unit 300 arranged upstream from this shaping unit 400, comprising at least one die-cutting mechanism including at least one extraction function. For example, as an alternative, at least one shaping unit 300 comprising at least one creasing mechanism or comprising at least one embossing mechanism is arranged upstream from the at least one shaping unit 400 comprising the at least one die-cutting mechanism. Preferably, the at least one sheet delivery 700 is arranged directly subsequent to the shaping unit 400 comprising the at least one die-cutting mechanism, that is, in particular without a further interposed shaping unit 300; 400; 500; 600.

In another preferred embodiment, the processing machine 01 comprises at least three shaping units 300; 400; 500; 600, in particular when processing paperboard. The first shaping unit 300 preferably comprises at least one embossing mechanism or creasing mechanism. If present, the embossing mechanism is preferably arranged in the first shaping unit 300, upstream from the second shaping unit 400 comprising the creasing mechanism. Preferably, a shaping unit 400; 500 comprising at least one die-cutting mechanism follows the at least one shaping unit 300; 400 comprising the creasing mechanism, for example the first or second shaping unit 300; 400. The third or fourth shaping unit 500; 600 preferably comprises at least one stripping mechanism. The shaping unit 500; 600 comprising the at least one stripping mechanism is preferably arranged directly subsequent to the shaping unit 400; 500 comprising the at least one die-cutting mechanism, in particular without a further interposed shaping unit 300; 400; 500; 600. Preferably, the at least one sheet delivery 700 is arranged directly subsequent to the shaping unit 500; 600 comprising the at least one stripping mechanism, that is, in particular without a further interposed shaping unit 300; 400; 500; 600.

The at least one blank separating mechanism 1201 of the at least one blank separating unit 1200 preferably comprises at least one upper blank separating module 1204 and at least one lower blank separating module 1203. In an open state, the at least one upper blank separating module 1204 is arranged spaced apart from the at least one lower blank separating module 1203, preferably in the vertical direction V. During a separation process, the at least one upper blank separating module 1204 is moved from a first position in the open state in the direction of the at least one lower blank separating module 1203 and, during the separating process, is preferably at least indirectly in contact with the at least one lower blank separating module 1203 by way of the blanks 03 and/or the partial pile 13 of blanks 03. Due to the shear movement of the at least one blank separating module 1204, a shearing force is applied onto the offcut pieces 04; 05; 06 and/or partial piles 13 of offcut pieces 04; 05; 06, and the offcut pieces 04; 05; 06, in particular the partial piles 13 of offcut pieces 04; 05; 06, are separated from the blanks 03, in particular the blank partial piles 16. In a preferred embodiment including directly connected blanks 03 on one sheet 02, shearing forces additionally act between the blanks 03 so as to separate these from one another. Preferably, the at least one upper blank separating module 1204 is arranged so as to be transferred at least from the open position into a closed position during the separation process.

The at least one upper blank separating module 1204 comprises at least one upper separating tool 1210. The at least one upper separating tool 1210 comprises multiple elements configured as separating elements 1212, each including an operative surface 1215. The multiple separating elements 1212 can be arranged in an activated position or a deactivated position. The at least one lower blank separating module 1203 comprises at least one lower separating tool 1209 comprising multiple supporting elements 1211.

In a preferred embodiment, the multiple supporting elements 1211 are configured as pins, in particular as supporting pins, and the multiple separating elements 1212 are configured as pins, in particular as separating pins. The at least one upper blank separating module 1204 and the at least one lower blank separating module 1203 each comprise a separating tool 1209; 1210 configured as a matrix of pins. In particular, the at least one upper blank separating module 1204 comprises at least one upper matrix or separating tool 1210 comprising multiple pins, in particular separating elements 1212. The at least one lower blank separating module 1203 comprises at least one lower matrix, in particular a supporting pin matrix, comprising multiple, in particular supporting elements 1211. During the separation process, the lower supporting elements 1211, in particular the lower pins, support the partial piles 13, preferably the partial blank piles 16, and, during the separation process, the upper blank separating module 1204, and in particular the multiple separating elements 1212, in particular the multiple separating pins, carry out a relative movement with respect to the at least one lower blank separating module 1203 and cause a shear movement and/or shearing force onto the offcut pieces 05; 06, and preferably also on parts of at least one partial blank pile 16. The separating elements 1212 are preferably positioned such that the multiple separating elements 1212 in particular press onto the offcut pieces 04; 05; 06 situated at the edge of the sheets 02. In particular, the offcut pieces 05; 06 are in this way separated from the blanks 03 and, for example, connected blanks 03 are also separated from one another. The at least one upper blank separating module 1204 and the at least one lower blank separating module 1203 have reliefs 1250 and 1260, respectively, that are matched to one another, each at least having at least two planes, as a result of the positionable separating elements 1212 and/or supporting elements 1211. In a preferred embodiment, the at least one lower blank separating module 1203, in particular the supporting elements 1202; 1211, can be positioned in at least three positions and/or planes.

In principle, elements that are suitable for bracing the blanks or the scrap pieces shall be considered to be supporting elements 1202; 1211 here. In a preferred embodiment, two of these types of supporting elements 1202; 1211 are pins, in particular the upper two types of supporting elements 1211. These brace the blanks 03 and/or the partial piles 16. In particular, the supporting element 1202 configured as a conveyor belt shall be considered as a third type of supporting element 1202. The supporting element 1202 is preferably provided for bracing and transporting away the scrap. As an alternative, the supporting elements 1211 can also only be formed of elements of the lower separating tool 1209, in particular supporting pins. It is in particular important that the lower blank separating module 1203 comprises three supporting elements 1202; 1211, which can be arranged in three positions, and in fact are temporarily arranged in this way, at least in a separating position. In this way, a separation of the scrap 04; 05; 06 can be ensured, and a shear movement onto the blanks 03, in particular connected blanks 03, can be generated.

Furthermore, the at least one blank separating unit 1200 comprises at least one supporting element 1202 (transport means 1202 and/or conveyor belt) for transporting the partial piles 13 and/or reams 13 and/or blanks 03 and/or partial blank piles 16 from an upstream unit 100; 200; 300; 400; 500; 600; 700; 800; 900; 1000; 1100 into the at least one blank separating unit 1200. Preferably, the at least one supporting element 1202 is a conveyor belt configured as a transport means 1202 comprising multiple sections 1206 and/or conveyor belt elements 1206. The at least one supporting element 1202 is preferably configured as a circulating endless transport means and is arranged in operative connection with multiple circulating means 1217. The at least one supporting element 1202 comprises at least one region, in particular a transport region 1207, at which a partial pile 13 and/or ream 13 and/or blank 03 and/or partial blank pile 16 is and/or comes in contact with the supporting element 1202 at least temporarily. The at least one transport region 1207 is preferably configured in a horizontally oriented plane and conveys a partial pile 13 and/or ream 13 and/or blank 03 and/or partial blank pile 16 in the transport direction T through the at least one blank separating unit 1200. A portion of the transport region 1207 of the at least one supporting element 1202 can be at least temporarily varied in the vertical direction V, in particular lowered and/or raised. Preferably, the portion of the transport region 1207 that can be varied in the vertical direction V is arranged between the at least one upper blank separating module 1204 and the at least one lower blank separating module 1203. Preferably, the at least one variable transport region 1207 is arranged so as to be lowered in the vertical direction V during the separation process, and then serves as a supporting element 1202. In particular, the offcut pieces 04; 05; 06 are collected on the transport region 1207 and, after the separation process, are discharged from the blank separating unit 1200 by means of the transport region 1207 and, for example, are shredded by means of a shredding device and/or collected in a scrap container 51. In another embodiment, the offcut pieces 04; 05; 06 are directly transported away into a scrap container 51 after the blanks have been separated.

The individual conveyor belt elements 1206 preferably have multiple openings 1208 and/or holes. At least in the transport region 1207 that can be varied in the vertical direction V, the openings 1208 and/or holes 1208 have to be positioned and/or aligned relative to the at least one lower blank separating module 1203 during the separation process. During the separation process, some of the supporting elements 1211 at least partially protrude through the holes 1208 of the at least one transport region 1207 that is variable in the vertical direction V, and brace the individual partial piles 13 such as reams and/or blanks 03 and/or partial blank piles 16, acting as a mating piece with respect to the at least one upper blank separating module 1204.

The at least upper blank separating module 1204 preferably comprises the multiple separating elements 1212, in particular the multiple separating pins 1212, and the at least one separating tool 1210, in particular the at least one separating pin matrix. The multiple separating elements 1212 of the separating tool 1210 can each be arranged or positioned in at least two positions, this being an activated position and a deactivated position, and/or can be placed in at least two positions. In particular, the at least one upper blank separating module 1204 comprises at least one stencil 1216 for this purpose. Such a stencil 1216 preferably includes multiple holes, each hole being adapted to the position of the multiple activated separating elements 1212 in the at least one separating tool 1210. Preferably, exactly the holes of the at least one stencil 1216 whose assigned separating elements 1212 are to be deactivated are closed. The holes assigned to the separating elements 1212 to be activated are left open. The separating elements 1212, in particular the separating pins, are preferably arranged in the activated and/or in the deactivated position by means of the at least one stencil 1216. Preferably, during the separation process, the separating elements 1212 of the at least one upper separating tool 1210, which are arranged in the activated position, are arranged so as to, for example, exclusively apply a force onto the offcut pieces 04; 05; 06, in particular the crosspieces 05.

In the activated position, one separating element 1212 of the multiple separating elements 1212 has a first distance A1 with respect to an upper carrier plate 1213. In the deactivated position, one separating element 1212 of the multiple separating elements 1212 has a second distance A2 with respect to the carrier plate 1213. The carrier plate 1213 is preferably a plate 1213 at the at least one upper blank separating module 1204 at which the separating elements 1212 are attached by means of a make contact. Preferably, the first distance A1 as well as the second distance A2 are each arranged from a respective operative surface of the separating elements 1212 to a plane extending centrally, in the vertical direction V through the carrier plate 1213.

The activated separating elements 1212 are not blocked by the stencil 1216 and are arranged in a horizontally oriented plane, preferably further down in the vertical direction V and/or closer to the at least one lower blank separating module 1203. Similarly, the first distance A1 is preferably greater than the second distance A2. The deactivated separating elements 1212 are arranged in a horizontally oriented plane, preferably further up in the vertical direction V and/or further away from the at least one lower blank separating module 1203. In preparation for a separation process, the separating elements 1212 are fixed in the activated position and the deactivated position by means of multiple make contacts. Such make contacts preferably have shapes and/or regions having differing cross-sections. The shape can be shifted for attaching and/or fixing a separating element 1212. In particular, the separating elements 1212 include at least one groove 1221 for fixation, preferably in the activated position. Preferably, the separating elements 1212 are arranged so as to be guided and/or suspended in a carrier plate 1213 or an upper carrier plate 1213. In particular, the at least one stencil 1216 is arranged so as to be placed onto the at least one carrier plate 1213. The at least one carrier plate 1213 can be moved in the vertical direction V, for example on a linear guide 1218, by means of a drive. The at least one upper blank separating module 1204 comprises at least one further carrier plate 1214, in particular a lower carrier plate 1214. In a first embodiment, the at least one further carrier plate 1214 is configured as a metal plate having a hole matrix 1219, the hole matrix 1219 being matched to the at least one upper separating tool 1210, and more preferably to the positions of the separating elements 1212. Preferably, the holes of the hole matrix 1219 are uniformly arranged, and in particular are preferably arranged in a square manner. Preferably, each hole of the at least one carrier plate 1214 is arranged in the vertical direction V directly beneath an assigned separating element 1212. Regardless of the design of the stencil 1216, none of the holes of the hole matrix 1219 is closed. During the separation process, the at least one further carrier plate 1214 serves as a counterpressure surface for the partial piles 13 and/or reams and/or blanks 03 and/or blank partial piles 16, and for guiding the activated separating elements 1212.

In a preferred embodiment, additionally at least one further upper separating tool 1205 is arranged at the at least one lower carrier plate 1214, or an upper blank separating tool 1205 is arranged at the upper blank separating module 1204. In particular, the at least one lower carrier plate 1214 is arranged so as to be adjustable in the vertical direction V by means of at least one further drive. In particular, the at least one lower carrier plate 1214 comprises at least one tensioning system so as to attach and/or to fix the at least one separating tool 1205 at the at least one lower carrier plate 1214. For this purpose, the at least one upper blank separating tool 1205 comprises a carrier plate 1222 configured as a blank separating tool carrier 1222. Preferably, the at least one upper blank separating tool 1205 is arranged so as to be attached at the upper blank separating module 1204 by means of a blank separating tool carrier 1222. Preferably, multiple elements are arranged on the at least one blank separating tool carrier 1222, which are adapted to a blank shape and/or the number of blanks 03. In particular, these multiple elements are attached and/or fixed on the blank separating tool carrier 1222. The at least one blank separating tool carrier 1222 preferably has multiple separating pin holes 1223, and, in the activated position, the multiple separating elements 1212 are in particular arranged so as to be positioned in the vertical direction V preferably directly above the separating pin holes 1223, in the correct position in horizontal alignment.

Additionally, the at least one lower carrier plate 1214 comprises guide rails and a device for centering the at least one separating tool 1205 on the underside of the at least one lower carrier plate 1214. The at least one carrier plate 1213 as well as the at least one further carrier plate 1214 are arranged so as to be electrically and/or hydraulically and/or pneumatically movable, for example on a shared linear guide 1218, independently of one another.

The at least one separating tool 1205 is preferably matched and/or adapted to the configuration and/or arrangement of the blanks 03 on the sheet 02. The offcut pieces 04; 05; 06 and/or the blanks 03 are additionally separated by means of at least one upper blank separating tool 1205. In the case of multiple blanks 03 on a sheet 02, for example, thin offcut pieces 05 and/or crosspieces 05 can be arranged between the blanks 03. In such a case, the crosspieces 05 have to be additionally removed in the at least one blank separating unit 1200. Hereafter, the processing and/or the removal of these thin offcut pieces 05 and/or crosspieces 05 in the at least one blank separating unit 1200 are referred to as an intermediate cut. For example, the distance between two separating elements 1212 situated next to one another is between 8 mm (eight millimeters) and 12 mm (twelve millimeters), which is why such very thin crosspieces 05 having a width of less than 8 mm (eight millimeters) cannot be removed, or can only be removed with difficulty, without an additional blank separating tool 1205.

In addition or as an alternative, blanks 03 can be arranged on a sheet 02 without an interposed crosspiece 05, whereby space can be saved on a sheet 02. The blanks 03 situated next to one another on the sheets 02 are in this case directly in contact with one another. In general, the blanks 03 situated directly next to one another are joined after die cutting by way of one or more holding points. These can be separated from one another by a relative movement. Hereafter, the separation of two blanks 03 situated directly next to one another is referred to as a separating cut. The at least one separating tool 1205 has to be adapted and/or changed in each case for a separating cut and/or an intermediate cut. For example, such a separating tool 1205 has to be replaced with every job change. Preferably, the at least one upper blank separating tool 1205 includes at least one contact surface 1227; 1230, wherein the at least one contact surface 1227; 1230 has a boundary line and/or surface area that is adapted to a blank shape.

The at least one upper blank separating tool 1205 is, preferably centrally, mounted and/or fixed on a carrier plate 1222. Such a carrier plate 1222 is preferably configured as a blank separating tool carrier 1222 for carrying the blank separating tool 1205. For example, the carrier plate 1222 is formed of a metal, more preferably of wood. Preferably, the carrier plate 1222 is arranged with the at least one tool 1205 and/or separating tool 1205 at the lower carrier plate 1214 of the at least one upper blank separating module 1204. For example, the carrier plate 1222 has multiple separating pin holes 1223, which agree in the vertical direction V with the holes of the hole matrix 1219 of the lower carrier plate 1214 located thereabove. In particular, the separating elements 1212 arranged in the activated position protrude through the multiple separating pin holes 1223 during the separation process and exert a force onto the offcut pieces 04; 05; 06 to be removed. The separating pin holes 1223 are preferably arranged around the at least one separating tool 1205 and, in a preferred embodiment, are also arranged within the at least one separating tool 1205, in particular between individual tool sections and/or regions.

The at least one blank separating tool 1205 for carrying out the separating cut is preferably characterized in that the surface 1224 coming in contact with the blanks 03, in particular the entire contact surface 1224, has regions 1225; 1226 having differing properties. In particular, for separating blanks 03 arranged directly next to one another on a sheet 02, the at least one upper blank separating tool 1205 includes at least one contact surface 1224; 1227; 1230, which is smaller than or equal to the surface of a blank 03 on a sheet 02. The contact surface 1224 includes at least one region 1225 having higher rigidity or lower elasticity, and at least one region 1226 having lower rigidity or higher elasticity. Rigidity here shall in particular be understood to mean rigidity with respect to a displacement in the vertical direction V. The regions 1226 having lower rigidity and the regions 1225 having higher rigidity are preferably alternately arranged on the at least one upper blank separating tool 1205. Each region 1225; 1226 preferably comprises a dedicated element 1228; 1235 configured as a contact element 1228; 1235, including a dedicated contact surface 1227; 1230, which comes in contact with a blank 03 during the separation process. Preferably, the at least one upper blank separating tool 1205, and in particular the at least one first contact element 1228, includes the at least one first contact surface 1227. Preferably, the at least one second contact element 1235 includes the at least one second contact surface 1230. This at least one contact element 1228; 1235 and/or the contact surfaces 1227; 1230 are in each case preferably matched and/or adapted to the shape of the blank 03. Preferably, such an upper blank separating tool 1205 preferably comprises at least one first, preferably at least two first, more preferably at least three, more preferably eight, first contact elements 1228, each comprising at least one first, preferably at least two first, more preferably at least three, more preferably at least eight, first contact surfaces 1227. Preferably, such an upper blank separating tool 1205 preferably comprises at least one first, preferably at least two first, more preferably at least three, more preferably at least eight, second contact elements 1235, each including at least one first, preferably at least two first, more preferably at least three, more preferably at least eight, second contact surfaces 1230. The regions 1226 having the lower rigidity comprise, for example, multiple elements 1229, in particular tool supporting elements 1229, for example, foam elements 1229, having low rigidity and/or high elasticity between the respective at least one first contact element 1228 and the blank separating tool carrier 1222 or the carrier plate 1222. The regions 1225 having the higher rigidity comprise, for example, multiple further elements 1231, preferably multiple second tool supporting elements 1231, for example multiple metal rods 1231, having high rigidity and/or low elasticity between the respective contact element 1225 and the carrier plate 1222 or the blank separating tool carrier 1222.

In particular, at least one first tool supporting element 1229 is arranged between the at least one first contact surface 1227 and the at least one blank separating tool carrier 1222, and at least one second tool supporting element 1231 is arranged between the at least one second contact surface 1230 and the at least one blank separating tool carrier 1222. The at least one first tool supporting element 1229 and/or the at least one second tool supporting element 1231 have elastic properties. Preferably, at least one first tool supporting element 1229 has a higher elasticity and/or an easier deformability than the at least one second tool supporting element 1231.

During a separation process, the at least one region 1226 and/or the at least one first contact surface 1227 having lower rigidity are movable and/or deform temporarily in the vertical direction V. In particular, during the separation process, the plane through the contact surfaces 1227 of the regions 1226 having the lower rigidity changes relative to a plane through the entire contact surface 1224 of the at least one separating tool 1205. The region 1226 has lower rigidity relative to the contact surface 1230 of the regions 1225 having the higher rigidity. The at least one region 1225 and/or the regions 1225 having the higher rigidity are immovable during the separation process, and in particular remain in one plane. The plane is preferably the plane through the contact surface 1224 of the at least one separating tool 1205.

The at least one upper blank separating tool 1205 includes the at least one first contact surface 1227 at a first distance A3 with respect to the at least one blank separating tool carrier 1222. Furthermore, the at least one upper blank separating tool 1205 includes at least the further contact surface 1230 at a second distance A4 with respect to at least one blank separating tool carrier 1222. In a first position, for example the open position of the at least one blank separating mechanism 1201, the first distance A3 and the second distance A4 are preferably identical. The at least one first contact surface 1227 and/or the at least one second contact surface 1230 can preferably be arranged in at least one further position, for example a separating position. In the at least one further position, for example the separating position, the at least one first contact surface 1227 has a third distance A5 and/or the at least one second contact surface 1230 has a fourth distance A6. Preferably, the third distance A5 between the at least one first contact surface 1227 and the at least one blank separating tool carrier 1222 differs from the fourth distance A6 between the at least one second contact surface 1230 and the blank separating tool carrier 1222. The fourth distance A6 of the assigned region 1226 that has the lower rigidity and includes the contact surface 1230 is preferably smaller in the separating position than the third distance A5.

In the embodiment including multiple first contact surfaces 1227 and multiple second contact surfaces 1230, the multiple first contact surfaces 1227 in each case preferably have the respective distance A5, and the multiple second contact surfaces 1230 in each case have the distance A6 with respect to the at least one blank separating tool carrier 1222.

The at least one first contact surface 1227 and/or the at least one second contact surface 1230 are arranged so as to be, in particular differently, rigid and/or movable in the vertical direction V and/or in the direction of a surface normal to one of the contact surfaces 1227; 1230.

In particular, the upper blank separating module 1204 has a relief 1250. This relief 1250 is formed by means of at least three elements 1212; 1228; 1235. Preferably, at least one of these elements 1212; 1228; 1235 is a separating element 1212, and at least two are contact elements 1228; 1230. In particular, these at least three elements 1212; 1228; 1235 can each be arranged at least at three different distances A7; A6; A5. The three distances A7; A6; A5 preferably differ in their dimensions in the vertical direction V and/or in the height. In particular, a separating element 1212 has the distance A7 with respect to a carrier plate 1222, and the contact elements 1228; 1235 have the distances A6 and A5 with respect to a carrier plate 1222. Relief 1250 here shall be understood to mean an arrangement of the three elements 1212; 1228; 1235 in various positions and multiple surface areas in different arrangements in the vertical direction V. These surface areas are formed, for example, by multiple elements 1212; 1228; 1235 situated next to one another. In particular, the surface areas are situated at the same height level with respect to the vertical direction V.

In contrast, the lower blank separating module 1203 has a relief 1260 that is matched to the relief 1250 of the upper blank separating module 1204. The lower blank separating module 1203 has the relief 1260 including at least three supporting elements 1202; 1211. The at least three supporting elements 1202; 1211 have three different distances A11; A12; A13 with respect to a guide carrier 1240, in particular the center line 1247 of a guide carrier 1240 of the lower blank separating module 1203. The reliefs 1260 and 1250 of the lower blank separating module 1203 and of the upper blank separating module 1204, respectively, are preferably configured in such a way that, in the separating position, the magnitude of the difference of two distances A12; A13 of at least two supporting elements 1211 of the at least three supporting elements 1202; 1211 corresponds to and/or can correspond to the magnitude of the difference of the two distances A5; A6 of at least two operative surfaces 1215 and/or contact surfaces 1227; 1230. The reliefs 1250 and 1260 of the upper blank separating module 1204 and of the lower blank separating module 1203, respectively, are configured as mating pieces and/or negative images with respect to the relief. In an embodiment for separating blanks 03 situated next to one another on a sheet 02, each of the blank separating modules 1204; 1203 preferably comprises multiple surface areas and/or elements, which can be arranged in at least 3 positions. Preferably, in the separating position, a relief 1250 is formed forms having three different surface areas in a different vertical direction V and/or vertical position. Preferably, the surface areas are formed by the contact surfaces 1215; 1227; 1230 of the elements 1212; 1228; 1235. This applies similarly to the mating piece of the lower blank separating module 1203 and its supporting elements 1202; 1211.

In addition or as an alternative, the first contact elements 1228 and/or the second contact elements 1235 can additionally or alternatively be acted upon by a force, for example by means of a drive 1232, preferably by means of at least one pneumatic cylinder 1232 and/or electrically by means of an electric drive 1232. Layers 1236 having different rigidities and/or elasticities can be present between the first contact elements 1228 and/or the second contact elements 1235 and the carrier plate 1222.

In addition or as an alternative, spacer elements can be present between the first contact elements 1228 and/or the second contact elements 1235 and the carrier plate 1222. Moreover, guide elements 1233, in particular metal rods 1233, can additionally protrude beyond the first contact elements 1228 and/or the second contact elements 1235 in the direction of the lower blank separating module 1203, and hold the partial piles 13 and/or reams 13 and/or blanks 03 and/or partial blank piles 16 in their position during the entire separation process.

In addition or as an alternative, the upper blank separating tool 1204 comprises only one contact element 1228; 1235, here, for example, the first contact element 1228 including the first contact surface 1227. In particular, free regions without contact element 1235 are then arranged instead of the second contact surface 1230. In particular, the height difference of the distances A5 and A6 then does not arise due to the elastic tool supporting elements 1229; 1231, but as a result of the omission of the second contact surface 1230 with the second contact element 1235.

In addition or as an alternative, multiple operative elements 1234 can protrude between the contact elements 1228 beyond the plane of the contact surface 1227 of the at least one separating tool 1205 in the direction of the lower blank separating module 1203, and additionally can remove offcut pieces 04; 05; 06, for example parts of the frame and/or inner offcut pieces 04.

In addition or as an alternative, the at least one separating tool 1205 is suitable for carrying out intermediate cuts and, in particular, for removing crosspieces 05. In particular, for removing offcut pieces 05 and/or crosspieces 05, the contact surface 1224; 1227; 1230 has a boundary line, and the boundary line is larger than a boundary line of a blank 03 on a sheet 02. Preferably, for carrying out intermediate cuts, the at least one upper blank separating tool 1204 likewise comprises at least one operative element 1237, which are preferably configured to be rigid. The at least one operative element 1237 is preferably arranged on the blank separating tool carrier 1222 and protrudes in the direction of the at least one lower blank separating module 1203. The at least one operative element 1237 is arranged in such a way that the offcut pieces 04; 05; 06, in particular the offcut pieces 05 and/or crosspieces are pressed downwardly during the separation process between the lower separating tool 1209. In particular, the at least one operative element 1237 is arranged to remove the offcut pieces 05 and/or the crosspieces 05 from the sheets 02 in the separating position of the upper blank separating module 1204. In addition or as an alternative, such an operative element 1237 acts on offcut pieces 04; 05; 06 of the frame and/or other offcut pieces 04; 05; 06 of the partial piles 13 and/or reams 13 and/or blanks 03 and/or partial blank piles 16. Preferably, the at least one operative element 1237 forms the boundary line of a partial pile 13 and/or ream 13 and/or blank 03 and/or partial blank pile 16. Preferably, additionally at least one supporting element 1238, which is preferably made of an elastic material, is present and/or arranged on the inside of such an operative element 1237, preferably to increase the stability and avoid adhesion of a partial pile 13 and/or ream 13 and/or blank 03 and/or partial blank pile 16. The at least one supporting element 1238 is preferably composed of multiple layers and/or can additionally be acted upon by a load, for example by a pneumatic cylinder.

In addition or as an alternative, the at least one blank separating tool 1205 can be used as a combination tool for carrying out the separating cut and/or intermediate cut. In particular, the at least one blank separating tool 1205 then comprises the separating cut arrangement in regions including connected partial piles 13 and/or reams 13 and/or blanks 03 and/or partial blank piles 16, and the intermediate cut arrangement in regions including interior offcut pieces 04; 05; 06, in particular in the case of crosspieces 05. The surrounding areas, in which preferably separating elements 1212 are used for removing the offcut pieces 04; 05; 06, can, for example, be replaced by a boundary line contour on the tool and/or blank separating tool 1205. In another embodiment, the combination tool is supplemented with the arrangement of the separating elements 1212.

The at least one blank separating device 1200 separates at least one partial blank pile 16 from a pile 12 and/or a ream 13 of sheets 02 in a method for separating blanks. The at least one blank separating device 1200 comprises at least one blank separating mechanism 1201. During a separation process, at least one lower blank separating module 1203 and at least one upper blank separating module 1204 are brought in contact. The at least one upper blank separating module 1204 comprises an upper separating tool 1210 comprising multiple separating elements 1212 in an activated position or a deactivated position. One of the multiple separating elements 1212, in the activated position, has a first distance A1 with respect to a carrier plate 1213, and one of the multiple separating elements 1212, in the deactivated position, has a second distance A2 with respect to the carrier plate 1213 in a first position of the carrier plate 1213. In particular, the at least one carrier plate 1213 is arranged in the first position, while the at least one blank separating mechanism 1201 is arranged in an open position.

Blanks 03 situated directly next to one another on a sheet 02 are separated and/or can be separated by means of the at least one first contact surface 1227 and the at least one second contact surface 1230 of the at least one upper blank separating tool 1205.

In particular, using the at least one blank separating mechanism 1201, offcut pieces 05 and/or crosspieces 05 between two blanks 03 on a sheet 02 are removed and/or can be removed by means of at least one operative element 1237.

During the separation process, the third distance A5 of the at least one first contact surface 1227 differs from the fourth distance A6 of the at least one second contact surface 1230 at least temporarily and/or as a function of the position. The at least one first contact surface 1227 and/or the at least one second contact surface 1230 are movable in the vertical direction V and/or in the direction of a surface normal to one of the contact surfaces 1227; 1230. During the separation process, the contact surfaces 1227; 1230 come in contact with the partial piles 13 and/or reams 13 and/or blanks 03 and/or partial blank piles 16, and as a result of the movement of the blank separating mechanism 1201, a force acts on the at least two contact surfaces 1227; 1230. Preferably, during the separation process, the at least one first contact surface 1227 is in contact with a partial blank pile 13, and, during the separation process, the at least one second contact surface 1230 is in contact with a further partial blank pile 13. The at least one first contact surface 1227 and/or the at least one second contact surface 1230 differ in terms of their rigidity and/or differ in terms of their movability in the vertical direction V. As a result of the contact, the first distance A3 of the at least one first contact surface 1227 changes to the third distance A5. Additionally, the second distance A4 of the at least one second contact surface 1230 changes to the fourth distance A6. Prior to the separation process, the distances A3 and A4 are identical. During the separation process, the distances at least temporarily change to the distances A5 and A6, and the two distances A5; A6 are at least temporarily differently configured. The reason for this is at least one first tool supporting element 1229 between the first contact surface 1227 and the at least one blank separating tool carrier 1222 and at least one second tool supporting element 1231. The at least one first tool supporting element 1229 and the at least one second tool supporting element 1231 cushion the at least one first contact surface 1227 and the at least one second contact surface 1230. The at least one first tool supporting element 1229 and the at least one second tool supporting element 1231 differ in terms of their elasticity and/or rigidity and/or movability.

The at least one lower blank separating module 1203 preferably comprises at least three supporting elements 1202; 1211, each comprising at least one supporting surface 1249; 1248. Each supporting surface 1249; 1248 has at least one distance A11; A12; A13 with respect to a guide carrier 1240 of the at least one lower blank separating module 1203. In particular, the at least three supporting elements 1202; 1211 are arranged so as to be positionable in at least three positions. In particular, the three distances A11; A12; A13 between the supporting surfaces 1249; 1248 and the one guide carrier 1240, in particular a center line 1247 through the guide carrier 1240 in the vertical direction V, differ in the at least three positions. The guide carrier 1240 is preferably arranged as a fixed carrier for guiding the supporting elements 1202; 1211 at the at least one lower blank separating module 1203. Preferably, the at least one guide carrier 1240 is the carrier that in the vertical direction V is the uppermost carrier of the at least one lower blank separating module 1203. In another embodiment of the at least one lower blank separating module 1203, the distances A11; A12; A13 are in particular arranged with respect to a different reference point in the vertical direction V. In particular, the distances A11; A12; A13 are arranged parallel to the height of the processing machine and differ in the length of the distance at least temporarily and/or as a function of the position.

Preferably, one of the three supporting elements 1202; 1211 is configured as the at least one conveyor belt. In particular, the at least one conveyor belt is arranged so as to be lowered in the region of the blank separating mechanism 1201 during the separation process of the partial piles 13 and/or reams 13 and/or blanks 03 and/or partial blank piles 16, partial piles 13 of the piles 12 in the vertical direction V, in particular the transport region 1207. In particular, the at least one conveyor belt serves as a supporting element 1202. The two other two supporting elements 1211 of the at least three supporting elements 1202; 1211 are preferably assigned to the at least one lower separating tool 1209.

The at least one lower blank separating module 1203 preferably comprises the at least one lower separating tool 1209 comprising the multiple supporting elements 1211, in addition to the supporting element 1202. The at least one lower separating tool 1209 is preferably configured as a lower supporting element matrix, in particular as a supporting pin matrix, in particular as a pin matrix. In particular, the at least one supporting pin matrix can be matched and/or must be matched to the separating tool 1210 and/or the at least one upper blank separating tool 1204 for a separation process. In particular, the reliefs of the upper blank separating module 1204 and of the lower blank separating module 1203 must be matched to one another. Each supporting element 1211 can preferably be at least temporarily arranged in at least three positions.

One of the three positions is preferably a deactivated position having a distance A14 between the supporting surface 1248 of a supporting element 1211 and the at least one guide carrier 1240, in particular the center line 1247 of the guide carrier 1240. The other two positions are each referred to as a first activated position and a second activated position, wherein the supporting surface 1248 of a supporting element 1211 in the first activated position has a distance A12 between the supporting surface 1248 of a supporting element 1211 and the at least one guide carrier 1240, in particular the center line 1247 of the guide carrier 1240, and wherein the supporting surface 1248 of a supporting element 1211 in the second activated position has a distance A13 between the supporting surface 1248 of a supporting element 1211 and the at least one guide carrier 1240, in particular the center line 1247 of the guide carrier 1240. In particular, in a first activated position and a second activated position, the supporting elements 1211 have a larger distance A12; A13 than the supporting element 1202 configured as at least one conveyor belt with respect to the at least one guide carrier 1240.

In one of the activated positions, the at least one supporting element 1211 preferably protrudes beyond the supporting surface 1249 of the at least one supporting element 1202 in the vertical direction V. In particular, in the activated position, a supporting element 1211 supports a partial pile 13 and/or ream 13 and/or blank 03 and/or partial blank pile 16 during the separation process. In the deactivated position, the supporting elements 1211 are preferably arranged in a plane beneath the plane of the supporting element 1202 and do not contribute to the separation process. In the deactivated position, the at least one supporting element 1211 is, in particular the multiple supporting elements 1211 are, arranged in a recessed manner in the supporting element 1202 at the distance A11.

Preferably, a supporting element 1211 comprises a bracing element 1241 on the upper side, preferably the side that is in contact with the partial pile 13 and/or ream 13 and/or blank 03 and/or partial blank pile 16 during the separation process. Such a bracing element 1241 is configured as an elastic element 1241, for example as a rubber cap 1241, and in particular includes a pliable surface, in particular so as to prevent impressions on the partial pile 13 and/or ream 13 and/or blank 03 and/or partial blank pile 16. Such a supporting element 1211 preferably includes at least one first groove 1243 centrally on the at least one supporting element 1211 and a further groove 1244 at the lower end of the at least one supporting element 1211. The at least one lower blank separating module 1203 preferably comprises at least one supporting module 1245 for holding and/or guiding and/or supporting the supporting elements 1211. The at least one supporting module 1245 preferably additionally comprises an upper support carrier 1264 and preferably additionally a lower support carrier 1265. Both support carriers 1264; 1265 comprise a respective closing system, preferably to at least temporarily reduce the cross-sections of individual holes in the support carriers 1264; 1265. In a preferred embodiment, the cross-section of each hole can be arbitrarily reduced and enlarged again. For example, a supporting element 1211 and/or a positioning element 1251 can be fixed in a position by the closing element and/or a movement can be blocked at least in one direction, for example in and/or counter to the vertical direction. For example, the two support carriers 1264; 1265 are arranged so as to be movable in the vertical direction V, for example on a linear guide. More preferably, at least the upper support carrier 1265 is arranged so as to be movable.

Preferably, the at least one lower blank separating module 1203 can be transferred at least from a supporting position into a separating position. Preferably, multiple supporting elements 1211 of the at least one lower separating tool 1209 are then arranged in the same position during operation. During the separation process, it is also possible for several supporting elements 1211 to be arranged in a different position temporarily and/or as a function of the position, preferably in the separating position. In particular, the supporting elements 1211 must be arranged as mating pieces for the upper blank separating module 1204. In the supporting position, at least two supporting elements 1211 can be arranged and/or are arranged in a position in which the distance A13 between the supporting surfaces 1248 of the at least two supporting elements 1211 and the guide carrier 1240, in particular the center line 1247 of the guide carrier 1240, is identical. Preferably, at least one supporting element 1211 is arranged so as to be movable, preferably during the separation process. In the separating position, the at least one lower blank separating module 1203 has a relief including three planes through the supporting surfaces 1248; 1249 which are arranged so as to differ in the vertical direction V. Preferably, a first plane and/or, in the vertical direction V, a bottommost plane is formed by the supporting surface 1249 of the at least one supporting element 1202. A second and a third plane are formed by the supporting surfaces 1248 of the supporting elements 1211 of the lower separating tool 1209, which are arranged in the first activated position and in the second activated position. In particular, the at least one lower blank separating module 1203 comprises at least one, preferably two, and/or more stencils 1259; 1261 for this purpose.

For positioning the supporting elements 1211 in the at least three positions, the at least one lower blank separating module 1203 preferably comprises at least one positioning module 1246. The supporting elements 1211 are brought into position after a job change by means of at least one, preferably multiple positioning elements 1251. Each of the positioning elements 1251 includes a groove 1252 centrally at the positioning elements 1251, and each includes at least one further groove 1253 at the lower end of the positioning elements 1251. In a preferred embodiment, the at least one, preferably the multiple positioning elements 1251 are configured as at least one, preferably multiple positioning pins. In the case of multiple positioning elements 1251, these are arranged in a positioning element matrix 1254 or in a positioning pin matrix.

In a preferred embodiment, the at least one positioning module 1246 comprises at least one, preferably movably arranged, positioning carrier 1256. Preferably, the at least one positioning carrier 1256 is arranged so as to be guided on a linear guide 1257. The at least one positioning carrier 1256 preferably comprises a closing system and/or multiple make contacts for fixing the positioning elements 1251, wherein the closing system, for example, temporarily decreases a cross-section of the holes in the positioning carrier 1256. For example, each hole in the positioning carrier 1256 comprises a dedicated make contact and/or multiple holes can be simultaneously locked or their cross-section can be reduced by way of a make contact. In addition, the at least one positioning module 1246 comprises at least one, preferably movably arranged, stencil carrier 1258. Preferably, the at least one stencil carrier 1258 encompasses at least one first stencil plane including a first stencil 1259 configured as a positioning stencil 1259, and a second stencil plane including a second stencil 1261 configured as a positioning stencil 1261. The at least one stencil carrier 1258 is preferably arranged on a linear guide 1262 so as to be movable in the vertical direction V and/or counter to the vertical direction V. Preferably, the first stencil plane and the second stencil plane can, preferably only, be moved by way of the stencil carrier 1258. Preferably, the positioning elements 1251, which are assigned to and/or position the supporting elements 1211 and which, during the separation process, are to be arranged and/or are arranged in the first activated position, are arranged on the first stencil plane, and preferably, the positioning elements 1251, which are assigned to and/or position the supporting elements 1211 and which, during the separation process, are to be arranged and/or are arranged in the second activated position, are arranged on the second stencil plane. A positioning stencil 1259; 1261 is configured as a hole matrix, for example, some holes being arranged in a blocked manner. Of the first positioning stencil 1259, those holes that are assigned to a supporting element 1211 which is to be arranged and/or is arranged in the first activated position are preferably blocked. Of the second positioning stencil 1261, those holes that are assigned to a supporting element 1211 which is to be arranged and/or is arranged in the second activated position are preferably blocked.

Moreover, the at least one positioning module 1246 comprises at least one securing carrier 1263, wherein the at least one securing carrier 1263 is preferably rigidly and/or fixedly and/or immovably arranged in the at least one positioning module 1246. The at least one securing carrier 1263 is preferably for holding the positioning elements 1251, which are not held and/or blocked by the two positioning stencils 1259; 1261. Preferably, these positioning elements 1251 are assigned to the supporting elements 1211 that, during the separation process, are and/or are to be arranged in the deactivated position, and are in particular arranged in the vertical direction V and horizontal alignment directly beneath these supporting elements 1211.

In the preferred embodiment described in the preceding section, the positioning module 1246 positions the supporting elements 1211 of the supporting module 1245 during a positioning process. The positioning process comprises multiple positioning steps. After each job change, the positioning process must be repeated following each stencil change. Thereafter, one or more separation processes for separating partial piles 13 and/or blanks 03 and/or partial blank piles 16 from piles 12 and/or reams 13 of sheets 02 can be carried out. For changing the stencil, the positioning of the supporting elements 1211 in one of the three positions must be cancelled. This, in particular, takes place during a stencil change process and/or a stencil change.

The positioning process begins in a starting position, and in particular, it must be possible, in the starting position, for the first positioning stencil 1259 and the second positioning stencil 1261 to be inserted into the positioning module 1246 and/or changed, for example manually. The positioning elements 1251 are arranged spaced apart in the vertical direction V from the first stencil plane and/or the first positioning stencil 1259. In particular, the positioning elements 1251 are held by way of the at least one positioning carrier 1256, in which the closing system is preferably arranged in a closed manner. In particular, the at least one positioning carrier 1256 is arranged in an upper position, in particular a position that is spaced apart from the stencil plane. The supporting module 1245 is likewise arranged in a starting position. Preferably, the at least one supporting element 1211 is, in particular the multiple supporting elements 1211 are, arranged in the deactivated position. In particular, the at least one supporting element 1211 rests on the guide carrier 1240. Preferably, the closing system of the guide carrier 1240 is arranged in an open position, while being arranged so as to nevertheless block and/or hold the at least one supporting element 1211 counter to the vertical direction V. In particular, the at least one supporting element 1211 thus has a larger cross-section, in the upper section in the vertical direction V, than the holes of the guide carrier 1240. In particular, in the starting position, the at least one supporting element 1211 is arranged at the at least one guide carrier 1240 and, in particular, so as to be freely movable in the vertical direction V.

The accompanying drawings show further and/or preceding positions of the lower blank separating module 1203, in particular of the positioning module 1246 and/or of the supporting element 1202 configured as a conveyor belt with dotted lines. In particular, the current positions are shown with solid lines in the particular step and/or the particular position.

In a first positioning position, the first stencil 1259 and preferably also the second stencil 1261 are inserted into the at least one positioning module 1246, and the at least one positioning carrier 1256 is moved counter to the vertical direction V on the linear guide 1257, in particular toward the stencils 1259; 1261. The positioning elements 1251 are preferably either blocked by the first stencil 1259 and rest thereon in a first position, or they are blocked by the second stencil 1261 and rest thereon in a second position, or they are blocked by neither the first stencil 1259, nor the second stencil 1261, and are arranged in the securing carrier 1263 in a third position.

In a second positioning position and a further step, the closing system and/or the make contacts of the positioning carrier 1259 are arranged in an open position. In particular, the positioning carrier 1259 can then be moved independently of the positioning elements 1251.

In a third positioning step, the positioning carrier 1256 is moved in the vertical direction V, preferably upwardly. In this third positioning position, the positioning carrier 1256 is preferably only still in contact and/or in an operative connection with the positioning elements 1251 which are arranged and/or positioned in the first position and/or in the second position. In particular, in this position, the positioning carrier 1256 is arranged so as to guide and/or stabilize the positioning elements 1251 which are arranged and/or positioned in the first position and/or in the second position. The positioning elements 1251 that are blocked by neither the first stencil 1259 nor by the second stencil 1261 are furthermore arranged on the fixed securing carrier 1263 and remain in position.

In a fourth positioning step, the stencil carrier 1258 is moved in the vertical direction V, in particular upwardly, and brought in contact with the supporting elements 1211. Preferably, the positioning elements 1251 rest on the supporting elements 1211. In particular, the contacted supporting elements 1211 are moved in terms of the height and/or the location with respect to the vertical direction V. The supporting elements 1211 that are contacted by the positioning elements 1251 present on the first stencil plane are displaced into and/or positioned in the first activated position. The supporting elements 1211 that are contacted by the positioning elements 1251 present on the second stencil plane are displaced into and/or positioned in the second activated position. In the fourth positioning position, the positioning elements 1251 present on the first stencil plane are in a functional connection with the upper groove 1252 or arranged at the height of the closing system of the lower support carrier 1265 of the lower blank separating module 1203. Preferably, each supporting element 1211 that is in the deactivated position is located with its groove 1243 at the height of the lower support carrier 1264 and of the upper support carrier 1265.

In a fifth positioning step, the closing systems of the lower support carrier 1265 and of the upper support carrier 1264 are being closed. In the fifth positioning position, the positions of the supporting elements 1211 are fixed and/or set.

In a sixth positioning step, the upper support carrier 1264 is at least moved in the vertical direction V and transferred into a sixth positioning position and/or working position. In particular, the supporting elements 1211, which previously were in the second activated supporting position, are at least temporarily transferred into the first activated supporting position. This is in particular necessary to initially hold and/or to support the partial pile 13 and/or the ream 13 and/or blanks 03 and/or partial blank piles 16 on the plane prior to the separation process. With this, in particular the positioning of the supporting elements 1211 is completed prior to the separation process.

During the separation process, the at least one partial blank pile 16 is separated from the pile 12 and/or the partial pile 13 and/or ream 13. In the subsection section, the separation process is described with one upper blank separating tool 1204 and multiple separating tools 1209. In particular, the separating step is described with multiple connected blanks 03 on one sheet 02.

Via the supporting element 1202 configured as a conveyor belt, the partial pile 13 and/or the ream 13 is guided into the blank separating mechanism 1201. Thereafter, the supporting element 1202 configured as a conveyor belt is lowered in the vertical direction V, and the partial pile 13 and/or the ream 13 are held in position by the supporting elements 1211. In particular, the activated supporting elements 1211 are situated in the first activated supporting position and preferably form a plane.

During the separation process, the upper blank separating module 1204 is moved counter to the vertical direction V toward the lower blank separating module 1203. The separating tools 1209 are preferably positioned in such a way, and in particular activated, that they exert a shear movement on the offcut pieces 04; 05; 06, preferably on the frame and/or the gripper edges 06 around the partial blank pile 16, and deposit the offcut pieces 04; 05; 06 downwardly onto the bottommost supporting element 1202, preferably the lowered conveyor belt. During the separation process, the upper blank separating tool 1204 presses on the partial blank piles 16 and the offcut pieces 04; 05; 06, in particular the crosspieces 05, by means of the at least one operative element 1234, if present. In particular, crosspieces 05 can be removed by the at least one operative element 1234. In particular, these crosspieces 05 are then separated from the partial blank piles 16 by way of a shear movement, as well as the separating elements 1211, and deposited downwardly onto the at least one supporting element 1202, in particular the conveyor belt.

During the separation process, the regions 1225; 1226 having high and low rigidity and/or the contact elements 1228; 1235 including the contact surfaces 1227; 1230 of the at least one upper blank separating tool 1205 cooperate with the supporting elements 1211 in the activated position. In particular, the region 1225 having the high rigidity and/or the first contact element 1228, and preferably the first contact surface 1227, cooperate with the supporting elements 1211 in the second activated position. In particular, the region 1226 having the low rigidity and/or the second contact element 1235, and preferably the second contact surface 1230, cooperate with the supporting elements 1211 in the first activated position. As a result of the contact of the first contact surface 1227 and the first contact element 1228 with the supporting elements 1211 via the partial blank pile 16 in the second activated position, the supporting elements 1211 are transferred from the first activated position into the second position. In particular, the supporting elements 1211, which were positioned in the second activated position, are partially movable in the support carriers 1264; 1265. Preferably, the two support carriers 1264; 1265 are arranged so as to be movably mounted and generate a force, for example via mechanical springs and/or by way of pneumatic and/or electric-motor actuation. In particular, the partial blank piles 16 are clamped by the action of the force. In particular, the upper support carrier 1264 is moved counter to the vertical direction V by way of the movement of the upper blank separating module 1204, and thus causes a transfer of the supporting elements 1211, which were previously positioned in the second activated position, from the first activated position into the second activated position. Preferably, the distance A3 of the contact surface 1227 and the new distance A5 preferably remain identical. Due to the contact of the second contact surface 1230 and the second contact element 1235 with the supporting elements 1211 in the first activated position via a further partial blank pile 16, the contact surface 1230 having the lower rigidity is moved in the vertical direction V, and in particular the elastic tool supporting element 1231 is compressed. The distance A4 changes in particular to the, preferably smaller distance A6. In particular, a relative movement thus arises between the partial blank piles 16 situated next to one another, and a shear movement thus arises due to the various positions, whereby the two partial blank piles 16 can be and/or are separated from one another. During the separation process, the third distance A5 of the at least one first contact surface 1227 from the fourth distance A6 for separating blanks 03 that are connected and/or joined via holding points and situated directly next to one another, is at least temporary during the separation process. During the separation process, the at least one first contact surface 1227 is in contact with a partial blank pile 13, and, during the separation process, the at least one second contact surface 1230 is in contact with a further partial blank pile 13. In contrast, the third distance A5 does not differ from the fourth distance A6 for the separation of offcut pieces 05 and/or crosspieces 05.

In particular, during the separation process, clamping of the partial blank piles 16 between the contact elements 1228; 1235 as well as the supporting elements 1211 is ensured by the elastic configuration of the tool supporting elements 1229; 1231, in particular of the at least one second tool supporting element 1231.

In a subsequent step, the at least one upper blank separating module 1204 is transferred counter to the vertical direction V from the separating position into the open position. Preferably at the same time, the upper support carrier 1264 is moved in the vertical direction V and transfers the supporting elements 1211 from the second activated position into the first activated position, so that the two partial blank piles 16 are arranged in one plane.

In a further step, the transport means 1401 and/or the rake 1401 moves between the supporting elements 1211 and raises the partial blank piles 16 using a vertical movement, transporting them out of the blank separating device 1200 into a downstream delivery unit 1400. In particular, the rake 1401 moves in over the offcut pieces 04; 05; 06, leaving them on the supporting element 1202, in particular the conveyor belt.

In a further step, the supporting element 1202, in particular the conveyor belt, is raised in the vertical direction V, and the offcut pieces 04; 05; 06 are transported into a plane via the supporting elements 1211. For example, several closing systems, in particular the closing system of the guide carrier 1240, are being closed in this step, thereby preventing the supporting elements 1211 from becoming detached. To save a drive in the lower blank separating module 1203, for example, the positioning module 1246 is raised simultaneously with the supporting element 1202 using a shared drive.

Via the supporting element 1202, the offcut pieces 04; 05; 06, in particular the offcut pieces 05; 06, are removed from the blank separating device 1200. A previously closed closing system of the guide carrier 1240 is, for example, opened again for a movable arrangement of the supporting elements 1211. Preferably, a new partial pile 13 and/or a new ream 13 can now simultaneously be inserted into the blank separating device 1200.

During a job change, for example, the first stencil 1259 and/or the second stencil 1261 of the positioning module 1246 have to be replaced. The stencil change is prepared in a stencil change process.

In a first stencil change step, the upper support carrier 1264 is preferably moved and/or lowered counter to the vertical direction V. Preferably at the same time and/or shortly thereafter, the stencil carrier 1258 is moved and/or raised in the vertical direction V.

In a second stencil change step, the closing systems and/or the make contacts of the upper support carrier 1264 and preferably of the lower support carrier 1265 are opened.

In a third stencil change step, the closing system and/or the make contacts of the positioning carrier 1256 are opened, and the positioning elements 1251 rest on the first stencil 1259 and/or on the second stencil 1261.

In a fourth stencil change step, the positioning carrier 1256 and the stencil carrier 1262 are moved counter to the vertical direction V and/or lowered, preferably simultaneously and at an identical distance. In particular, the positioning elements 1251 thus additionally move counter to the vertical direction V and/or are lowered.

In a fifth stencil change step, the positioning carrier 1265 is further displaced counter to the vertical direction V, preferably closer to the stencil carrier 1262, and/or is, preferably further, lowered.

In a sixth stencil change step, the closing system and/or the make contacts of the positioning carrier 1265 are being closed. In particular, the cross-sections of the holes in the positioning carrier 1256 are being reduced.

In a seventh stencil change step, the positioning carrier 1265 is being moved in the vertical direction V, thereby raising the positioning elements 1251 at the wider cross-sections. In particular, the positioning elements 1251 hang in this position at the positioning carrier 1265, preferably all in one plane. In particular, the positioning elements 1251 are then situated away from and/or spaced apart from the two stencils 1259; 1261, and/or the stencils 1259; 1261 can be removed and/or replaced.

In particular, the lower blank separating module 1203 is then situated in the starting position again. The stencil change process preferably corresponds to the positioning process in a reverse order.

In another preferred embodiment of the lower blank separating module 1203, each supporting element 1211, preferably separately and/or individually, is fixed at the carrier by way of a form fit and/or a force fit as a function of the job. In particular, stencils 1259; 1261 can then be dispensed with. In this embodiment and/or in addition to the other embodiment, for example, electromagnetic, electric motor-driven, pneumatic, hydraulic or magnetic make contacts and/or switches and/or actuators can be used. For example, such make contacts can represent a digital solution in one refinement and, for example, be automatically controlled by means of a signal from a control unit.

In another preferred embodiment, the at least one lower blank separating module 1203 comprises multiple supporting elements 1211, wherein the supporting elements 1211 carry out the one movement during the separation process by force from at least one spring element and/or from a pneumatic, hydraulic and/or electric-motor actuation and/or movability. As a result of this force, the partial piles 13 and/or reams 13 are returned into the starting position after the separation process. Moreover, the blank piles 13 can be clamped by the action of the force. The at least one movable supporting element 1211 is transferred from the first activated position in the supporting position of the lower blank separating module 1203 into a second activated position in the separating position of the lower blank separating module 1203.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A blank separating device comprising:

at least one upper blank separating module, the at least one upper blank separating module having a first relief, the first relief comprising at least three separating elements and/or contact elements, each of the at least three separating elements including an operative surface and/or contact surface, and the at least three operative surfaces and/or contact surfaces being individually arrangeable to at least three different distances in a vertical direction with respect to a carrier plate within which the at least three separating elements and/or contact elements are mounted, and at least one lower blank separating module having a second relief comprising a plurality of supporting elements, wherein the plurality of supporting elements of the second relief include at least three supporting elements for bracing blanks or scrap pieces, and the at least three supporting elements are arrangeable to three different distances with respect to a guide carrier of the at least one lower blank separating module, the guide carrier of the at least one lower blank separating module being arranged in the vertical direction with respect to the at least three supporting elements, wherein the at least one lower blank separating module comprises at least one lower separating tool comprising at least two supporting elements of the at least three supporting elements, and the at least two supporting elements of the at least three supporting elements are configured as supporting pins, and wherein the at least two supporting elements of the at least three supporting elements can be arranged in a position as a function of a rigidity of the contact surfaces of the upper blank separating module.

2. The device according to claim 1, wherein, in a separating position, a magnitude of a difference of two distances of at least two supporting elements of the at least three supporting elements corresponds to a magnitude of a difference of two distances of at least two operative surfaces and/or contact surfaces.

3. The device according to claim 1, wherein the at least one upper blank separating module and/or the at least one lower blank separating module can be transferred from an open position into a separating position.

4. The device according to claim 3, wherein:

the at least three separating elements and/or contact elements of the at least one upper separating module comprise multiple separating elements configured as separating pins, and the separating pins are arranged in a separating pin matrix.

5. The device according to claim 1, wherein one of the at least three supporting elements of the at least one lower blank separating module is configured as a conveyor belt.

6. The device according to claim 1, wherein the at least three separating elements and/or contact elements of the at least one upper blank separating module comprise at least one separating element and at least one first contact element and at least one second contact element.

7. The device according to claim 1, wherein the first relief is formed by multiple surface areas which can differ and/or differ from one another in the vertical direction.

8. The device according to claim 1, wherein:

the first relief is formed by the operative surfaces of the upper blank separating module by multiple surface areas being arranged differently in the vertical direction, and the multiple surface areas are formed by multiple elements situated next to one another and/or the operative surfaces and/or contact surfaces of the multiple elements situated next to one another.

9. A method for separating blanks, the method comprising:

separating, using at least one blank separating device, at least one partial blank pile from a pile and/or a ream of sheets, wherein, during the separating, at least one lower blank separating module and at least one upper blank separating module are brought into engagement, the at least one upper blank separating module forming a first relief including a plurality of upper elements having at least three operative surfaces and/or contact surfaces, the at least three operative surfaces and/or contact surfaces being individually arrangeable to be positioned at least three different distances with respect to a carrier plate within which the plurality of upper elements are mounted, the at least one lower blank separating module including a second relief comprising a plurality of supporting elements, wherein the plurality of supporting elements comprising the second relief include at least three supporting elements for bracing blanks or scrap pieces, and the at least three supporting elements are arrangeable to three different distances with respect to a guide carrier of the at least one lower blank separating module, the guide carrier of the at least one lower blank separating module being arranged in the vertical direction with respect to the at least three supporting elements, wherein the at least one lower blank separating module comprises at least one lower separating tool comprising at least two supporting elements of the at least three supporting elements, and the at least two supporting elements of the at least three supporting elements are configured as supporting pins, and wherein the at least two supporting elements of the at least three supporting elements can be arranged in a position as a function of a rigidity of the contact surfaces of the upper blank separating module.

10. The method according to claim 9, wherein, when at least two blanks on a sheet are directly connected and/or joined via holding points, at least one of the first relief of the at least one upper blank separating module or the second relief of the at least one lower blank separating module, during the separating, at least temporarily, includes three planes.

11. The method according to claim 9, wherein, during the separation of crosspieces and/or offcut pieces, at least one of the first relief of the at least one upper blank separating module or the second relief of the at least one lower blank separating module, during the separating process, at least temporarily includes two planes.

* * * * *